(12) United States Patent
Fujiwara et al.

(10) Patent No.: US 9,433,861 B2
(45) Date of Patent: Sep. 6, 2016

(54) COMPUTER-READABLE STORAGE MEDIUM HAVING INFORMATION PROCESSING PROGRAM STORED THEREIN, HANDHELD TERMINAL APPARATUS, SYSTEM, INFORMATION PROCESSING METHOD, AND COMMUNICATION SYSTEM

(75) Inventors: Shinya Fujiwara, Kyoto (JP); Kouichi Kawamoto, Kyoto (JP); Yuichiro Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1099 days.

(21) Appl. No.: 12/969,855

(22) Filed: Dec. 16, 2010

(65) Prior Publication Data
US 2012/0071242 A1  Mar. 22, 2012

(30) Foreign Application Priority Data
Sep. 17, 2010  (JP) ................................. 2010-209277

(51) Int. Cl.
*H04W 88/00* (2009.01)
*A63F 13/327* (2014.01)
*A63F 13/92* (2014.01)
(Continued)

(52) U.S. Cl.
CPC ............. *A63F 13/327* (2014.09); *A63F 13/31* (2014.09); *A63F 13/92* (2014.09); *A63F 13/211* (2014.09); *A63F 2300/402* (2013.01); *A63F 2300/403* (2013.01); *A63F 2300/405* (2013.01)

(58) Field of Classification Search
USPC ......... 455/41.3, 419, 186.1, 90.2, 41.1, 500, 455/522, 411, 558, 414.2, 435.2; 463/40, 463/43, 33, 31, 42, 37, 39, 25
See application file for complete search history.

(56) References Cited

U.S. PATENT DOCUMENTS

| | | | |
|---|---|---|---|
| 5,396,225 A | 3/1995 | Okada et al. | |
| 5,618,045 A | 4/1997 | Kagan et al. | |

(Continued)

FOREIGN PATENT DOCUMENTS

| | | |
|---|---|---|
| EP | 0 710 017 | 5/1996 |
| EP | 1 493 474 | 1/2005 |

(Continued)

OTHER PUBLICATIONS

Konno et al., U.S. Appl. No. 12/816,672, filed Jun. 16, 2010—response to office action filed Mar. 12, 2014.

(Continued)

*Primary Examiner* — Ganiyu A Hanidu
(74) *Attorney, Agent, or Firm* — Nixon & Vanderhye, P.C.

(57) ABSTRACT

A game apparatus automatically receives piece information from another game apparatus by short-range wireless communication. The game apparatus obtains step count data based on an amount of movement of the game apparatus (i.e., a step count of a user of the game apparatus). The game apparatus uses piece information obtained by the short-range wireless communication, thereby performing a predetermined process of an application (i.e., a process of incorporating a piece image into a collection image), or uses step count data (i.e., an owned coin count resulting from conversion of the step count data) instead of piece information obtained by the short-range wireless communication, thereby performing the predetermined process of the application (i.e., the process of incorporating a piece image into a collection image).

31 Claims, 23 Drawing Sheets

(51) Int. Cl.
*A63F 13/31* (2014.01)
*A63F 13/211* (2014.01)

(56) References Cited

U.S. PATENT DOCUMENTS

| | | | |
|---|---|---|---|
| 5,666,293 A | 9/1997 | Metz et al. | |
| 5,732,275 A | 3/1998 | Kullick et al. | |
| 6,018,720 A | 1/2000 | Fujimoto | |
| 6,438,573 B1 | 8/2002 | Nilsen | |
| 6,733,382 B2 | 5/2004 | Oe et al. | |
| 6,736,727 B1 | 5/2004 | Doi et al. | |
| 7,054,831 B2 | 5/2006 | Koenig | |
| 7,114,090 B2 | 9/2006 | Kardach et al. | |
| 7,290,072 B2 | 10/2007 | Quraishi et al. | |
| 7,346,708 B2 | 3/2008 | Minamisawa | |
| 7,457,410 B2 | 11/2008 | Yamauchi et al. | |
| 7,493,613 B2 | 2/2009 | D'Souza et al. | |
| 7,565,653 B2* | 7/2009 | Inoue et al. | 718/103 |
| 7,620,027 B2 | 11/2009 | Igarashi et al. | |
| 7,704,147 B2 | 4/2010 | Quraishi et al. | |
| 7,725,078 B2* | 5/2010 | Kuwahara et al. | 455/41.3 |
| 7,729,661 B2 | 6/2010 | Tanaka et al. | |
| 7,794,328 B2* | 9/2010 | Horigome | 463/42 |
| 7,801,818 B2 | 9/2010 | Tsukazaki et al. | |
| 7,811,171 B2 | 10/2010 | Mitsuyoshi et al. | |
| 7,813,300 B2 | 10/2010 | Takayama et al. | |
| 7,819,750 B2 | 10/2010 | Lam et al. | |
| 7,854,657 B2 | 12/2010 | Shiraiwa | |
| 7,862,433 B2 | 1/2011 | Sato et al. | |
| 7,901,293 B2 | 3/2011 | Oe | |
| 7,929,911 B2 | 4/2011 | Tanaka et al. | |
| 7,934,995 B2 | 5/2011 | Suzuki | |
| 8,052,528 B2 | 11/2011 | Shiraiwa et al. | |
| 8,075,405 B2 | 12/2011 | Sasaki et al. | |
| 8,078,160 B2 | 12/2011 | Quinn | |
| 8,185,165 B2 | 5/2012 | Beninghaus et al. | |
| 8,229,962 B1 | 7/2012 | Cavalancia, II | |
| 8,261,258 B1 | 9/2012 | Jianu et al. | |
| 8,433,375 B2 | 4/2013 | Yamazaki et al. | |
| 8,505,008 B2 | 8/2013 | Yamazaki et al. | |
| 8,700,478 B2 | 4/2014 | Kubo et al. | |
| 2001/0003714 A1 | 6/2001 | Takata et al. | |
| 2001/0048744 A1 | 12/2001 | Kimura | |
| 2002/0016166 A1* | 2/2002 | Uchida et al. | 455/419 |
| 2002/0065137 A1 | 5/2002 | Tonomura | |
| 2002/0083160 A1 | 6/2002 | Middleton | |
| 2003/0033413 A1 | 2/2003 | Wilson, Jr. et al. | |
| 2003/0038731 A1 | 2/2003 | Sako et al. | |
| 2003/0126218 A1 | 7/2003 | Sakonsaku | |
| 2003/0134623 A1 | 7/2003 | Kanamaru et al. | |
| 2004/0002774 A1 | 1/2004 | Conti et al. | |
| 2004/0082383 A1 | 4/2004 | Muncaster et al. | |
| 2004/0122931 A1 | 6/2004 | Rowland et al. | |
| 2004/0127288 A1 | 7/2004 | Furuhashi et al. | |
| 2004/0151126 A1 | 8/2004 | Matsubara | |
| 2004/0224769 A1 | 11/2004 | Hansen et al. | |
| 2004/0259642 A1 | 12/2004 | Tanaka et al. | |
| 2005/0047356 A1 | 3/2005 | Fujii et al. | |
| 2005/0068928 A1 | 3/2005 | Smith et al. | |
| 2005/0070327 A1* | 3/2005 | Watanabe | H04M 1/0245 455/552.1 |
| 2005/0073764 A1 | 4/2005 | Ogawa et al. | |
| 2005/0154759 A1 | 7/2005 | Hofmeister et al. | |
| 2005/0282639 A1 | 12/2005 | Tanaka et al. | |
| 2006/0068702 A1 | 3/2006 | Miwa et al. | |
| 2006/0106963 A1* | 5/2006 | Sasaki et al. | 710/110 |
| 2006/0166739 A1 | 7/2006 | Lin | |
| 2006/0168574 A1 | 7/2006 | Giannini et al. | |
| 2006/0234631 A1 | 10/2006 | Dieguez | |
| 2006/0247059 A1 | 11/2006 | Nogami et al. | |
| 2006/0282518 A1 | 12/2006 | Karaoguz et al. | |
| 2006/0282834 A1 | 12/2006 | Cheng et al. | |
| 2007/0078004 A1 | 4/2007 | Suzuki et al. | |
| 2007/0105623 A1 | 5/2007 | Tanaka et al. | |
| 2007/0118587 A1 | 5/2007 | Ishikawa et al. | |
| 2007/0121534 A1 | 5/2007 | James et al. | |
| 2007/0123168 A1 | 5/2007 | Takehara et al. | |
| 2007/0136817 A1 | 6/2007 | Nguyen | |
| 2007/0149183 A1 | 6/2007 | Dunko et al. | |
| 2007/0174471 A1 | 7/2007 | Van Rossum | |
| 2007/0203969 A1 | 8/2007 | Wakasa et al. | |
| 2007/0213795 A1* | 9/2007 | Bradley et al. | 607/116 |
| 2007/0213975 A1 | 9/2007 | Shimoda et al. | |
| 2007/0232310 A1 | 10/2007 | Schiff et al. | |
| 2007/0271234 A1 | 11/2007 | Ravikiran | |
| 2008/0119281 A1 | 5/2008 | Hirose et al. | |
| 2008/0123582 A1 | 5/2008 | Maekawa | |
| 2008/0139310 A1* | 6/2008 | Kando et al. | 463/33 |
| 2008/0148350 A1 | 6/2008 | Hawkins et al. | |
| 2008/0188301 A1* | 8/2008 | Kawamoto et al. | 463/31 |
| 2008/0209071 A1 | 8/2008 | Kubota | |
| 2008/0222571 A1* | 9/2008 | Yoshioka | A63F 13/06 715/841 |
| 2009/0011709 A1* | 1/2009 | Akasaka | H04W 24/00 455/41.3 |
| 2009/0028094 A1* | 1/2009 | Okada et al. | 370/328 |
| 2009/0037526 A1 | 2/2009 | Elliott et al. | |
| 2009/0058639 A1 | 3/2009 | Tanaka et al. | |
| 2009/0061870 A1 | 3/2009 | Finkelstein et al. | |
| 2009/0064299 A1 | 3/2009 | Begorre et al. | |
| 2009/0093310 A1 | 4/2009 | Tanaka et al. | |
| 2009/0124393 A1 | 5/2009 | Tanaka et al. | |
| 2009/0137321 A1 | 5/2009 | Katsume et al. | |
| 2009/0143114 A1 | 6/2009 | Vargas et al. | |
| 2009/0143140 A1 | 6/2009 | Kitahara | |
| 2009/0158430 A1 | 6/2009 | Borders | |
| 2009/0186603 A1* | 7/2009 | Usami | H04M 1/274516 455/414.2 |
| 2009/0193365 A1 | 7/2009 | Sugiura | |
| 2009/0217307 A1 | 8/2009 | Ooe | |
| 2009/0221298 A1* | 9/2009 | Hanner | 455/456.1 |
| 2009/0253518 A1 | 10/2009 | Sasaki et al. | |
| 2009/0271111 A1* | 10/2009 | Takanashi et al. | 701/209 |
| 2009/0307105 A1 | 12/2009 | Lemay et al. | |
| 2009/0310594 A1 | 12/2009 | Nakata | |
| 2010/0022302 A1* | 1/2010 | Iwakiri et al. | 463/30 |
| 2010/0083181 A1 | 4/2010 | Matsushima et al. | |
| 2010/0111057 A1 | 5/2010 | Nakamura et al. | |
| 2010/0130254 A1* | 5/2010 | Kamada | H04L 63/0853 455/558 |
| 2010/0167697 A1 | 7/2010 | Ishikawa et al. | |
| 2010/0182260 A1* | 7/2010 | Kiyuna | 345/173 |
| 2010/0184379 A1* | 7/2010 | Shimomura | H04W 88/16 455/41.3 |
| 2010/0185977 A1* | 7/2010 | Ito | 715/790 |
| 2010/0312817 A1 | 12/2010 | Steakley | |
| 2010/0325235 A1 | 12/2010 | Konno et al. | |
| 2011/0045910 A1 | 2/2011 | McKenna et al. | |
| 2011/0060825 A1 | 3/2011 | Ooe et al. | |
| 2011/0070950 A1 | 3/2011 | Tanaka et al. | |
| 2011/0143840 A1 | 6/2011 | Sotoike et al. | |
| 2011/0176455 A1 | 7/2011 | Matsunada | |
| 2011/0205953 A1 | 8/2011 | Kuwahara et al. | |
| 2011/0231559 A1 | 9/2011 | Yamaguchi | |
| 2011/0292033 A1 | 12/2011 | Umezu et al. | |
| 2011/0295709 A1 | 12/2011 | Kubo et al. | |
| 2011/0306294 A1 | 12/2011 | Yamazaki et al. | |
| 2011/0307554 A1 | 12/2011 | Konno et al. | |
| 2011/0307884 A1 | 12/2011 | Wabe | |
| 2011/0307892 A1 | 12/2011 | Yamazaki et al. | |
| 2012/0010000 A1 | 1/2012 | Masuda et al. | |
| 2012/0011256 A1 | 1/2012 | Masuda et al. | |
| 2012/0015778 A1* | 1/2012 | Lee | A63B 71/0622 482/8 |
| 2012/0021703 A1 | 1/2012 | Yamazaki et al. | |
| 2012/0054297 A1 | 3/2012 | Konno et al. | |
| 2012/0071242 A1* | 3/2012 | Fujiwara et al. | 463/40 |

FOREIGN PATENT DOCUMENTS

| | | |
|---|---|---|
| EP | 1 513 066 | 3/2005 |
| EP | 1 810 732 | 7/2007 |
| EP | 1 872 838 | 1/2008 |
| EP | 2 135 650 | 12/2009 |

(56) References Cited

FOREIGN PATENT DOCUMENTS

| | | |
|---|---|---|
| JP | 11-53184 | 2/1999 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-175556 | 6/2001 |
| JP | 2001-231067 | 8/2001 |
| JP | 2002-027552 | 1/2002 |
| JP | 2002-102530 | 4/2002 |
| JP | 2002-159739 | 6/2002 |
| JP | 2002-253866 | 9/2002 |
| JP | 2002-297483 | 10/2002 |
| JP | 2003-023661 | 1/2003 |
| JP | 2003-050771 | 2/2003 |
| JP | 2003-196217 | 7/2003 |
| JP | 2003-219465 | 7/2003 |
| JP | 2004-005110 | 1/2004 |
| JP | 2004-057515 | 2/2004 |
| JP | 2004-118291 | 4/2004 |
| JP | 2004221671 | 8/2004 |
| JP | 2004-329948 | 11/2004 |
| JP | 2004-348203 | 12/2004 |
| JP | 2005018377 | 1/2005 |
| JP | 2005-028103 | 2/2005 |
| JP | 2005-242399 | 9/2005 |
| JP | 2005-242886 | 9/2005 |
| JP | 2005-251167 | 9/2005 |
| JP | 2005-266160 | 9/2005 |
| JP | 2006-005630 | 1/2006 |
| JP | 2006-101474 | 4/2006 |
| JP | 2006-146306 | 6/2006 |
| JP | 2006-228113 | 8/2006 |
| JP | 2007507982 | 3/2007 |
| JP | 2007-088900 | 4/2007 |
| JP | 2007-125185 | 5/2007 |
| JP | 2007-142613 | 6/2007 |
| JP | 2007175508 | 7/2007 |
| JP | 2007-330642 | 12/2007 |
| JP | 2008-077524 | 4/2008 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2008-310499 | 12/2008 |
| JP | 2009015551 | 1/2009 |
| JP | 2009-026178 | 2/2009 |
| JP | 2009-065306 | 3/2009 |
| JP | 2009-512239 | 3/2009 |
| JP | 2009-147828 | 7/2009 |
| JP | 2009-225000 | 10/2009 |
| JP | 2010-022704 | 2/2010 |
| JP | 2010-028171 | 2/2010 |
| JP | 2010028171 | 2/2010 |
| JP | 2010028672 | 2/2010 |
| JP | 2010-079546 | 4/2010 |
| JP | 2010-086327 | 4/2010 |
| JP | 2011-509541 | 3/2011 |
| WO | 2005/111815 | 11/2005 |
| WO | 2009/048473 | 4/2009 |
| WO | 2009/148781 | 12/2009 |
| WO | 2010/010645 | 1/2010 |

OTHER PUBLICATIONS

Kubo et al., U.S. Appl. No. 12/940,426, filed Nov. 5, 2010—now U.S. Pat. No. 8,700,478.
Wabe et al., U.S. Appl. No. 13/027,723, filed Feb. 15, 2011—final office action mailed Apr. 28, 2014.
Konno et al., U.S. Appl. No. 13/101,811, filed May 5, 2011—RCE filed Jan. 22, 2014.
Fujiwara et al., U.S. Appl. No. 13/111,033, filed May 19, 2011—non-final office action mailed Apr. 25, 2014.
Konno et al., U.S. Appl. No. 13/251,204, filed Oct. 1, 2011—allowed.
Yamazaki et al., U.S. Appl. No. 13/251,205, filed Oct. 1, 2011—RCE filed May 11, 2014.
Kubo et al., U.S. Appl. No. 14/181,690, filed Feb. 16, 2014—awaiting USPTO action.
Kubo et al., U.S. Appl. No. 14/181,692, filed Feb. 16, 2014—awaiting USPTO action.
Saeki, K., "Apparent and Substantial Improvement in Function! Report on Nintendo DSi Giving Impression of Development," Impress Watch Corporation, Game Watch, uploaded on Nov. 1, 2008 [retrieved Feb. 4, 2014]; http://game.watch.impress.co.jp/docs/20081101/dsil.htm with partial English-language translation thereof.
English-language machine translation of http://game.watch.impress.co.jp/docs/20081101/dsil.htm [retrieved Apr. 15, 2014].
U.S. Appl. No. 12/816,672, response to office action filed Mar. 12, 2014.
U.S. Appl. No. 12/871,243, RCE filed Nov. 29, 2013.
U.S. Appl. No. 13/027,723, final office action mailed Apr. 28, 2014.
U.S. Appl. No. 13/101,811, RCE filed Jan. 22, 2014.
U.S. Appl. No. 13/111,033, non-final office action mailed Apr. 25, 2014.
U.S. Appl. No. 13/251,204, allowed.
U.S. Appl. No. 13/251,205, RCE filed May 11, 2014.
U.S. Appl. No. 14/181,690, awaiting USPTO action.
U.S. Appl. No. 14/181,692, awaiting USPTO action.
English-language machine translation of JP 2002-102530.
Dissidia Final Fantasy Ultimania, Japan, Square Enix Co., Ltd., Feb. 19, 2009, First Edition, p. 502-503 and partial English-language translation thereof.
Konno et al., U.S. Appl. No. 12/816,672, filed Jun. 16, 2010.
Ooe et al., U.S. Appl. No. 12/871,243, filed Aug. 30, 2010.
Kubo et al., U.S. Appl. No. 12/940,426, filed Nov. 5, 2010.
Yamazaki et al., U.S. Appl. No. 12/948,050, filed Nov. 17, 2010.
Yamazaki et al., U.S. Appl. No. 12/948,371, filed Nov. 17, 2010.
Wabe et al., U.S. Appl. No. 13/027,723, filed Feb. 15, 2011.
Konno et al., U.S. Appl. No. 13/101,811, filed May 5, 2011.
Fujiwara et al., U.S. Appl. No. 13/111,033, filed May 19, 2011.
Konno et al., U.S. Appl. No. 13/251,204, filed Oct. 1, 2011.
Yamazaki et al., U.S. Appl. No. 13/251,205, filed Oct. 1, 2011.
Miki, "Oideyo Doubutsu No Mori Kanpeki Guidebook", First Edition, Enterbrain, Inc., Hamamura Kouichi, Jan. 9, 2006 (partial English-language translation), 6 pages.
English-language machine translation of JP 11-207031.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
Explanation of Circumstances Concerning Accelerated Examination submitted Mar. 31, 2011 in JP Application No. 2010-209277.
English-language machine translation of JP2004-221671.
English-language machine translation of JP2007-175508.
English-language machine translation of JP2010-028171.
English-language machine translation of JP2010-028672.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo DREAM, Mainichi Communications, Inc., Jul. 1, 2010, vol. 15, No. 7, Serial No. 195, pp. 52-59, with a partial English translation, 12 pages.
Game Broadway STAGE27, Gamaga, SOFTBANK Creative Corp., Jun. 1, 2010, vol. 27, No. 6, Serial No. 475, pp. 36-37, with a partial English translation, 6 pages.
Konno et al., U.S. Appl. No. 12/816,672, filed Jun. 16, 2010—non-final office action mailed Sep. 12, 2013.
Ooe et al., U.S. Appl. No. 12/871,243, filed Aug. 30, 2010—allowed.
Kubo et al., U.S. Appl. No. 12/940,426, filed Nov. 5, 2010—RCE filed Jul. 22, 2013.

(56) References Cited

OTHER PUBLICATIONS

Yamazaki et al., U.S. Appl. No. 12/948,050, filed Nov. 17, 2010—now U.S. Pat. No. 8,433,375.
Yamazaki et al., U.S. Appl. No. 12/948,371, filed Nov. 17, 2010—now U.S. Pat. No. 8,505,008.
Wabe et al., U.S. Appl. No. 13/027,723, filed Feb. 15, 2011—RCE filed Oct. 21, 2013.
Konno et al., U.S. Appl. No. 13/101,811, filed May 5, 2011—final office action mailed Sep. 18, 2013.
Fujiwara et al., U.S. Appl. No. 13/111,033, filed May 19, 2011—awaiting USPTO action.
Konno et al., U.S. Appl. No. 13/251,204, filed Oct. 1, 2011—response to office action filed Sep. 25, 2013.
Yamazaki et al., U.S. Appl. No. 13/251,205, filed Oct. 1, 2011—non-final office action mailed Sep. 12, 2013.
English-language machine translation of JP 2000-167233.
English-language machine translation of JP 2010-022704.
Bhupender Virk, "Development of Low Power Consumption Wireless IC for Realization of Sensor Network with Wireless LAN." *Nikkei Electronics*, vol. 997, Feb. 9, 2009, pp. 87-94, published by Nikkei Business Publications, Inc., and partial English-language translation.
English-language machine translation of JP 2007-125185.
Ooe et al., U.S. Appl. No. 12/871,243, filed Aug. 30, 2010—RCE filed Nov. 29, 2013.
Kubo et al., U.S. Appl. No. 12/940,426, filed Nov. 5, 2010—allowed.
Wabe et al., U.S. Appl. No. 13/027,723, filed Feb. 15, 2011—non-final office action mailed Dec. 9, 2013.
English-language machine translation of JP-2002-297483.
English-language machine translation of JP-2005-242886.
English-language machine translation of JP-2006-146306.
English-language machine translation of JP-2009-225000.
English-language machine translation of JP-2010-079546.
English-language machine translation of JP2004-005110.
English-language machine translation of JP2004-118291.
English-language machine translation of JP2008-077524.
English-language machine translation of JP2008-310499.

\* cited by examiner

CONNECTION REQUEST FRAME

| F_TYP | SOURCE MAC ADDRESS | APPLICATION ID | D1 |

CONNECTION RESPONSE FRAME

| F_TYP | DESTINATION MAC ADDRESS | SOURCE MAC ADDRESS | APPLICATION ID | D2 |

INFORMATION FRAME

| F_TYP | DESTINATION MAC ADDRESS | SOURCE MAC ADDRESS | MAIN DATA (D4) | D3 |

| APPLICATION ID | PIECE INFORMATION (D5) | D4 |

| AREA ID | COLLECTION IMAGE ID |
|---------|---------------------|
| AREA A  | 1                   |
| AREA B  | 2                   |
| ...     | ...                 |

T

F I G. 2 0
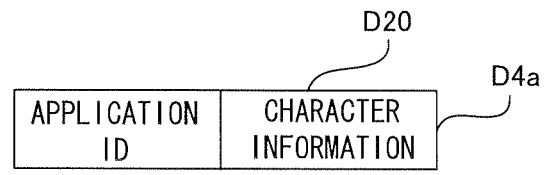

FIG. 22A
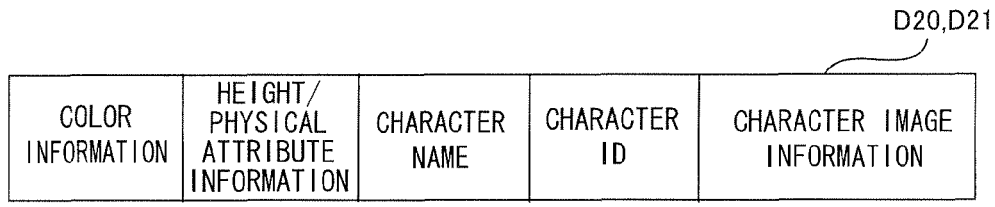
FIG. 22B
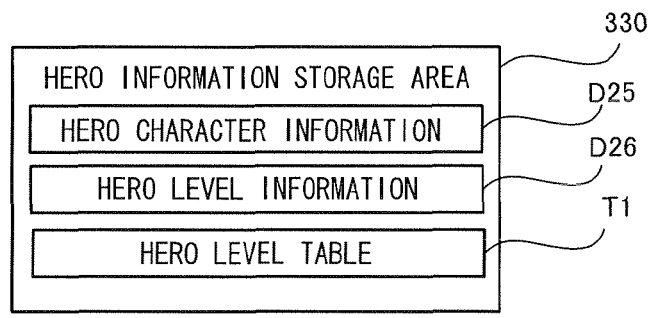
FIG. 22C
HERO LEVEL TABLE
| NUMBER OF TIMES OF PASSING | NUMBER OF COINS | HERO LEVEL |
|---|---|---|
| ONCE | 1 COIN | LEVEL 1 |
| 2 TO 5 TIMES | 5 COINS | LEVEL 2 |
| 5 TO 8 TIMES | 10 COINS | LEVEL 3 |
T1

FIG. 23

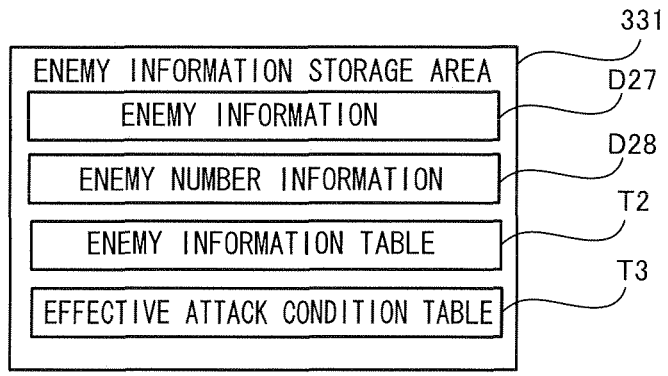

FIG. 24A

ENEMY INFORMATION  D27

| ENEMY NUMBER | ENEMY NAME | DAMAGE LIMIT VALUE | CURRENT DAMAGE VALUE | TYPE | CONDITION ID |
|---|---|---|---|---|---|

FIG. 24B

ENEMY INFORMATION TABLE

| ENEMY NUMBER | ENEMY NAME | DAMAGE LIMIT VALUE | TYPE |
|---|---|---|---|
| NO. 1 | YELLOW GHOST | 100 | LOW LEVEL |
| NO. 2 | BLUE GHOST | 200 | LOW LEVEL |
| NO. 3 | GREAT GHOST | 500 | BOSS |

EFFECTIVE ATTACK CONDITION TABLE

| CONDITION ID | DAMAGE VALUE INFORMATION | EFFECTIVE ATTACK CONDITION |
|---|---|---|
| 1 | 300 | INITIAL LETTER OF CHARACTER NAME IS A |
| 2 | 400 | HERO'S COLOR INFORMATION IS RED |

T3

COMPUTER-READABLE STORAGE MEDIUM HAVING INFORMATION PROCESSING PROGRAM STORED THEREIN, HANDHELD TERMINAL APPARATUS, SYSTEM, INFORMATION PROCESSING METHOD, AND COMMUNICATION SYSTEM

CROSS REFERENCE TO RELATED APPLICATION

The disclosure of Japanese Patent Application No. 2010-209277, filed Sep. 17, 2010, is incorporated herein by reference.

BACKGROUND OF THE INVENTION

1. Field of the Invention

The present invention relates to a computer-readable storage medium having an information processing program stored therein, a handheld terminal apparatus, a system, an information processing method, and a communication system. More particularly, the present invention relates to a computer-readable storage medium having an information processing program stored therein, a handheld terminal apparatus, a system, an information processing method, and a communication system, for receiving information from another information processing apparatus by short-range wireless communication and for performing predetermined processes by using the received information.

2. Description of the Background Art

There are widely-known conventional systems in which handheld terminal apparatuses of the same type perform short-range wireless communication therebetween to transmit/receive information to/from each other. For example, Japanese Laid-Open Patent Publication No. 2008-136737 discloses that handheld game apparatuses of the same type transmit/receive information to/from each other by short-range wireless communication and each handheld game apparatus executes an application such as a video game by using the information that has been obtained from another handheld game apparatus by the short-range wireless communication.

In such a conventional system described above, a handheld terminal apparatus is unable to obtain information by short-range wireless communication if no other communication apparatuses (no other handheld terminal apparatuses) to be a communication counterpart of the handheld terminal apparatus are present within a particular distance range from the handheld terminal apparatus, which distance range allows the short-range wireless communication to be performed (hereinafter, a "communicable range"). For example, in a situation where the handheld terminal apparatus is not widely used, or in an area of low population density such as a depopulated area, it is likely that the number of other handheld terminal apparatuses to be a communication counterpart of the handheld terminal apparatus is small within the communicable range of the short-range wireless communication.

In this case, the handheld terminal apparatus is unable to execute applications by using information that is obtained from other handheld terminal apparatuses. Thus, a wide variety of processes cannot be performed.

SUMMARY OF THE INVENTION

Therefore, an object of the present invention is to provide a computer-readable storage medium having an information processing program stored therein, a handheld terminal apparatus, a system, an information processing method, and a communication system that are capable of performing a wide variety of processes with applications even when no other communication apparatuses to be a communication counterpart of the handheld terminal apparatus are present within the communicable range of short-range wireless communication.

(1) In order to achieve the above-mentioned object, in one aspect of the present invention, a communication system includes a plurality of handheld terminal apparatuses. Each handheld terminal apparatus includes transmitting means, receiving means, obtaining means, and processing means. The transmitting means automatically transmits first data to another one of the handheld terminal apparatuses by short-range wireless communication. The receiving means automatically receives, by the short-range wireless communication, first data that is transmitted from transmitting means of said another one of the handheld terminal apparatuses. The obtaining means obtains second data based on an amount of movement of the handheld terminal apparatus. The processing means performs a predetermined process of an application, either by using the first data received by the receiving means or by using, instead of the first data, the second data obtained by the obtaining means.

The above configuration provides the same functions and effects as those described below in (2). In the present invention, the handheld terminal apparatuses transmit/receive the first data to/from each other. Accordingly, in an area where a large number of these handheld terminal apparatuses are present, each handheld terminal apparatus can obtain a large amount of first data from other handheld terminal apparatuses. However, in an area where not many of these handheld terminal apparatuses are present for the reason that, for example, they are not widely used in the area, it is highly difficult for each handheld terminal apparatus to obtain the first data. Each of these handheld terminal apparatuses, which are configured to transmit/receive the first data to/from each other, is also configured to perform the predetermined process of the application by using the second data instead of the first data. This makes it possible for each handheld terminal apparatus to perform a wide variety of processes with applications even in an area where not many of these handheld terminal apparatuses are present. Thus, the functions and effects, which are described below in (2), are provided effectively.

(2) In order to achieve the above-mentioned object, in one aspect of the present invention, an information processing program stored in a computer-readable storage medium causes a computer of a handheld terminal apparatus to act as communication means, obtaining means, and processing means. The communication means automatically receives first data from a communication apparatus by short-range wireless communication. The obtaining means obtains second data based on an amount of movement of the handheld terminal apparatus. The processing means performs a predetermined process of an application, either by using the first data received by the communication means or by using, instead of the first data, the second data obtained by the obtaining means. Examples of the computer-readable storage medium include, but not limited to, a volatile memory (e.g., RAM), nonvolatile memory (e.g., CD-ROM, DVD-ROM, ROM, flash memory, or memory card), or the like.

According to the above configuration, the processing means performs the predetermined process of the application by using the first data obtained by the communication means. The processing means also performs the predetermined process of the application by using, instead of the first data, the second data obtained by the obtaining means. Thus, even if the first data is not obtained by the communication means, the handheld terminal apparatus can perform the predetermined process of the application by using the second data which is based on the amount of movement of the handheld terminal apparatus. Accordingly, even when no information processing apparatus to be a communication counterpart of the handheld terminal apparatus is present within the communicable range of the short-range wireless communication, the handheld terminal apparatus can perform the predetermined process of the application by using the second data instead of the first data. This makes it possible for the handheld terminal apparatus to perform a wide variety of processes with applications.

The processing means performs the predetermined process of the application by using the second data which is based on the amount of movement of the handheld terminal apparatus. Here, the communication means obtains the first data by the short-range wireless communication. Therefore, in order to obtain a large amount of first data, the user needs to carry around the handheld terminal apparatus in order to increase the number of opportunities where the handheld terminal apparatus is located within the communicable range of the short-range wireless communication with a communication apparatus that is to be the source of first data. According to the above configuration, the second data is based on the amount of movement of the handheld terminal apparatus. Therefore, the handheld terminal apparatus can perform the predetermined process of the application in accordance with the amount of its movement when the handheld terminal apparatus is carried around by the user. In this manner, a situation similar to that in which the predetermined process of the application is performed using the first data can be created.

It should be noted that the first data is, for example, image data used in the predetermined process of the application, data that specifies the image data, sound data, program, or the like. The second data is variable data depending on the amount of movement of the handheld terminal apparatus. Examples of the second data include data that specifies a travel distance of the handheld terminal apparatus (hereinafter, referred to as "travel distance data"). The travel distance data is, for example, step count data which indicates the number of steps taken by the user. As an alternative, the obtaining means may have GPS functions or the like, and the travel distance data may indicate a travel distance of the handheld terminal apparatus that is obtained by the GPS functions. As a further alternative, the obtaining means may obtain, by using the communication means, positional information about a stationary communication apparatus through communication therewith. Then, the travel distance data may be generated by using the positional information. The predetermined process of the application may be any type of process as long as the process uses the first data or the second data.

(3) According to the information processing program, the communication means stores the received first data in a storage section of the handheld terminal apparatus; and the processing means performs the predetermined process by using the first data if the first data is stored in the storage section, and performs the predetermined process by using the second data if the first data is absent in the storage section. According to this configuration, if the communication means has obtained the first data, the predetermined process of the application is performed by using the first data in priority to the second data. Thus, in performing the predetermined process of the application, the second data is supplementarily used only in a case where a sufficient amount of first data is not obtained.

(4) According to the information processing program, the communication means stores the received first data in a storage section of the handheld terminal apparatus; and the processing means performs the predetermined process by using the first data if the first data is stored in the storage section, and performs the predetermined process by using the second data after using, for the predetermined process, the first data stored in the storage section. According to this configuration, the second data is used for performing the predetermined process only after the first data that has been received is used for performing the predetermined process. Thus, in performing the predetermined process of the application, the second data is supplementarily used only in a case where the use of the first data alone is insufficient to perform the predetermined process.

(5) According to the information processing program, the communication means automatically receives a plurality of pieces of the first data, and stores the plurality of pieces of the first data in the storage section; and the processing means performs the predetermined process by using the second data after using, for the predetermined process, all of the plurality of pieces of the first data stored in the storage section.

(6) The information processing program further causes the computer to act as detection means for detecting a step count of a user of the handheld terminal apparatus. The obtaining means obtains, as the second data, step count data which indicates the step count detected by the detection means. According to this configuration, since the handheld terminal apparatus is moved by the user carrying it around, the step count data which precisely indicates the amount of movement of the handheld terminal apparatus may be used instead of the first data in performing the predetermined process. Accordingly, a situation similar to that in which the predetermined process is performed using the first data can be created.

(7) The information processing program further causes the computer to act as: storing means for storing, in a storage section of the handheld terminal apparatus, the second data obtained by the obtaining means; invalidation means; and conversion means. The invalidation means either deletes or invalidates, among the second data stored in the storage section, second data that has been stored in the storage section for a predetermined period or longer. The conversion means converts the second data stored in the storage section into data that is storable in the storage section for a period longer than the predetermined period. The processing means performs the predetermined process by using, instead of the first data, the second data that has been converted by the conversion means into data that is storable in the storage section for a period longer than the predetermined period. According to this configuration, even though the second data is configured to be invalidated after the predetermined period has elapsed, the second data is converted into data that is storable in the storage section for a period longer than the predetermined period. As a result, the second data can be used in the predetermined process even if the predetermined period has elapsed. Thus, for example, the second data may be configured such that, for example, the second data is converted in the above manner in accordance with an instruction from the user. This makes it possible to cause the user to frequently operate the handheld terminal apparatus.

(8) According to the information processing program, the processing means performs the predetermined process a predetermined number of times during a predetermined period by using the second data. According to this configuration, the predetermined process using the second data is performed only the predetermined number of times during the predetermined period (e.g., only the predetermined number of times within one day). In this manner, the number of times the predetermined process using the second data is allowed to be performed is limited to the predetermined number of times. This makes it possible to prompt the user to obtain the first data by performing communication.

(9) According to the information processing program, the processing means generates, based on the second data, third data which is of the same type as the first data, and uses the third data in executing the application instead of the first data. Thus, data that is of the same type as the first data is generated by using the second data. The generated data is used in executing the application. It should be noted that if the first data is image data (e.g., a piece image in the first embodiment), the third data is also image data. Further, if the first data is data which specifies one piece of image data among a plurality of pieces of image data stored in the handheld terminal apparatus (e.g., piece information in the first embodiment), the third data is also data which specifies one piece of image data among the plurality of pieces of image data stored in the handheld terminal apparatus.

(10) According to the information processing program, the processing means generates fourth data by using either the first data or the second data, and uses the fourth data in executing the application. According to this configuration, the fourth data (e.g., character image data in the second embodiment) is generated by using the first data (e.g., character information in the second embodiment). That is, the fourth data is generated for temporary use in executing the application. Alternatively, the fourth data is generated by using the second data.

(11) The information processing program further causes the computer to act as first data generation means. The first data generation means generates, when the processing means executes the application for the first time, the first data and stores the first data in a storage section of the handheld terminal apparatus. The communication means transmits, by the short-range wireless communication, the first data stored in the storage section to another handheld terminal apparatus which is the communication apparatus, and receives the first data from said another handheld terminal apparatus, and stores the received first data in the storage section. According to this configuration, the first data is generated when the application is run for the first time. Accordingly, even if the first data is not originally stored in the storage section, the first data which is to be transmitted to said another handheld terminal apparatus is stored in the storage section when the application is run for the first time. As a result, the handheld terminal apparatus can transmit/receive the first data to/from said another handheld terminal apparatus by using the communication means.

(12) The information processing program further causes the computer to act as selection means. The selection means selects, in accordance with an input via an input section of the handheld terminal apparatus, either the first data that the first data generation means has stored in the storage section or the first data that the communication means has received from said another handheld terminal apparatus. The communication means transmits the first data selected by the selection means. This makes it possible to transmit, among a plurality of pieces of first data that include first data obtained by the communication means and first data generated by the first data generation means, first data selected by the user to said another handheld terminal apparatus.

(13) According to the information processing program, the application is a program for generating one piece of collection data that includes a predetermined number of two or more pieces of piece data, and the processing means performs a process of generating one piece of collection data as the predetermined process, by using the third data and/or the first data as the predetermined number of two or more pieces of piece data. According to this configuration, the handheld terminal apparatus can generate one piece of collection data by using, as piece data, the first data received by the communication means. Moreover, the handheld terminal apparatus can generate one piece of collection data by using, as piece data, the third data which is generated from the second data which is based on the amount of movement of the handheld terminal apparatus.

(14) According to the information processing program, the application is a program for generating a plurality of pieces of collection data for which different attributes are set, respectively. One among the respective different attributes set for the plurality of pieces of collection data is set for the first data and the third data. The processing means performs, as the predetermined process, a process of generating one of the pieces of collection data by using the first data and/or the third data for which the one attribute, which is the same attribute as that set for the one of the pieces of collection data, is set. Accordingly, the handheld terminal apparatus can generate pieces of collection data that are assigned different attributes, respectively. For example, the first data received by the handheld terminal apparatus is assigned a geographical area attribute that is associated with an apparatus that has generated the first data, and the third data generated by the handheld terminal apparatus is assigned a geographical area attribute that is associated with the handheld terminal apparatus. This allows the handheld terminal apparatus to obtain piece data, and thereby generate collection data, in accordance with the location of the handheld terminal apparatus.

(15) According to the information processing program, the processing means generates a plurality of pieces of the third data at different generation rates in association with the predetermined number of two or more pieces of piece data, respectively, such that the plurality of pieces of the third data that have been generated correspond to the predetermined number of two or more pieces of piece data, respectively. According to this configuration, some of the pieces of piece data that constitute collection data are difficult to obtain. Since there are pieces of piece data that are difficult to obtain, the level of difficulty in completing the collection data is increased. This makes it possible to provide the user with a game in which completing the collection data is highly amusing.

(16) According to the information processing program, the processing means sets, when generating the fourth data by using either the first data or the second data, an attribute for the fourth data, and performs, by using the fourth data, the predetermined process based on the attribute set for the fourth data. This configuration makes it possible to perform a process that depends on the attribute set for the fourth data, and thereby to perform a wide variety of processes. Examples of the attribute include a character name, color information, or the like which is contained in character information D20 described in the second embodiment. An example of the aforementioned feature, "perform a process that depends on the attribute", is that the process to be performed varies depending on whether or not the attribute satisfies an effective attack condition, as described in the second embodiment.

(17) In order to achieve the above-mentioned object, in one aspect of the present invention, a handheld terminal apparatus includes communication means, obtaining means, and processing means. The communication means automatically receives first data from a communication apparatus by short-range wireless communication. The obtaining means obtains second data based on an amount of movement of the handheld terminal apparatus. The processing means performs a predetermined process of an application, either by using the first data received by the communication means or by using, instead of the first data, the second data obtained by the obtaining means.

(18) In order to achieve the above-mentioned object, in one aspect of the present invention, a system including a handheld terminal apparatus includes communication means, obtaining means, and processing means. The communication means automatically receives first data from a communication apparatus by short-range wireless communication. The obtaining means obtains second data based on an amount of movement of the handheld terminal apparatus. The processing means performs a predetermined process of an application, either by using the first data received by the communication means or by using, instead of the first data, the second data obtained by the obtaining means.

(19) In order to achieve the above-mentioned object, in one aspect of the present invention, an information processing method performed by a handheld terminal apparatus includes the steps of receiving, obtaining, and processing. The receiving step is a step of receiving, automatically, first data from a communication apparatus by short-range wireless communication. The obtaining step is a step of obtaining second data based on an amount of movement of the handheld terminal apparatus. The processing step is a step of performing a predetermined process of an application, either by using the first data received at the receiving step or by using, instead of the first data, the second data obtained at the obtaining step.

(20) In order to achieve the above-mentioned object, in one aspect of the present invention, a communication system includes a handheld terminal apparatus and a communication apparatus configured to communicate with the handheld terminal apparatus. The handheld terminal apparatus includes communication means, obtaining means, and processing means. The communication means automatically receives first data from the communication apparatus by short-range wireless communication. The obtaining means obtains second data based on an amount of movement of the handheld terminal apparatus. The processing means performs a predetermined process of an application, either by using the first data received by the communication means or by using, instead of the first data, the second data obtained by the obtaining means.

The apparatus, method, and system described above in (17) to (20) provide the same functions and effects as those provided by the computer-readable storage medium described above in (2).

According to each of the above aspects, even when the handheld terminal apparatus cannot receive the first data since no communication apparatus to be a communication counterpart of the handheld terminal apparatus is present within the communicable range of the short-range wireless communication, the handheld terminal apparatus can obtain the second data and use the second data in executing the application. Therefore, the handheld terminal apparatus can perform a wide variety of processes.

Essentially, an effective way for the user of the handheld terminal apparatus to increase the chances to obtain the first data from communication apparatuses is to carry around the handheld terminal apparatus. In this manner, the user of the handheld terminal apparatus can effectively increase the chances to pass users of communication apparatuses within such a short distance as to be able to perform the short-range wireless communication. That is, the greater the amount of movement of the handheld terminal apparatus, the greater the amount of the first data obtained. According to each of the above aspects, instead of the first data, the second data based on the amount of movement of the handheld terminal apparatus is used for performing the predetermined process. Therefore, a situation similar to that in which the first data is obtained from a communication apparatus by the short-range wireless communication can be created. This allows the user to experience amusement that is similar to one that the user would experience when the handheld terminal apparatus obtains the first data from a communication apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows the contents of main data D4a according to a second embodiment;

FIG. 22A shows an example of character information D20 and to-be-exchanged character information D21;

FIG. 22B shows an example of data stored in a hero information storage area 330;

FIG. 22C shows an example of a hero level table T1;

FIG. 23 shows an example of data stored in an enemy information storage area 331;

FIG. 24A shows an example of enemy information D27;

FIG. 24B shows an example of enemy information table T2;

FIG. 24C shows an example of an effective attack condition table 13;

DESCRIPTION OF THE PREFERRED EMBODIMENTS

First Embodiment

Figure 1:
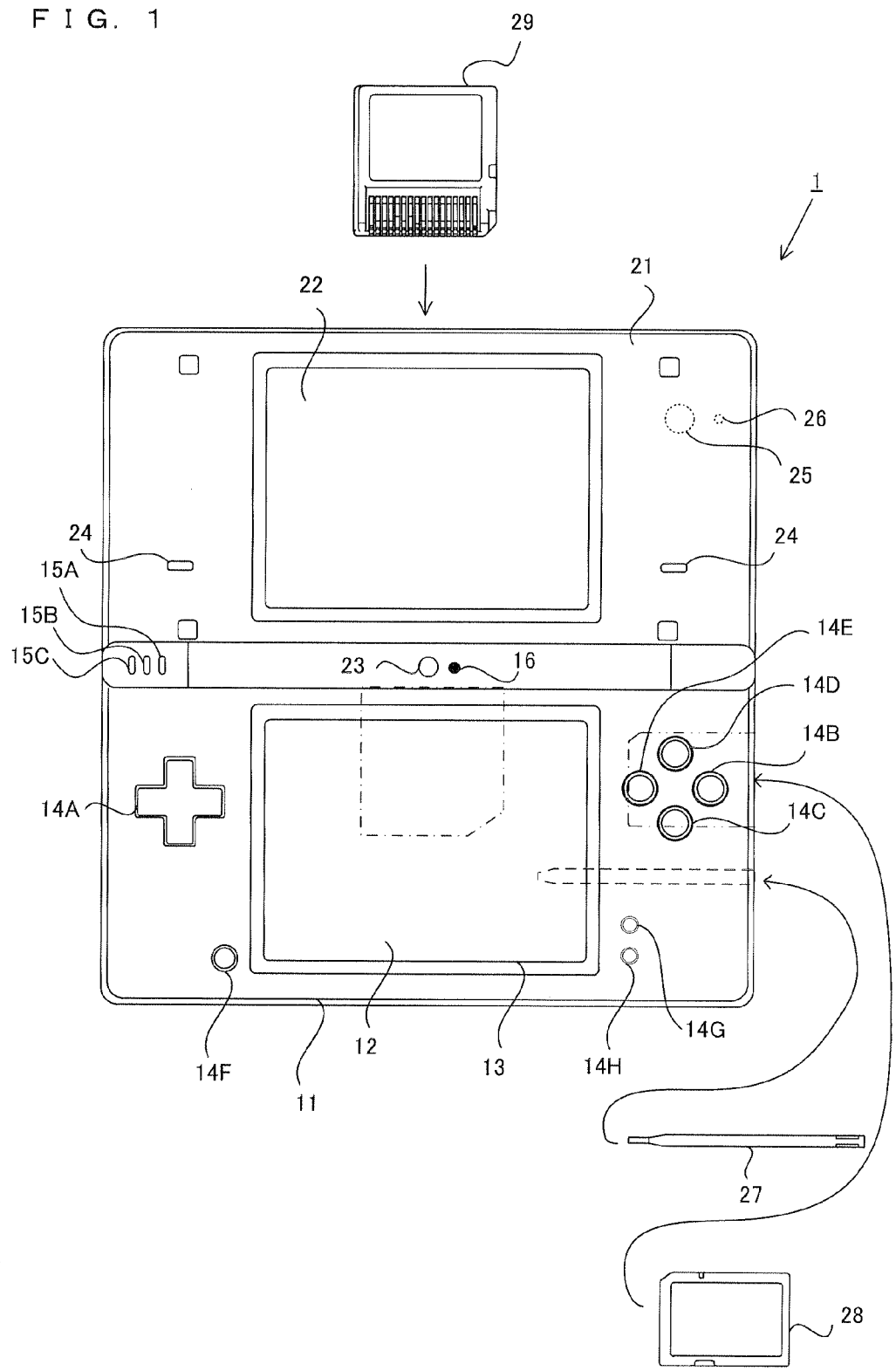
FIG. 1 is an external view of a game apparatus included in a system of an embodiment of the present invention.

A first embodiment of the present invention is an example of an embodiment in which a handheld terminal apparatus of the present invention is applied as a handheld game apparatus. The game apparatus forms a communication system together with another game apparatus of the same type (which is an example of another communication apparatus of the present invention). The game apparatus performs short-range wireless communication with the other game apparatus, thereby receiving information from the other game apparatus. The game apparatus then uses the received information (i.e., first data of the present invention) to perform predetermined processes of applications. The more the amount of data received in this manner, the greater is the variety of predetermined processes performed. The applications and the predetermined processes executed in the present embodiment will be described below.

The game apparatus as described above can receive information only from a game apparatus that is located within the communicable range of the short-range wireless communication. For this reason, in order for the game apparatus to receive a large amount of information from other game apparatuses, it is crucial that the user carries around the game apparatus (moves around with the game apparatus) to have many opportunities where the game apparatus is located at such a position that the game apparatus can perform the short-range wireless communication with other game apparatuses (i.e., opportunities where the game apparatus passes other game apparatuses).

However, in an area where the game apparatus is not widely used or in an area of low population density, the number of opportunities for the game apparatus to pass other game apparatuses is small even if the user carries around the game apparatus. Therefore, the game apparatus may fall into a situation where the game apparatus cannot receive information from other game apparatuses, and as a result, the game apparatus cannot perform a wide variety of processes using received information. In this case, the user is unable to enjoy the amusement of receiving, with his/her game apparatus, information from other game apparatuses by passing the other game apparatuses.

An object of the present embodiment is to allow a user of the game apparatus to have a simulated experience in which the user enjoys similar amusement to that mentioned above even if the game apparatus is located in an area where the number of opportunities for the game apparatus to pass other game apparatuses is small. In order to achieve this object, when the user carrying the game apparatus moves around, the game apparatus obtains data based on the amount of movement of the game apparatus during a predetermined period (i.e., second data of the present invention) and performs a wide variety of predetermined processes in accordance with the amount of the movement. Accordingly, the more the user carrying the game apparatus moves, the greater is the variety of predetermined processes performed. In this manner, the user can enjoy a simulated experience as if the game apparatus had passed other game apparatuses and obtained information from the other game apparatuses.

The amount of movement of the game apparatus can be detected in various ways. In the present embodiment, the number of steps the user has taken (i.e., a step count) is obtained by using an accelerometer that is included in the game apparatus. Data indicating the step count is used as data that corresponds to the amount of movement of the game apparatus. In the present embodiment, the game apparatus detects the user's step count. However, a step count measuring device provided separately from the game apparatus may be used to detect the user's step count. Alternatively, instead of measuring a step count, the game apparatus provided with GPS functions may obtain and store its location every predetermined period, and use the location to obtain a travel distance of the game apparatus. Then, the travel distance may be used as the amount of movement of the game apparatus. Further alternatively, the game apparatus may communicate with an access point to obtain and store the location of the access point, and obtain a travel distance of the game apparatus by setting the location of the access point as the location of the game apparatus. Then, the travel distance may be used as the amount of movement of the game apparatus. Hereinafter, the present embodiment is described in detail with reference to the drawings.

FIG. 1 is an external view of the game apparatus included in the communication system according to the first embodiment. FIG. 1 shows a game apparatus 1 which is a foldable handheld game apparatus. FIG. 1 shows the game apparatus 1 in an opened state. The game apparatus 1 is in a size that allows the user to hold it with one or both hands even when the game apparatus 1 is in the opened state.

The game apparatus 1 includes a lower housing 11 and an upper housing 21. The lower housing 11 and the upper housing 21 are connected to each other in a manner that allows them to be opened and closed (i.e., foldable). In the example of FIG. 1, the lower housing 11 and the upper housing 21 are each formed in a plate-like shape of a horizontally long rectangle, and are rotatably connected at their longer sides. Normally, the user uses the game apparatus 1 in the opened state. When not using the game apparatus 1, the user keeps the game apparatus 1 in the closed state.

The lower housing 11 includes a lower LCD (Liquid Crystal Display) 12. The lower LCD 12 has a horizontally long shape, and is disposed such that the orientation of the longer sides thereof coincides with the orientation of the longer sides of the lower housing 11. Although the LCD is used as a display device that is incorporated in the game apparatus 1 in the present embodiment, any other display device, such as a display device using EL (Electro Luminescence), may be used, for example. In the game apparatus 1, a display device having any resolution may be used.

The lower housing 11 includes operation buttons 14A to 14K and a touch panel 13 as input devices. As shown in FIG. 1, a direction input button 14A, an operation button 14B, an operation button 14C, an operation button 14D, an operation button 14E, a power button 14F, a start button 14G, and a select button 14H among the operation buttons 14A to 14K are provided at an inner main surface of the lower housing 11, which inner main surface is, when the upper housing 21 and the lower housing 11 are closed, accommodated within the game apparatus 1. The direction input button 14A is used for a selection operation, for example. The operation buttons 14B to 14E are used for a determination operation, a cancellation operation, and the like. The power button 14F is used to power ON/OFF the game apparatus 1. In the example of FIG. 1, the direction input button 14A and the power button 14F are provided at the inner main surface of the lower housing 11, so as to be located to the right or left (to the left, in FIG. 1) of the lower LCD 12 which is provided around the center of the inner main surface. The operation buttons 14B to 14E, the start button 14G, and the select button 14H are provided at the inner main surface of the lower housing 11, so as to be located to the other side (to the right, in FIG. 1) of the lower LCD 12. The direction input button 14A, the operation buttons 14B to 14E, the start button 14G, and the select button 14H are used for performing various operations with the game apparatus 1.

The operation buttons 14I to 14K are not shown in FIG. 1. For example, the operation button 14I which is an L-button is provided at the left end of an upper side surface of the lower housing 11, and the operation button 14J which is an R-button is provided at the right end of the upper side surface of the lower housing 11. The game apparatus 1 further includes the touch panel 13 as another input device in addition to the operation buttons 14A to 14K. The touch panel 13 is mounted so as to cover the screen of the lower LCD 12. In the present embodiment, a resistive film type touch panel is used as the touch panel 13, for example. However, the touch panel 13 is not limited to the resistive film type touch panel, but may be any press-type touch panel. The touch panel 13 used in the present embodiment has the same resolution (detection accuracy) as that of the lower LCD 12, for example. However, the resolution of the touch panel 13 and that of the lower LCD 12 need not be the same. An insertion opening (indicated by a dashed line in FIG. 1) is provided in a right side surface of the lower housing 11. The insertion opening can accommodate a stylus pen 27 which is used for operating the touch panel 13.

An insertion opening (indicated by a two-dot chain line in FIG. 1) for accommodating a memory card 28 is also provided in the right side surface of the lower housing 11. Inside the insertion opening, a connector (not shown) is provided for electrically connecting the game apparatus 1 and the memory card 28. The memory card 28 is, for example, an SD (Secure Digital) memory card, and detachably attached to the connector. The memory card 28 is used, for example, for storing (saving) an image captured by the game apparatus 1, and for loading an image generated by another apparatus into the game apparatus 1.

Further, an insertion opening (indicated by a dashed-dotted line in FIG. 1) for accommodating a cartridge 29 is provided in the upper side surface of the lower housing 11. Inside the insertion opening, a connector (not shown) is provided for electrically connecting the game apparatus 1 and the cartridge 29. The cartridge 29 is a storage medium which has a game program or the like stored therein, and the cartridge 29 is detachably inserted into the insertion opening provided in the lower housing 11. Three LEDs 15A to 15C are mounted at the left side of the connection between the lower housing 11 and the upper housing 21.

The upper housing 21 includes an upper LCD 22. The upper LCD 22 has a horizontally long shape, and is disposed such that the orientation of the longer sides thereof coincides with the orientation of the longer sides of the upper housing 21. Similar to the lower LCD 12, a display device of any type different from that of the upper LCD 22, or a display device having any resolution different from that of the upper LCD 22, may be used in place of the upper LCD 22. A touch panel may be provided so as to cover the upper LCD 22. The upper LCD 22 displays, for example, an operation explanation screen for teaching the user the roles of the operation buttons 14A to 14K and the touch panel 13.

The upper housing 21 includes two cameras (the inner camera 23 and the outer camera 25). As shown in FIG. 1, the inner camera 23 is mounted at an inner main surface of the upper housing 21, in the vicinity of the aforementioned connection. On the other hand, the outer camera 25 is mounted at a surface reverse of the inner main surface where the inner camera 23 is mounted, that is, at the outer main surface of the upper housing 21 (which serves as an external surface of the game apparatus 1 when the game apparatus 1 is in the closed state and which is the back surface of the upper housing 21 shown in FIG. 1).

A microphone (a microphone 41 shown in FIG. 2) which acts as a sound input device is accommodated inside the inner main surface of the upper housing 21, near the aforementioned connection. Also, in the inner main surface of the upper housing 21, near the connection, a microphone hole 16 is formed so as to allow the microphone 41 to detect a sound outside the game apparatus 1. The position in which the microphone 41 is accommodated and the position of the microphone hole 16 need not be located near the connection. At the outer main surface of the upper housing 21, a fourth LED 26 (indicated by a dashed line in FIG. 1) is mounted. The fourth LED 26 is lit up at the time when image capturing is performed by the outer camera 25 (i.e., when the shutter button is pressed). In the inner main surface of the upper housing 21, sound holes 24 are formed to the right and left of the upper LCD 22, respectively, which upper LCD 22 is provided around the center of the inner main surface. Loudspeakers are accommodated in the upper housing 21 at the back of the sound holes 24, respectively.

Figure 2:
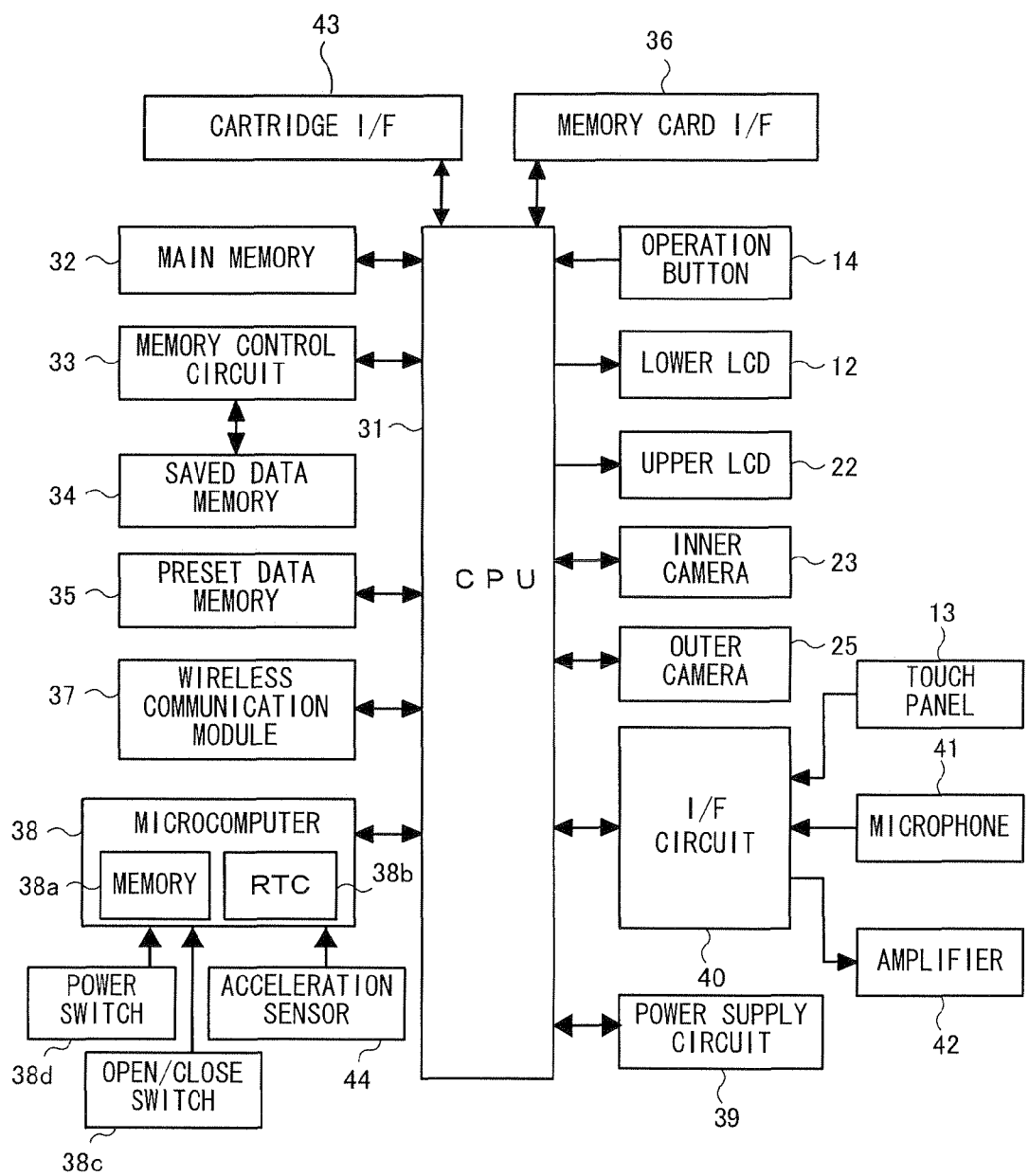
FIG. 2 is a block diagram showing an example of an internal configuration of the game apparatus.

Next, an internal configuration of the game apparatus 1 is described with reference to FIG. 2. FIG. 2 is a block diagram showing an example of the internal configuration of the game apparatus 1.

As shown in FIG. 2, the game apparatus 1 includes electronic components such as a CPU (Central Processing Unit) 31, a main memory 32, a memory control circuit 33, a saved data memory 34, a preset data memory 35, a memory card interface (memory card I/F) 36, a wireless communication module 37, a microcomputer 38, an open/ close switch 38c, a power switch 38d, a power supply circuit 39, an interface circuit (I/F circuit) 40, a cartridge interface (cartridge I/F) 43, an acceleration sensor 44, and the like. These electronic components are mounted on an electronic circuit board and accommodated in the lower housing 11 (or in the upper housing 21).

The CPU 31 is information processing means for executing predetermined programs (including an information processing program of the present invention). In the present embodiment, predetermined programs are stored in an internal memory of the game apparatus 1 (e.g., the saved data memory 34) as well as in the memory card 28 and/or the cartridge 29. The CPU 31 executes such predetermined programs to perform predetermined processes including a piece collection process described below. Programs to be executed by the CPU 31 may be stored in advance in an internal memory of the game apparatus 1, or may be obtained from the memory card 28 and/or the cartridge 29, or may be obtained from another apparatus through communication therewith. For example, a program may be obtained by means of downloading via the Internet from a predetermined server, or may be obtained by downloading a predetermined program from a stationary game apparatus through communication with the stationary game apparatus which stores the predetermined program.

The main memory 32, the memory control circuit 33, and the preset data memory 35 are connected to the CPU 31. The saved data memory 34 is connected to the memory control circuit 33. The main memory 32 is storage means used as a work area and a buffer area for the CPU 31. In other words, the main memory 32 stores various data used by the aforementioned predetermined programs, and also stores a program obtained from the outside (e.g., from the memory card 28, the cartridge 29, another apparatus, or the like). In the present embodiment, a PSRAM (Pseudo-SRAM) is used as the main memory 32, for example. The saved data memory 34 is structured as a nonvolatile storage medium. In the present embodiment, the saved data memory 34 is structured as a NAND flash memory, for example. The memory control circuit 33 controls, in accordance with instructions from the CPU 31, reading and writing of data from and into the saved data memory 34. The preset data memory 35 is storage means for storing data (preset data), such as various parameters preset in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads and writes data from and into the memory card 28 attached to the connector, in accordance with instructions from the CPU 31. The cartridge I/F 43 is connected to the CPU 31. The cartridge I/F 43 reads and writes data from and into the cartridge 29 attached to the connector, in accordance with instructions from the CPU 31. In the present embodiment, an application program executable by the game apparatus 1 (a piece collection application in the present embodiment) is read from the cartridge 29 to be executed by the CPU 31, and data relating to the application program (e.g., saved data of a game) is written into the cartridge 29.

The wireless communication module 37 has a function of connecting to a wireless LAN, for example, by a method compliant with the standard of IEEE802.11b/g. The wireless communication module 37 performs short-range wireless communication of which the data transmission distance is within a range of 10 m, for example. Radio waves used in the wireless communication are, for example, weak radio waves, the use of which does not require a radio station license. The wireless communication module 37 is connected to the CPU 31. The CPU 31 is capable of transmitting/receiving data to/from another apparatus via the Internet (or without using the Internet) by means of the wireless communication module 37. For example, the CPU 31 can obtain information from an access point by performing the wireless communication with the access point.

The CPU 31 is capable of transmitting/receiving data to/from another game apparatus that is of the same type as the game apparatus 1 by using the wireless communication module 37. For example, the CPU 31 is capable of such data transmission/reception when a distance between the location of the game apparatus 1 and the location of this other game apparatus is within the communicable range (e.g., when the distance is equal to or shorter than 10 m). In the present embodiment, the CPU 31 of the game apparatus 1 (game apparatus 1A) automatically performs communication with another game apparatus (game apparatus 1B) when the game apparatus 1B is located within the communicable range, thereby automatically performing data transmission/reception with the game apparatus 1B (hereinafter, such communication is referred to as "passing communication"). In the present embodiment, the game apparatus 1A can obtain information stored in the game apparatus 1B through the "passing communication" (e.g., piece information described below). Also, the game apparatus 1A can provide information stored therein (e.g., piece information described below) to the game apparatus 1B through the "passing communication". The piece information will be described below in detail.

The "passing communication" is performed only when both of the game apparatuses 1A and 1B are in a "passing communication mode". The "passing communication mode" is set, for example, when the user closes the game apparatus 1 after the user has selected the "passing communication mode" through an operation of the operation buttons 14A to 14K or the touch panel 13. When the "passing communication mode" is set for the game apparatus 1A, the game apparatus 1A enters a sleep mode (power saving mode), which is described below, and automatically and continuously searches for another game apparatus (game apparatus 1B). Then, the game apparatus 1A automatically performs communication (passing communication) with the game apparatus 1B, which has been found as a result of the search, and automatically disconnects the connection when the communication has been completed. Thereafter, the game apparatus 1A searches for another game apparatus 1B and repeats the same processing as described above.

The microcomputer 38 is connected to the CPU 31. The microcomputer 38 includes a memory 38a and an RTC 38b. The memory 38a is structured as a RAM, for example. A program to be executed by the microcomputer 38 and data necessary for the execution of the program are read from the memory card 28, the cartridge 29, the saved data memory 34, or the like and then stored in the memory 38a. The RTC 38b counts time, and outputs the time to the microcomputer 38. For example, the microcomputer 38 is capable of calculating the current date, current time, and the like based on the time counted by the RTC 38b.

The open/close switch 38c and the power switch 38d are connected to the microcomputer 38. The open/close switch 38c is ON when the game apparatus 1 is opened (i.e., in the opened state), and is OFF when the game apparatus 1 is closed (i.e., in the closed state). Signals indicating such ON and OFF are inputted into the microcomputer 38. The power switch 38d is a switch for turning ON or OFF the main power supply to the game apparatus 1. If the power switch 38*d* is turned OFF when the main power supply to the game apparatus 1 is ON, then the microcomputer 38 instructs the power supply circuit 39 to cease power supply to all the circuit components except for the microcomputer 38. The power supply circuit 39 controls power that is supplied from a power source (typically a battery accommodated in the lower housing 11) of the game apparatus 1, thereby supplying the power to the components of the game apparatus 1.

If the power switch 38*d* is turned ON when the main power supply to the game apparatus 1 is OFF, then the memory 38*a*, which also acts as a boot ROM of the microcomputer 38, is started. In this case, the microcomputer 38 controls the power supply in accordance with ON and OFF of the open/close switch 38*c* (i.e., in accordance with the opened state and the closed state of the game apparatus 1). To be specific, when the open/close switch 38*c* is OFF (i.e., when the game apparatus 1 is in the closed state), the microcomputer 38 performs a process of controlling the power supply in a sleep mode where the power is supplied to limited components of the game apparatus 1 via the power supply circuit 39 (this process is hereinafter referred to as a "sleep process"). In the present embodiment, the limited components are, for example, the CPU 31, the wireless communication module 37, and the like. Accordingly, even in the sleep mode, the above-described "passing communication" and the like can be performed by means of the wireless communication module 37. It should be noted that, in the present embodiment, the CPU 31 does not perform application execution in the sleep mode.

If the game apparatus 1 in sleep state is to store information that the game apparatus 1 has received when in sleep state by means of the wireless communication module 37 or to read information for transmission, the wireless communication module 37 instructs to start the clock operation of the CPU 31, which has been ceased. Thereafter, the wireless communication module 37 instructs the CPU 31 to start performing communication. Subsequently, the CPU 31 gives instructions to the microcomputer 38 such that power supply to the memory control circuit 33 and the saved data memory 34 is started. As a result, the game apparatus 1 becomes able to transmit data stored in the saved data memory 34 to another game apparatus 1 by the "passing communication", and store data received from another game apparatus 1 in the saved data memory 34.

Further, in the sleep mode, the microcomputer 38 executes a step count measuring program to perform, by means of the acceleration sensor 44 described below, a process of measuring the user's step count (step count measuring process). The microcomputer 38 stores step count data indicating the measured step count in the saved data memory 34 for every predetermined period. In order to perform the storing of the step count data, the microcomputer 38 instructs to start the clock operation of the CPU 31, which has been ceased. Thereafter, the CPU 31 gives instructions to the microcomputer 38 such that power supply to the memory control circuit 33 and the saved data memory 34 is started. As a result, the game apparatus 1 becomes able to store the step count data in the saved data memory 34. The step count measuring process will be described below in detail with reference to FIG. 16.

When the game apparatus 1 is opened (i.e., enters the opened state) and the open/close switch 38*c* is turned ON, accordingly, the microcomputer 38 cancels the sleep mode to enter the normal mode, and then instructs the power supply circuit 39 to start power supply to all the circuit components.

The acceleration sensor 44 is connected to the microcomputer 38. The acceleration sensor 44 is a triaxial acceleration sensor, for example. The acceleration sensor 44 is provided within the lower housing 11, for example. Alternatively, the acceleration sensor 44 may be provided within the upper housing 22. The acceleration sensor 44 detects acceleration in two directions that are orthogonal to each other. One of the two directions is perpendicular to the surface of the lower LCD 12 (the upper LCD 22 in a case where the acceleration sensor 44 is provided within the upper housing 21) of the game apparatus 1, and the other direction is in parallel to the surface of the lower LCD 12 (the upper LCD 22 in a case where the acceleration sensor 44 is provided within the upper housing 21). The acceleration sensor 44 outputs signals indicative of the detect acceleration (acceleration signals) to the microcomputer 38. Based on the acceleration signals, the microcomputer 38 detects the orientation of the game apparatus 1 and the magnitude of vibration exerted on the game apparatus 1.

The game apparatus 1 includes the microphone 41 and an amplifier 42. The microphone 41 and the amplifier 42 are connected to the I/F circuit 40. The microphone 41 detects a voice that is uttered by the user in the direction of the game apparatus 1, and outputs sound signals indicative of the voice to the I/F circuit 40. The amplifier 42 amplifies sound signals from the I/F circuit 40, and causes the loudspeakers (not shown) to output the amplified signals. The I/F circuit 40 is connected to the CPU 31.

The touch panel 13 is connected to the I/F circuit 40. The I/F circuit 40 includes a sound control circuit for controlling the microphone 41 and the amplifier 42 (i.e., the loudspeakers), and includes a touch panel control circuit for controlling the touch panel 13. The sound control circuit performs A/D conversion and D/A conversion of a sound signal, and also, converts a sound signal into sound data in a predetermined format. The touch panel control circuit generates touch position data in a predetermined format based on a signal from the touch panel 13, and outputs the touch position data to the CPU 31. For example, the touch position data indicates coordinates of a position on an input surface of the touch panel 13, at which position an input has been performed. The touch panel control circuit reads a signal from the touch panel 13 and generates touch position data once in every predetermined period. By obtaining the touch position data via the I/F circuit 40, the CPU 31 can recognize a position on the touch panel 13, at which position an input has been performed.

Operation buttons 14 include the above-described operation buttons 14A to 14K, and are connected to the CPU 31. The operation buttons 14 output, to the CPU 31, operation data indicating input states of the operation buttons 14A to 14K (i.e., indicating whether or not the operation buttons 14A to 14K are being pressed). The CPU 31 obtains the operation data from the operation buttons 14, and thereby performs processing in accordance with the inputs that have been performed via the operation buttons 14.

The inner camera 23 and the outer camera 25 are connected to the CPU 31. Each of the inner camera 23 and the outer camera 25 captures an image in accordance with an instruction from the CPU 31, and outputs data of the captured image to the CPU 31. The lower LCD 12 and the upper LCD 22 are connected to the CPU 31. The lower LCD 12 and the upper LCD 22 each display an image in accordance with an instruction from the CPU 31.

Figure 3:
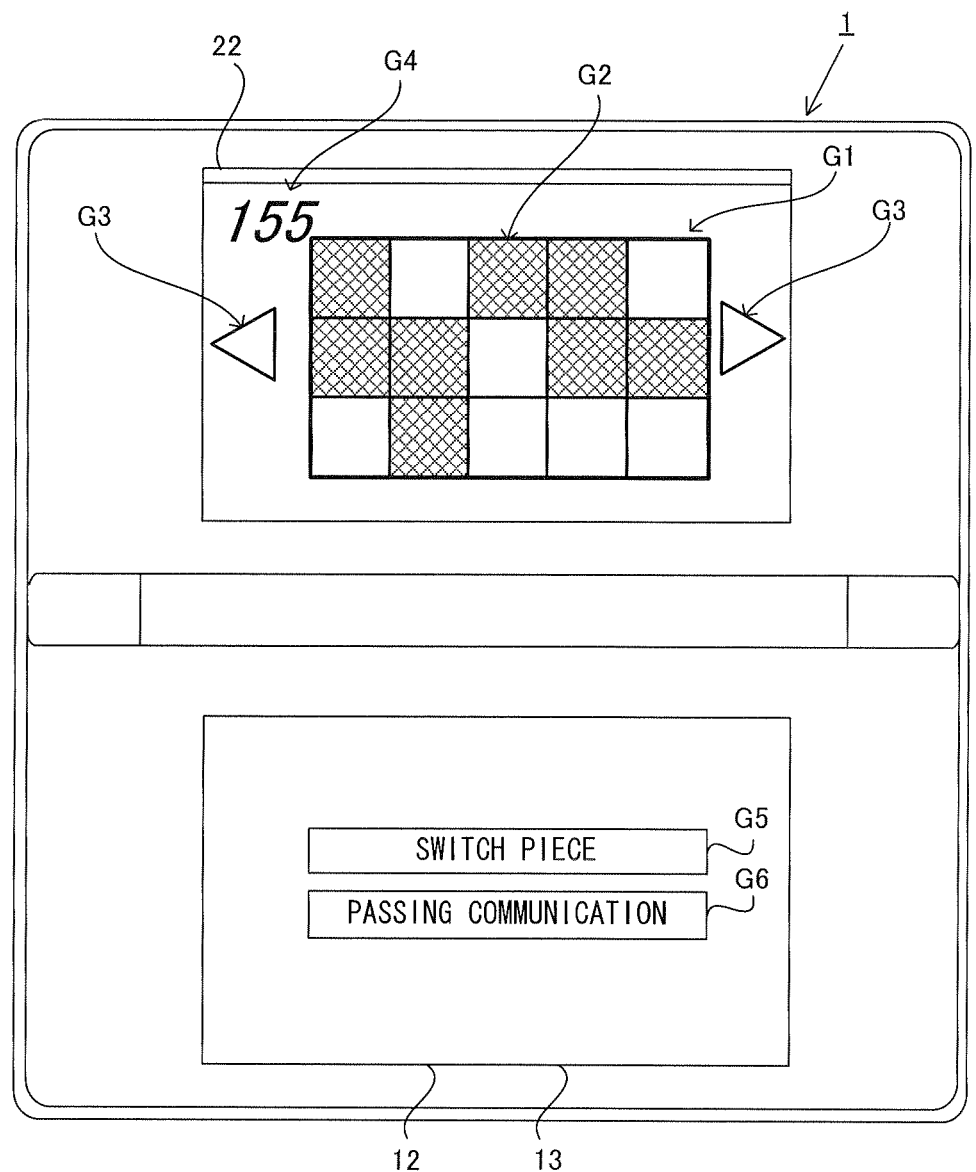
FIG. 3 shows an example of a main screen and an operation screen that are displayed for a piece collection game.

Described next with reference to FIG. 3 is a piece collection game which is provided to the user when the game apparatus 1 executes the piece collection application. FIG. 3 shows an example of a main screen and an operation screen that are displayed during the piece collection game. The main screen and the operation screen are displayed when the piece collection application has started. The main screen is displayed on the upper LCD 22, and the operation screen is displayed on the lower LCD 12. The main screen shows: a plurality of piece images G2 that result from dividing one collection image G1; guide arrows G3; and an owned coin count G4.

The collection image G1 shows some kind of picture. A plurality of types of such collection images G1 (e.g., 6 types) are prepared. An attribute indicating, for example, a geographical area (e.g., the Japanese capital area, Kinki area, Tokai area, or the like) is set for each of the plurality of types of collection images G1. For example, each collection image G1 shows a picture that shows the corresponding attribute (e.g., a picture that shows tourist attractions in an area specified by the corresponding attribute). Although the plurality of types of collection images G1 are prepared, only one collection image G1 is displayed on the main screen.

The piece images G2 result from dividing one collection image G1 into a predetermined number of pieces. The main screen displays a collection image G1 which is a combination of piece images G2 obtained by the game apparatus 1. In the example of FIG. 3, a total of eight piece images G2 have been obtained by the game apparatus 1, and FIG. 3 shows an incomplete collection image G1, which is a combination of these eight piece images G2.

The guide arrows G3 that are two guide arrows are displayed to the right and left of the collection image G1, respectively. These arrows G3 are images that guide the user to perform an operation of switching the collection image G1 to be displayed on the main screen. For example, the user is guided by these arrows G3 to press the L-button or R-button. In response, the game apparatus 1 switches the collection image G1 displayed on the main screen.

In the piece collection game of the present embodiment, the user uses a plurality of piece images G2 to complete one collection image G1 like a puzzle. In other words, in this game, the user obtains (collects), by means of the game apparatus 1, a predetermined number of piece images G2 (e.g., three piece images to be arranged vertically×five piece images to be arranged laterally=15 piece images in total) for each predetermined type of collection image G1. The game apparatus 1 can generate each type of collection image G1, which is completed by combining piece images G2 that have been collected. When the game apparatus 1 runs the piece collection application for the first time (i.e., when the piece collection application is installed on the game apparatus 1 and executed for the first time), the game apparatus 1 owns just one or a few piece images G2. Starting from such a situation, the user collects, by means of the game apparatus 1, a sufficient number of piece images G2 to complete the collection image G1 of each predetermined type.

One of the collection methods of piece images G2 is one in which the game apparatus 1 obtains piece images G2 by performing the "passing communication" with other game apparatuses 1. The "passing communication" is short-range wireless communication. Accordingly, if the user carries around the game apparatus 1, the game apparatus 1 has many opportunities in which the game apparatus 1 is located at such a close distance from another game apparatus 1 that the game apparatus 1 and this other game apparatus 1 can perform the short-range wireless communication therebetween. This allows the game apparatus 1 to collect a large number of piece images (i.e., a wide variety of pieces). Through the "passing communication", the game apparatus 1 can not only obtain piece images G2 from other game apparatuses 1, but also transmit information about piece images G2 that have been obtained by the game apparatus 1 to other game apparatuses 1, thereby allowing the other game apparatuses 1 to obtain the piece images G2.

It should be noted that, in the present embodiment, the game apparatus 1 may store, in advance, piece images G2 for all the collection images G1. Among the stored piece images G2, the game apparatus 1 can use, as obtained images, images for which the game apparatus 1 has obtained a permission to use. In the "passing communication", the game apparatus 1 and another game apparatus 1 transmit to/receive from each other pieces of piece information each of which specifies one piece image G2, and each game apparatus 1 processes, as an obtained piece image G2, one of the piece images G2 stored therein that is specified by the received piece information. Although a phrase "transmit or receive piece images G2" is occasionally used herein, this phrase refers not to the game apparatus 1 and another game apparatus 1 transmitting/receiving piece images G2 to/from each other, but to the game apparatus 1 and another game apparatus 1 transmitting/receiving piece information to/from each other.

Next, the operation screen is described. As shown in FIG. 3, while the upper LCD 22 is displaying the main screen, the lower LCD 12 displays the operation screen. The operation screen shows a piece switching operation button G5 and a passing communication operation button G6. When the user touches the piece switching operation button G5, the game apparatus 1 allows the user to select a piece image G2 to be transmitted to other game apparatuses 1. When the user touches the passing communication operation button G6, the game apparatus 1 enters the passing communication mode in order to transmit piece information about the piece image G2 selected by the user to other game apparatuses 1. In the passing communication mode, the game apparatus 1 automatically and cyclically searches for another game apparatus 1 that is located within the communicable range of the short-range wireless communication, and if another game apparatus is found, transmits/receives piece information to/from this other game apparatus 1.

Next, the second collection method of piece images G2, which is a feature of the present embodiment, is described. In the second collection method of piece images G2, the user carrying the game apparatus 1 walks to move the game apparatus 1, and based on the amount of the movement, the game apparatus 1 obtains piece images G2. To be specific, in the present embodiment, the game apparatus 1 acts as a pedometer. When the user carrying the game apparatus 1 walks, the game apparatus 1 obtains the user's step count and converts the step count into game coins. The owned coin count G4 shown in the main screen is an image indicating the number of game coins owned by the user.

Further, in the present embodiment, the user can use his/her own coins to convert them into piece images G2 to own. Accordingly, in the present embodiment, a number of piece images G2, which number corresponds to the amount of movement of the game apparatus 1, can be obtained. Therefore, even in a case where the number of opportunities for the game apparatus 1 to perform the "passing communication" with other game apparatuses 1 is small, for example, a case where the user is in an area in which the game apparatus 1 is not widely used or in an area of low population density, the user can still increase the number of owned piece images G2 by carrying around the game apparatus 1. Thus, the user can experience similar amusement to that the user experiences when performing the "passing communication" with other game apparatuses 1. Moreover, even if the game apparatus 1 cannot perform the "passing communication" with other game apparatuses 1, the number of owned piece images G2 can be increased, and thus a collection image G1 can be completed.

It should be noted that, in the present embodiment, only in a case where the game apparatus 1 is unable to obtain any piece images G2 from other game apparatuses 1 by the "passing communication" or where, although the game apparatus 1 has obtained piece images G2, there is still an incomplete collection image G1 even after using the piece images G2 that have been obtained, the user can purchase piece images G2 by using the coins owned by the user. In other words, the game apparatus 1 allows the user to purchase piece images by using the user's own coins, only as a supplementary method of obtaining piece images G2 if the "passing communication" alone is insufficient to obtain piece images G2.

Figures 4, 5A, 5B, 5C, 5D:
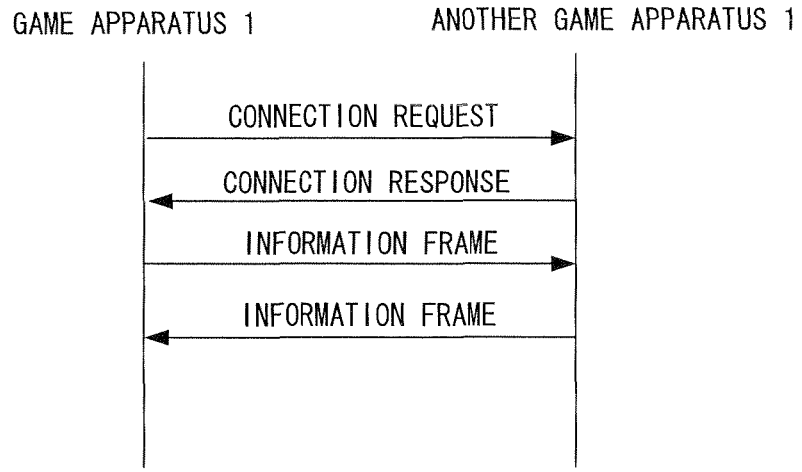
FIG. 4 is a communication sequence diagram showing an example of a passing communication process.
FIG. 5A shows an example of a connection request frame D1.
FIG. 5B shows an example of a connection response frame D2.
FIG. 5C shows an example of an information frame D3.
FIG. 5D shows an example of main data D4 contained in the information frame D3.

Hereinafter, the "passing communication" performed in the present embodiment is briefly described with reference to FIG. 4 to FIG. 5D. FIG. 4 is a communication sequence diagram showing an example of a passing communication process. The game apparatus 1 transmits, by broadcast communication, a beacon frame (a connection request frame D1 described below with reference to FIG. 5A) to another game apparatus 1 that is located within the above-described communicable range. Upon receiving the connection request frame D1, the other game apparatus 1 transmits a connection response frame D2 (which will be described below with reference to FIG. 5B) to the game apparatus 1 which is the source of the connection request frame D1.

Upon receiving the connection response frame D2, the game apparatus 1 transmits, to the other game apparatus 1, an information frame D3 containing piece information (which will be described below with reference to FIGS. 5C and 5D). Upon receiving the information frame D3, the other game apparatus 1 transmits to the game apparatus 1 an information frame D3 that the other game apparatus has generated. In the present embodiment, such a series of communication is repeated at a predetermined cycle. It should be noted that in a case where the game apparatus 1 receives a connection request frame D1, the frames transmitted from the game apparatus 1 to the other game apparatus 1 in the example shown in FIG. 4 are transmitted from the other game apparatus 1 to the game apparatus 1, and the frames transmitted from the other game apparatus 1 to the game apparatus 1 in the example shown in FIG. 4 are transmitted from the game apparatus 1 to the other game apparatus 1. Further, in the present embodiment, in response to receiving an information frame D3, the game apparatus 1 transmits an information frame D3 to the other game apparatus 1 which is the source of the received information frame D3. However, as an alternative, the game apparatus 1 may transmit the information frame D3 to the other game apparatus 1 at the timing of transmitting the connection response frame D2.

Hereinafter, the frames transmitted/received in the "passing communication" are described. FIG. 5A shows an example of the connection request frame D1. The connection request frame D1 contains a frame type F_TYP, a source MAC (Media Access Control) address, and an application ID. The frame type F_TYP indicates the type of the frame. In this example, the frame type F_TYP indicates information that the frame is a connection request frame D1. The application ID is identification information unique to an application (in the present embodiment, the piece collection application).

FIG. 5B shows an example of the connection response frame D2. The connection response frame D2 contains a frame type F_TYP, a destination MAC address, a source MAC address, and an application ID. The frame type F_TYP indicates information that the frame is a connection response frame D2. The application ID is identification information unique to an application (in the present embodiment, the piece collection application)

FIG. 5C shows an example of the information frame D3. FIG. 5D shows an example of main data D4 contained in the information frame D3. The information frame D3 contains a frame type F_TYP, a destination MAC address, a source MAC address, and main data D4. The main data D4 contains an application ID and piece information D5. The application ID is identification information unique to an application (in the present embodiment, the piece collection application). The piece information D5 will be described below in detail.

Figure 6:
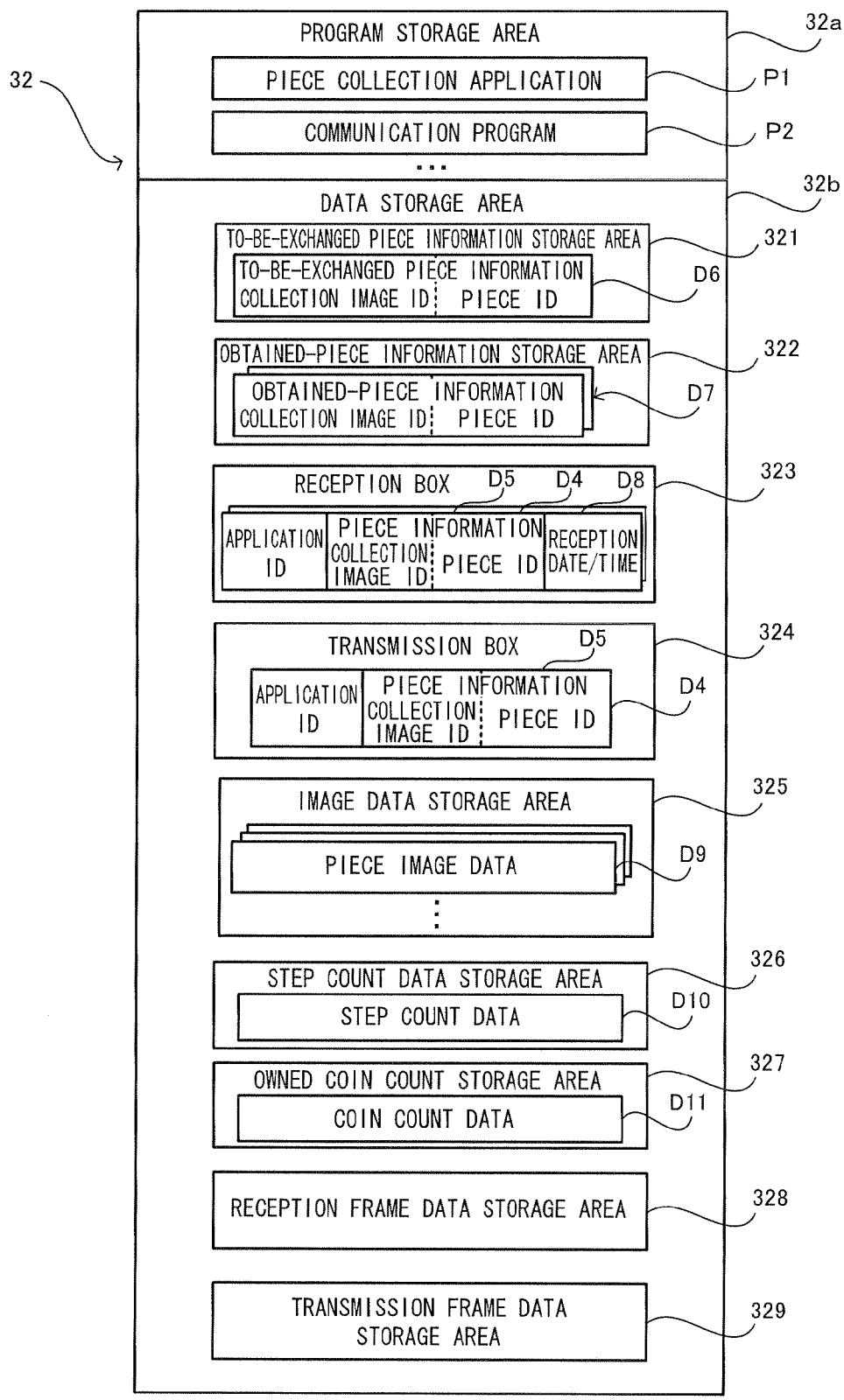
FIG. 6 is a memory map showing an example of programs and various data stored in a main memory 32.

Described next with reference to FIGS. 6 and 7 are various programs and various data stored in the main memory 32 of the game apparatus 1. FIG. 6 shows a memory map which shows an example of programs and various data that are stored in the main memory 32. The various data are stored in the main memory 32 in accordance with the execution of programs by the game apparatus 1.

The main memory 32 includes a program storage area 32a and a data storage area 32b. The program storage area 32a stores a piece collection application P1, and also stores a communication program P2 which causes the game apparatus 1 (the wireless communication module 37 and the CPU 31) to perform the passing communication process. The piece collection application P1 and the communication program P2 are loaded by the CPU 31 as necessary from the saved data memory 34, the memory card 28, the cartridge 29, etc., into the program storage area 32a. It should be noted that the communication program P2 is also loaded by the microcomputer 38 into the memory 38a of the microcomputer 38.

The data storage area 32b includes a to-be-exchanged piece information storage area 321, an obtained-piece information storage area 322, a reception box 323, and a transmission box 324. The to-be-exchanged piece information storage area 321 stores, as to-be-exchanged piece information D6, piece information D5 that is to be transmitted to another game apparatus 1 by the "passing communication". It should be noted that the piece information D5 contains a collection image ID and a piece ID. Hereinafter, the collection image ID and the piece ID are described with reference to FIGS. 7A and 7B.

Figures 7A, 7B:
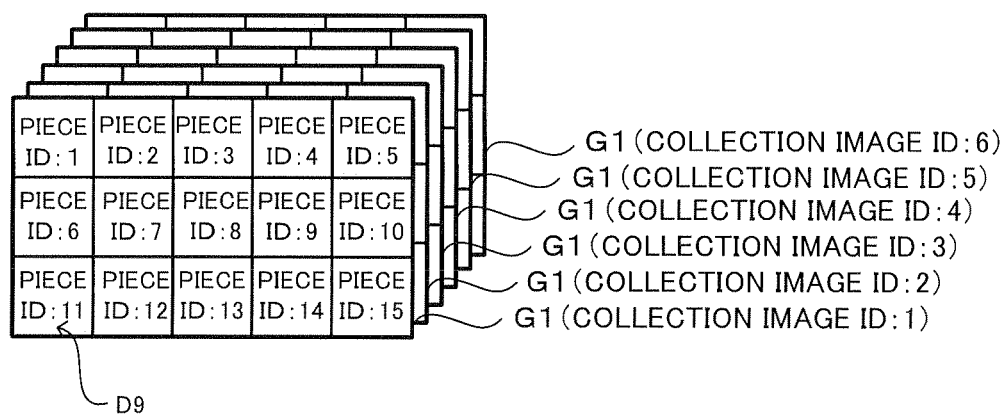
FIG. 7A illustrates a plurality of types of collection images G1 and piece images G2 constituting the collection images G1.
FIG. 7B shows an example of a table T.

FIG. 7A illustrates a plurality of types of collection images G1 and piece images G2 that constitute the collection images G1. In the present embodiment, the plurality of types (e.g., 6 types) of collection images G1 are stored in the game apparatus 1. Collection image IDs (1 to 6), which indicate respective geographical area attributes as described above, are added to the collection images G1, respectively. Pieces of data of constituent piece images G2 (piece image data D9 described below) of each collection image G1 have a collection image ID added thereto, which is the same collection image ID as that of the collection image G1. Further, each of the pieces of piece image data D9 has added thereto a piece ID (e.g., any number among 1 to 15) which indicates a position in the collection image G1. That is, the collection image ID of a piece image G2 specifies a collection image G1 that is associated with the piece image G2, and the piece ID of the piece image G2 specifies a position in the collection image G1, in which position the piece image G2 is incorporated into the collection image G1.

In the present embodiment, the game apparatus 1 can consume coins as described above, to generate and thereby obtain piece information D5. In the case of generating piece information D5, the game apparatus 1 reads an area ID that is preset in the game apparatus 1, obtains a collection image ID corresponding to the read area ID, and generates piece information D5 that contains the collection image ID and a randomly selected piece ID. FIG. 7B shows an example of a table T in which area IDs and collection image IDs are registered in association with each other. The table T is used for obtaining a collection image ID that corresponds to the area ID preset in the game apparatus 1. The area ID is set by the user in advance and stored in the saved data memory 34 or the like. The area ID is read from the saved data memory 34 or the like and then stored in the main memory 32. It should be noted that, also when the piece collection application is run for the first time, piece information D5 is generated in the same manner.

Returning to FIG. 6, piece information D5 obtained from another game apparatus 1 is stored in the obtained-piece information storage area 322 as obtained-piece information D7. It is understood that the number of pieces of obtained-piece information D7 stored in the obtained-piece information storage area 322 is plural if a plurality of pieces of obtained-piece information D7 have been obtained.

In the reception box 323, the main data D4 of an information frame D3 that has been received from another game apparatus 1 by the "passing communication" is stored while reception date and time D8 of the data D4 are added to the data D4. The piece information D5 contained in the main data D4 is read by the CPU 31 in response to an instruction from the user, and if the piece information D5 is not identical to the obtained-piece information D7 stored in the obtained-piece information storage area 322, the piece information D5 is additionally stored in the obtained-piece information storage area 322 as obtained-piece information D7.

The transmission box 324 stores information that is to be transmitted to other game apparatuses 1 by the "passing communication" (hereinafter, referred to as "piece information"). The transmission box 324 stores main data D4. The piece information D5 contained in the main data D4 contains a collection image ID and a piece ID that are identical to those of the to-be-exchanged piece information D6. The transmission box 324 stores only one piece of main data D4. A copy of the main data D4 is generated, and an information frame D3 containing the copy of the main data D4, as shown in FIG. 5C, is transmitted.

The data storage area 32b includes an image data storage area 325. The image data storage area 325 stores image data of images to be displayed by the game apparatus 1. The image data contains the aforementioned data D9 of piece images G2. In the present embodiment, as described above, the data D9 of all the piece images G2 (i.e., piece image data D9) is prestored for all the collection images G1. Among the stored piece image data D9, only piece image data D9 for which permission to use has been granted is recognized as piece image data D9 obtained by the game apparatus 1. That is, a collection image G1 created with piece image data D9 for which permission to use has been granted is shown on the main screen as in FIG. 3. As described above, the piece image data D9 of each piece image is stored with a corresponding collection image ID and corresponding piece ID added thereto. Piece image data D9 is recognized as data obtained by the game apparatus 1 (i.e., permitted data) when a collection image ID and a piece ID that are contained in the obtained-piece information D7 are added to the piece image data D9.

Further, the data storage area 32b includes a step count data storage area 326 and an owned coin count storage area 327. The step count data storage area 326 is an area for storing step count data D10 which indicates a step count detected by the acceleration sensor 44. The owned coin count storage area 327 is an area for storing coin count data D11 which indicates the number of coins owned by the user, which coins have been obtained by the game apparatus 1 by converting the step count data D10 into the coins.

Still further, the data storage area 32b includes a reception frame data storage area 328 and a transmission frame data storage area 329. The reception frame data storage area 328 is an area for temporarily storing frames (frames shown in FIG. 5A to FIG. 5C) received from other game apparatuses 1. The transmission frame data storage area 329 is an area for temporarily storing frames (frames shown in FIG. 5A to FIG. 5C) to be transmitted to other game apparatuses 1.

Among the above-described data, the data D6, D7, D10, and D11 are, if already stored in the saved data memory 34 at the time when the piece collection application P1 is started, read from the saved data memory 34 and then stored in the data storage area 32b. The D6, D7, D10, and D11 are stored in the saved data memory 34 when the execution of the piece collection application P1 is ended. The main data D4 and the frames shown in FIG. 5A to FIG. 5C are generated by the CPU 31 when the communication program P2 is executed, and then stored in the data storage area 32b.

The main memory 32 includes a VRAM area (not shown) set therein. At a predetermined cycle (every 1/60 second), the CPU 31 writes, into the VRAM area, images to be displayed on the upper LCD 22 and the lower LCD 12. The images written in the VRAM area are read by the CPU 31 and then outputted to the upper LCD 22 and the lower LCD 12. It should be noted that a term "display process" herein refers to a process of generating an image to be displayed on the upper LCD 22 or the lower LCD 12 and writing the image into the VRAM area.

Hereinafter, the piece collection process performed by the CPU 31 will be described with reference to FIG. 6 and FIGS. 8 to 10. The piece collection process is performed when the piece collection application P1 is executed. It should be noted that the piece collection process continues to be performed until the user instructs to end the execution of the piece collection application P1.

Figure 8:
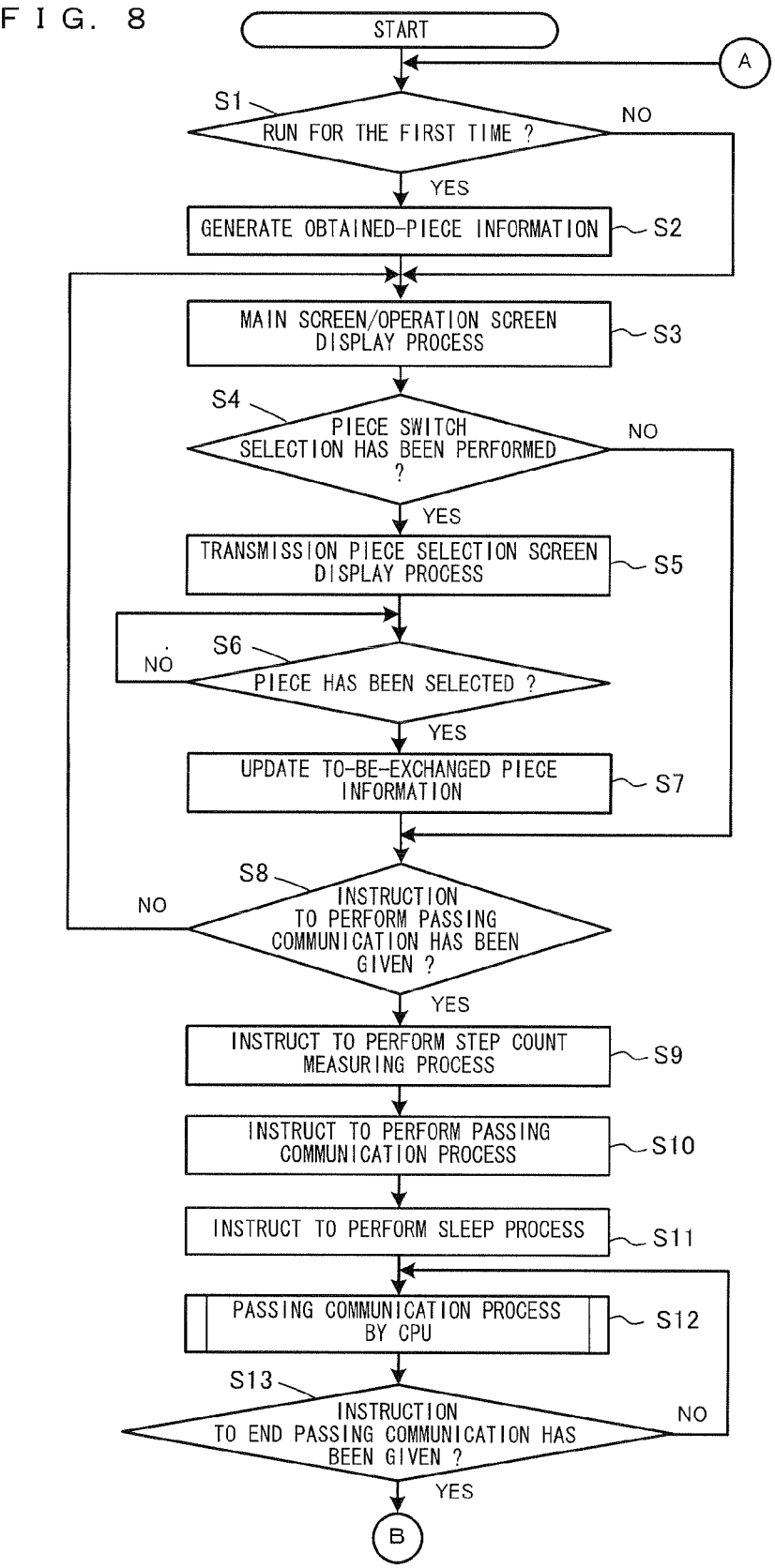
FIG. 8 shows a flowchart (first part) that shows an example of a piece collection process.
Figure 9:
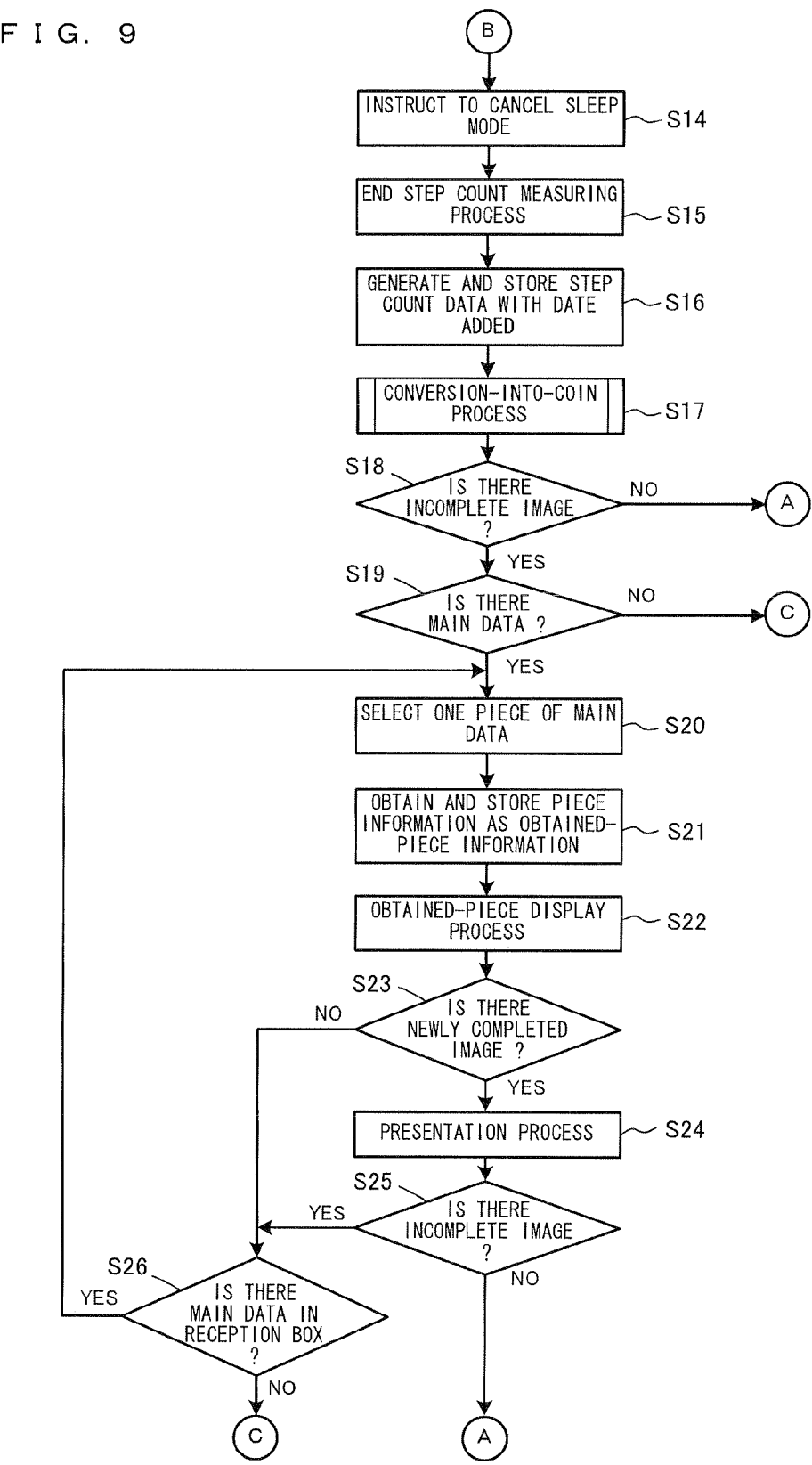
FIG. 9 shows the flowchart (second part) that shows the example of the piece collection process.
Figure 10:
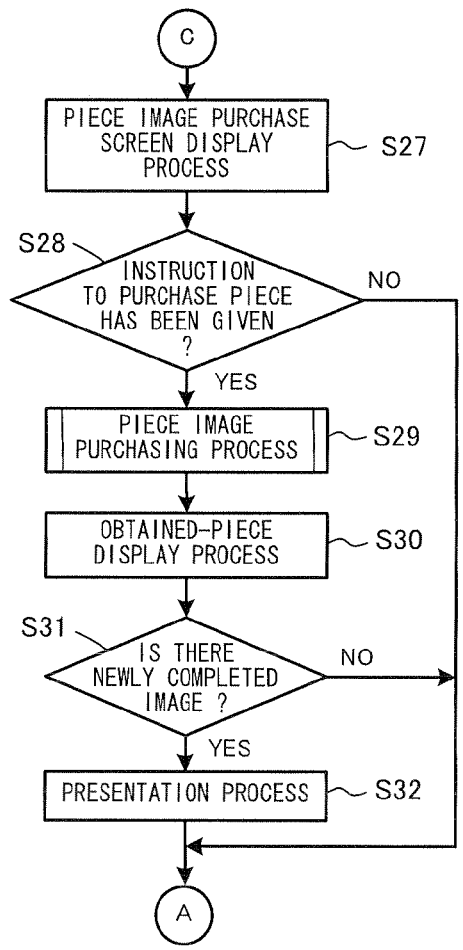
FIG. 10 shows the flowchart (third part) that shows the example of the piece collection process.

FIG. 8 to FIG. 10 show a flowchart that shows an example of the piece collection process. Referring to FIG. 8, the CPU 31 determines whether the piece collection application P1 is run for the first time (S1). Here, the expression "the piece collection application P1 is run for the first time" refers to the piece collection application P1 being executed by the game apparatus 1 for the first time. If the piece collection application P1 is run for the first time (YES at S1), the CPU 31 determines a piece ID at random by performing a predetermined random number generation process. Also, the CPU 31 refers to the table T as shown in FIG. 7B and thereby obtains a collection image ID that is associated with the area ID prestored in the saved data memory 34. Then, the CPU 31 generates obtained-piece information D7 and to-be-exchanged piece information D6, each containing the piece ID that has been determined and the collection image ID that has been obtained, and stores the obtained-piece information D7 and the to-be-exchanged piece information D6 in the saved data memory 34 (S2). Thereafter, the CPU 31 advances the processing to step S3.

The reason for the obtained-piece information D7 to be generated at step S2 is that when the piece collection application P1 is run for the first time, the game apparatus 1 stores no obtained-piece information D7, and thus there is no piece information D5 to be transmitted to other game apparatuses 1.

Here, the rate of generation of piece information D5 for a piece image G2 varies among each piece image G2. In other words, the rate of determination of a piece ID varies among each piece ID. For example, in a case where the range of generation of random numbers is 1 to 100, if numbers 1 to 5 are generated, "1" is assigned as a piece ID, and if numbers 6 to 20 are generated, "2" is assigned as a piece ID. Thus, the range of generated random numbers, one of which is to be assigned as a piece ID, varies among each piece ID. Accordingly, for example, obtaining a piece image G2 that constitutes an essential part of a collection image G1 (e.g., obtaining a piece image G2 that constitutes part of the face of a character in a picture) can be made difficult. In this manner, amusement of the piece collection game can be increased. The area ID is determined when the user has selected one attribute from among the plurality of geographical area attributes, and then is stored in advance in the saved data memory 34. The area ID may be selected based on the user's residential area, for example. Accordingly, in accordance with an area where the user carries around the game apparatus 1, the game apparatus 1 collects piece images G2 that are associated with the selected geographical area attribute. This makes it possible to generate a collection image G1 that is associated with the geographical area attribute.

On the other hand, if the piece collection application P1 is not run for the first time (NO at S1), the CPU 31 advances the processing to step S3 without performing step 2.

At step S3, the CPU 31 performs a display process for displaying the main screen and the operation screen, which have been described above with reference to FIG. 3, on the upper LCD 22 and the lower LCD 12, respectively. To be specific, the CPU 31 obtains pieces of piece image data D9 based on all the obtained-piece information D7 (see FIG. 6) stored in the main memory 32, and generates a collection image G1 based on these pieces of piece image data D9. Then, the CPU 31 performs a display process such that the main screen shows the collection image G1. Further, the CPU 31 generates the owned coin count G4 which indicates the number of coins indicated by the coin count data D11, and performs a display process such that the main screen shows the owned coin count G4. If an instruction to switch the collection image G1 shown in the main screen is received from the user, the CPU 31 performs a display process so as to switch the collection image G1 shown in the main screen.

Figure 11:
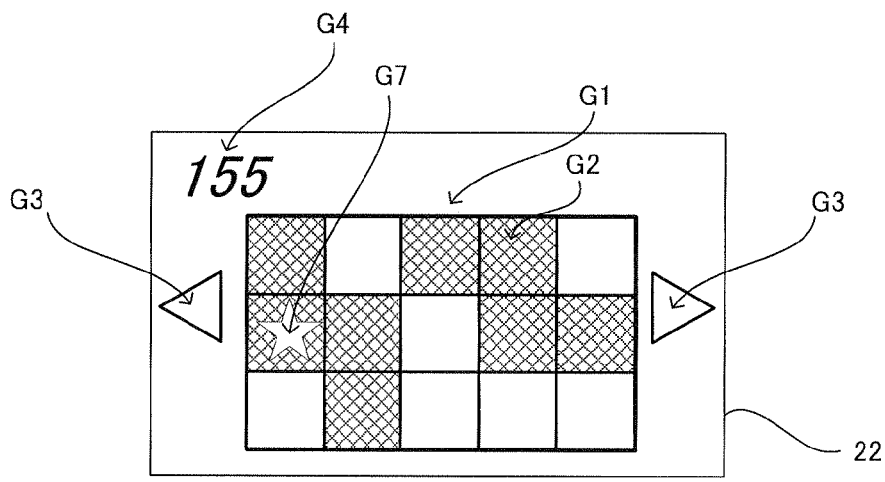
FIG. 11 shows an example of a transmission piece selection screen.

Next, the CPU 31 determines whether a piece switch selection has been received from the user (S4). For example, when the piece switching operation button G5 shown in the operation screen as in FIG. 3 is touched, the CPU 31 determines that a piece switch selection has been received from the user. When determining that a piece switch selection has been received from the user (YES at S4), the CPU 31 performs a display process of displaying a transmission piece selection screen (S5). FIG. 11 shows an example of the transmission piece selection screen. The transmission piece selection screen is provided for the user to switch a piece image G2 to be transmitted to other game apparatuses 1. In the transmission piece selection screen, an object G7 superimposed on a piece image G2 is shown. The position in which the object G7 is shown is changed to be located on another piece image G2 by, for example, an operation via the operation buttons 14 or the touch panel 11. If an instruction to switch the collection image G1 shown in the main screen is received from the user through, for example, the user's operation of the operation buttons 14 or the touch panel 11, then the CPU 31 performs a display process to switch the collection image G1 shown in the main screen.

Next, the CPU 31 repeatedly determines whether an operation of selecting a piece has been received from the user, until the CPU 31 determines YES (S6). Here, an operation of selecting a piece is performed via the operation buttons 14, for example. When determining that an operation of selecting a piece has been received from the user (YES at S6), the CPU 31 generates to-be-exchanged piece information D6 that indicates a piece image G2 that the user has selected by the operation, and stores the to-be-exchanged piece information D6 in the saved data memory 34 (S7). If to-be-exchanged piece information D6 is already stored in the saved data memory 34, the to-be-exchanged piece information D6 is updated so as to indicate the piece image G2 selected by the user. As described above, the transmission piece selection screen as in FIG. 11 shows an object G7. When an operation of selecting a piece is performed by the user, a piece image G2 having the object G7 superimposed thereon becomes a piece image G2 selected by the user. Thereafter, the piece image G2 is transmitted to another game apparatus 1 in the passing communication process. Then, the CPU 31 advances the processing to step S8.

On the other hand, if it is determined NO at step S4, that is, if the CPU 31 determines that a piece switch selection has not been received from the user (NO at S4), then the CPU 31 advances the processing to step S8 without performing the process steps S5 to S7.

Described next is a process performed at step S8. The CPU 31 determines whether an instruction to perform the "passing communication" has been received from the user (S8). For example, if the passing communication operation button G6 in the operation screen as shown in FIG. 3 has been touched and the game apparatus 1 has entered the closed state while the main power supply to the game apparatus 1 is kept maintained, then the CPU 31 determines that an instruction to perform the "passing communication" has been received. When determining that an instruction to perform the "passing communication" has not been received from the user (NO at S8), the CPU 31 returns the processing to step S3. On the other hand, when determining that an instruction to perform the "passing communication" has been received from the user (YES at S8), the CPU 31 instructs the microcomputer 38 to perform the step count measuring process (S9).

Next, the CPU 31 instructs the wireless communication module 37 to perform the passing communication process (S10). Then, the CPU 31 instructs the microcomputer 38 to perform the sleep process (S11). Subsequently, the CPU 31 performs the passing communication process (S12). However, since the clock operation of the CPU 31 is ceased while the CPU 31 is in sleep state, the CPU 31 does not perform any processing when no instruction is provided from the wireless communication module 37 although the flowchart of FIG. 8 shows that the CPU 31 always performs the process at step S12. To be specific, when the wireless communication module 37 has received the frames D1 to D3 (see FIG. 5A to FIG. 5C) from another game apparatus 1, the wireless communication module 37 starts the CPU 31, and then the CPU 31 performs part of the passing communication process which will be described below with reference to FIG. 17. Here, in accordance with an instruction from the CPU 31, the microcomputer 38 controls the power supply circuit 39 to start supplying power to the memory control circuit 33, the saved data memory 34, and the main memory 32.

Upon receiving an instruction to end the "passing communication", the microcomputer 38 starts the CPU 31 of which the clock operation has been ceased, and at this point (YES at S13), the CPU 31 performs a process at step S13. It should be noted that the game apparatus 1 receives an instruction to end the "passing communication" when the game apparatus 1 has entered the opened state. The flowchart of FIG. 8 shows that the process of step S13 is performed at a predetermined cycle. However, in reality, the CPU 31 does not perform such a process since the CPU 31 is in sleep state.

Referring to FIG. 9, at step S14, the CPU 31 instructs the microcomputer 38 to cancel the sleep mode (S14), and then instructs the microcomputer 38 to end the step count measuring process (S15). Thereafter, the CPU 31 reads the value of a step count from the memory 38a of the microcomputer 38, adds the current date to the step count value to generate step count data D10, and stores the generated step count data D10 in the saved data memory 34 (S16). In the step count measuring process, the step count data D10 is generated at every unit time and then stored in the saved data memory 34. Accordingly, in the process performed at step S16, a step count value that has not yet been converted into step count data D10 is converted into step count data D10. If step count data D10 is already stored in the saved data memory 34, the step count data D10 generated at step S16 is additionally stored in the saved data memory 34.

Subsequently, the CPU 31 performs a process of reading all the step count data D10 stored in the saved data memory 34 and converting the read step count data D10 into coins to be owned by the user (hereinafter, referred to as a "conversion-into-coin process") (S17). The conversion-into-coin process will be described in detail with reference to FIG. 14. Then, the CPU 31 determines whether there is an incomplete image among the collection images G1 (S18). This determination is performed based on whether the obtained-piece information D7 is stored for all the piece images constituting the collection images G1. When determining that there is no incomplete image among the collection images G1 (NO at S18), the CPU 31 returns the processing to step S1. On the other hand, when determining that there is an incomplete image among the collection images G1 (YES at S18), the CPU 31 performs a process at step S19 and the subsequent process steps in order to complete the incomplete collection image G1. To be specific, the CPU 31 determines whether main data D4 is stored in the reception box 323 (S19).

When determining that main data D4 is stored in the reception box 323 (YES at S19), the CPU 31 selects and reads a piece of main data D4 from among the main data D4 stored in the reception box 323 (S20). Then, the CPU 31 obtains the piece information D5 contained in the read main data D4. Subsequently, if obtained-piece information D7 that is identical to the piece information D5 that has been obtained is not stored in the obtained-piece information storage area 322, then the CPU 31 stores the piece information D5 as obtained-piece information D7 in the obtained-piece information storage area 322 (S21). If obtained-piece information D7 that is identical to the piece information D5 that has been obtained is stored in the obtained-piece information storage area 322, the piece information D5 is discarded. Then, the main data D4, for which the process at step S21 has been performed, is deleted from the reception box 323. Thereafter, based on the obtained-piece information D7 newly obtained at step S21, the CPU 31 performs a display process for displaying a piece image G2 (i.e., a newly obtained piece image G2) on the upper LCD 22 (S22).

Figure 12:
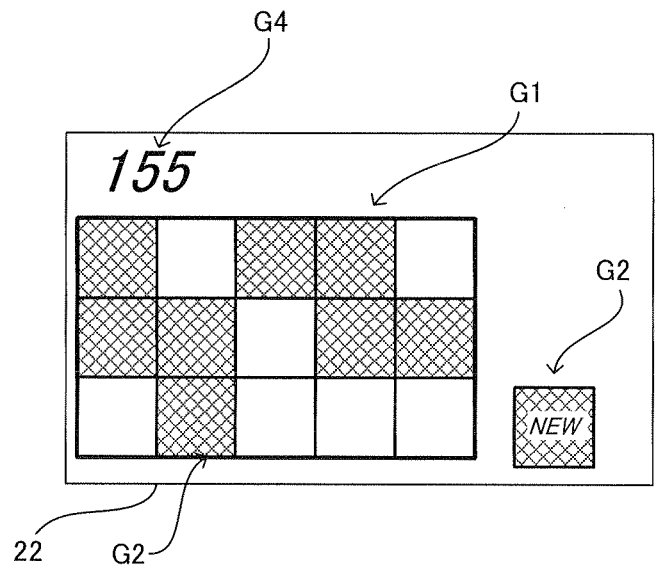
FIG. 12 shows an example of a screen image that is displayed in a display process performed at step S22.

FIG. 12 shows an example of a screen image that is displayed by the display process at step S22. The screen image shows a collection image G1 that is associated with the newly obtained piece image G2, and also shows the newly obtained piece image G2 at the bottom right of the screen image in such a manner that the newly obtained piece image G2 is not incorporated in the collection image G1. Thereafter, an animation is displayed showing that the newly obtained piece image G2 is moved toward, and then incorporated into, the collection image G1.

Returning to FIG. 9, the CPU 31 determines whether there is a collection image G1 that has newly been completed (S23). When determining that there is a collection image G1 that has newly been completed (YES at S23), the CPU 31 performs a display process for displaying, on the upper LCD 22, a presentation screen that indicates the completion of the collection image G1 (S24). Thereafter, the CPU 31 determines whether there is an incomplete image among the collection images G1 (S25). When determining that there is no incomplete image among the collection images G1 (NO at S25), the CPU 31 returns the processing to step S1.

On the other hand, when the CPU 31 determines that there is an incomplete image among the collection images G1 (YES at S25), the CPU 31 determines whether main data D4 is stored in the reception box 323 (S26). When determining that main data D4 is stored in the reception box 323 (YES at S26), the CPU 31 returns the processing to step S20, and repeats the process steps S20 to S22 until all the main data D4 is deleted from the reception box 323 (i.e., until it is determined NO at S26), or until all the collection images G1 are completed (i.e., until it is determined NO at S25).

It should be noted that, also when the CPU 31 determines "NO" at step S23, that is, when the CPU 31 determines that there is no collection image G1 that has newly been completed (NO at S23), the CPU 31 performs the process at step S26.

Described next is processing that is performed by the CPU 31 when the CPU 31 has determined that no main data D4 is stored in the reception box 323 (NO at S26). Referring to FIG. 10, when the CPU 31 determines that no main data D4 is stored in the reception box 323, the CPU 31 performs a display process of displaying a piece image purchase screen (S27). The piece image purchase screen provides a guide for the user to perform an operation for purchasing a piece image G2 by using the coins owned by the user. For example, a message indicating that the user is permitted to purchase a piece image G2, such as "You can buy a piece image G2 with your coins", is displayed.

Next, the CPU 31 determines whether an instruction to purchase a piece image G2 by consuming the owned coin count has been received from the user (S28). The user provides the instruction, for example, by operating the touch panel or the operation buttons 14. When determining that an instruction to purchase a piece image G2 by consuming the owned coin count has been received from the user (YES at S28), the CPU 31 performs a process of reducing the owned coin count and allowing the game apparatus 1 to obtain a piece image G2 (a piece image purchasing process) (S29). The piece image purchasing process will be described below in detail with reference to FIG. 15.

Figure 13:
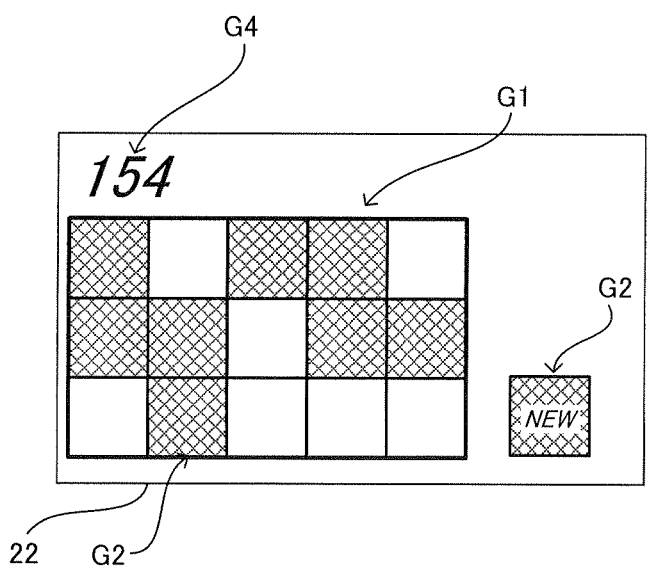
FIG. 13 shows an example of a screen image that is displayed in a display process performed at step S30.

Thereafter, the CPU 31 performs a display process for displaying, on the upper LCD 22, the piece image G2 based on obtained-piece information D7, which has newly been obtained at step S29 (S30). FIG. 13 shows an example of a screen image that is displayed by the display process at step S30. The screen image shows a collection image G1 that is associated with the newly obtained piece image G2, and also shows the newly obtained piece image G2 at the bottom right of the screen image in such a manner that the newly obtained piece image G2 is not incorporated in the collection image G1. Thereafter, an animation is displayed showing that the newly obtained piece image G2 is moved toward, and then incorporated into, the collection image G1. Here, the difference between the screen image shown in FIG. 12 (i.e., a screen image that is displayed by the process performed at step S22) and the screen image shown in FIG. 13 is that the number indicated by the owned coin count G4 in FIG. 13 is reduced from that indicated by the coin count G4 in the main screen shown in FIG. 3.

Subsequently, the CPU 31 determines whether there is a collection image G1 that has newly been completed (S31). When determining that there is a collection image G1 that has newly been completed (YES at S31), the CPU 31 performs a display process for displaying, on the upper LCD 22, a presentation screen that indicates the completion of the collection image G1 (S32). Thereafter, the CPU 31 returns the processing to step S1. On the other hand, when determining that there is no collection image G1 that has newly been completed (NO at S31), the CPU 31 returns the processing to step S1 without performing the process at step S32 (i.e., without performing the display process for a presentation screen).

Described next is processing that is performed when it is determined that an instruction to purchase a piece image G2 by consuming the owned coin count has not been received from the user (NO at S28). In this case, the CPU 31 returns the processing to step S1 without performing the above-described process steps S29 to S32 (i.e., without performing the processing related to consuming the owned coin count to obtain a new piece image G2).

As described above, in the present embodiment, the CPU 31 does not perform the process at step S27 and the subsequent process steps until the CPU 31 determines "NO" at step S26 (i.e., until all the piece information D5 stored in the reception box 323 is processed). In other words, the purchase of a piece image G2, which is performed by consuming the owned coin count, is permitted only when piece images G2 that have newly been obtained by the "passing communication" are insufficient to complete all the collection images G1. Thus, the purchase of a piece image G2, which is performed by consuming the owned coin count, is performed only as a measure to supplement the obtaining of piece images G2 when the "passing communication" alone is insufficient to obtain piece images G2.

Described next is processing that is performed when it is determined "NO" at step S19 (see FIG. 9). This situation arises when no piece information D5 has been obtained by the "passing communication". In this case, the CPU 31 performs the process at step S27 and the subsequent process steps, that is, the processing related to consuming the owned coin count (hereinafter, "owned coin count a") to obtain a new piece image G2. Accordingly, even if no piece image G2 has been obtained by the "passing communication", the purchase of a piece image G2 by consuming the owned coin count a is permitted in order to supplement the obtaining of piece images G2 when the "passing communication" alone is insufficient to obtain piece images G2.

Figure 14:
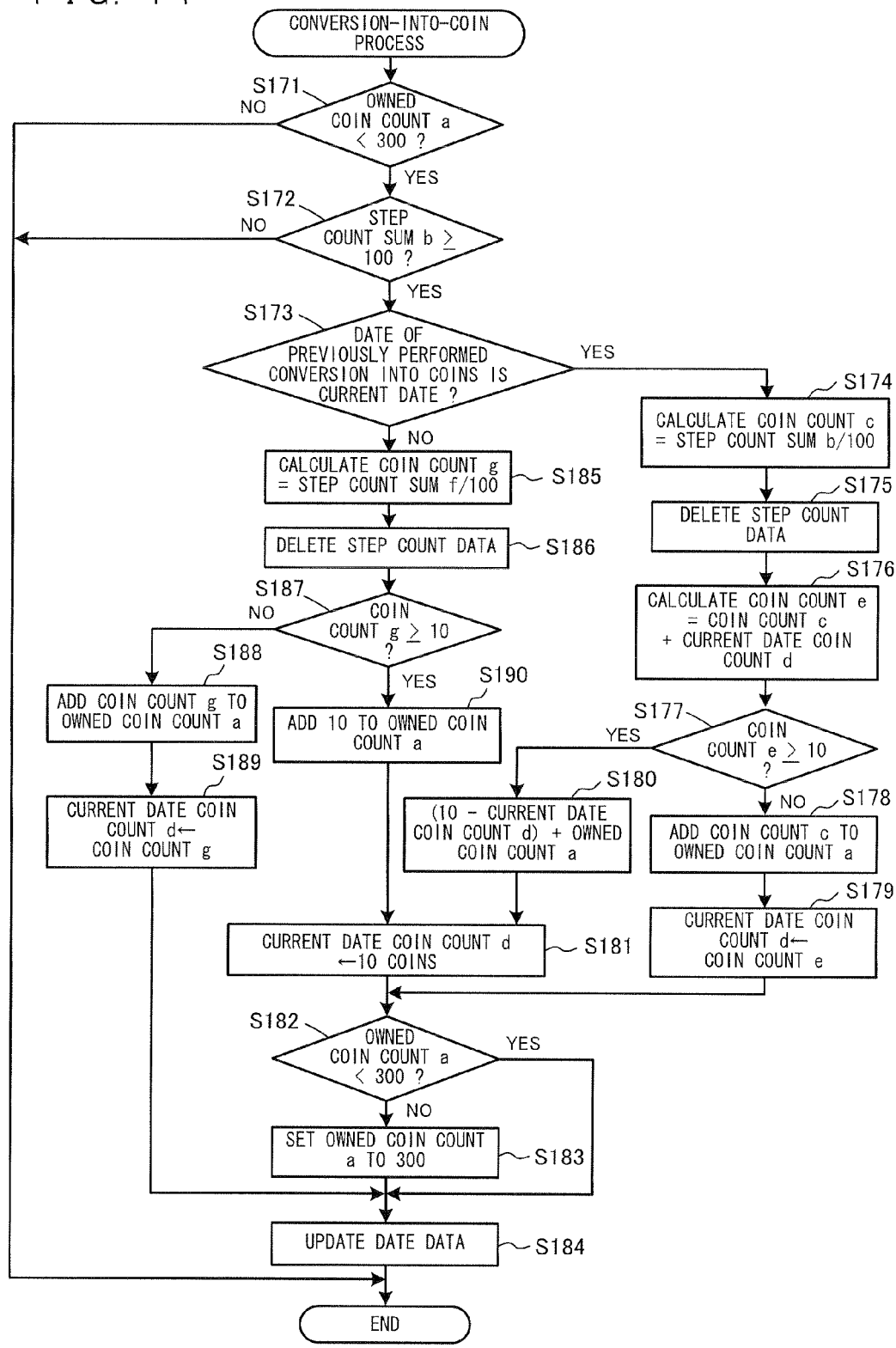
FIG. 14 is a flowchart showing an example of a conversion-into-coin process.

Hereinafter, the conversion-into-coin process performed at the above-described step S17 (see FIG. 9) is described with reference to FIG. 6 and FIG. 14. FIG. 14 is a flowchart showing an example of the conversion-into-coin process.

First, the CPU 31 determines whether the owned coin count a, which is indicated by the coin count data D11, is less than 300 (S171). When determining that the owned coin count a is not less than 300 (NO at S171), the CPU 31 ends the conversion-into-coin process and returns the processing to the main routine of FIG. 9. The reason for this is that the upper limit of the owned coin count a is 300. When determining that the owned coin count a is less than 300 (YES at S171), the CPU 31 reads all the step count data D10 from the saved data memory 34, sums up the values of all the step count data D10 to calculate a step count sum b, and determines whether the step count sum b is greater than or equal to 100 (S172). When determining that the step count sum b is not greater than or equal to 100 (NO at S172), the CPU 31 ends the conversion-into-coin process and returns the processing to the main routine of FIG. 9. The reason for this is that if the step count sum b is less than 100, the values of the step count data D10 cannot be converted into even a single coin.

On the other hand, when the CPU 31 determines that the step count sum b is greater than or equal to 100 (YES at S172), the CPU 31 further determines whether a date when the values of the step count data D10 have previously been converted into coins (i.e., a date of previously performed conversion into coins) is the current date (i.e., today) (S173). This determination is performed by referring to date data. The date data is set to an initial value when the piece collection application is started, and then stored in the saved data memory 34. It should be noted that if the date data is currently set to the initial value, it is determined "YES" at step S173. Then, if the process of converting the values of the step count data D10 into the owned coin count a is performed in the conversion-into-coin process, the date data is updated at step S184, which will be described below, so as to indicate the date when the conversion has been performed.

When the CPU 31 determines that the date of previously performed conversion into coins is the current date (today) (YES at S173), the CPU 31 calculates a coin count c by dividing the step count sum b by 100 (S174). Then, the CPU 31 deletes all the step count data D10 stored in the saved data memory 34 (S175). Thereafter, the CPU 31 reads a current date coin count d from the main memory 32, adds the coin count c to the current date coin count d to calculate a coin count e (S176), and determines whether the calculated coin count e is greater than or equal to 10 (S177). Here, the current date coin count d indicates the number of coins that have been obtained at the current date. The current date coin count d is set to an initial value "0" when the piece collection application is started, and then stored in the saved data memory 34.

When the CPU 31 determines that the calculated coin count e is not greater than or equal to 10 (NO at S177), the CPU 31 adds the coin count c to the owned coin count a, thereby updating the coin count data D11 (S178). Then, the CPU 31 substitutes the coin count e for the current date coin count d (S179). Thereafter, the CPU 31 advances the processing to step S182. On the other hand, when determining that the calculated coin count e is greater than or equal to 10 (YES at S177), the CPU 31 adds, to the owned coin count a, a value that results from subtracting the current date coin count d from 10, thereby updating the coin count data D11 (S180). The reason for this is that the upper limit of the number of coins that are allowed to be obtained within one day is 10. Thereafter, the CPU 31 substitutes 10 for the current date coin count d (S181). Then, the CPU 31 advances the processing to step S182.

At step S182, the CPU 31 determines whether the owned coin count a indicated by the coin count data D11 is less than 300 (S182). When determining that the owned coin count a is not less than 300 (NO at S182), the CPU 31 substitutes 300 for the owned coin count a, thereby updating the coin count data D11 (S183). Thereafter, the CPU 31 advances the processing to step S184. On the other hand, when determining that the owned coin count a is less than 300 (YES at S182), the CPU 31 advances the processing to step S184 without performing step S183.

At step S184, the CPU 31 updates the date data, which is stored in the saved data memory 34, to the current date (S184). Then, the CPU 31 ends the conversion-into-coin process and returns the processing to the main routine of FIG. 9.

Described next is processing that is performed by the CPU 31 when the CPU 31 determines "NO" at step S173, that is, when the CPU 31 determines that a date when the values of the step count data D10 have previously been converted into coins is not the current date (today) (NO at S173). In this case, the CPU 31 refers to a date contained in each piece of step count data D10, and calculates a step count sum f by summing up the values of pieces of step count data D10, each of which contains the current date. Then, the CPU 31 calculates a coin count g by dividing the step count sum f by 100 (S185). Thereafter, the CPU 31 deletes all the step count data D10 stored in the saved data memory 34 (S186).

Then, the CPU 31 determines whether the coin count g is greater than or equal to 10 (S187). When determining that the coin count g is not greater than or equal to 10 (NO at S187), the CPU 31 adds the coin count g to the owned coin count a, thereby updating the coin count data D11 (S188). Then, the CPU 31 substitutes the coin count g for the current date coin count d (S189). Thereafter, the CPU 31 advances the processing to the above-described step S182. On the other hand, when the CPU 31 determines that the coin count g is greater than or equal to 10 (YES at S187), the CPU 31 adds 10 to the owned coin count a, thereby updating the coin count data D11 (S190). The reason for this is that the upper limit of the number of coins that are allowed to be obtained within one day is 10. Also, the CPU 31 substitutes 10 for the current date coin count d (S181). Thereafter, the CPU 31 advances the processing to the above-described step S182.

That is, whether the owned coin count a is less than 300 is determined by performing step S182 (S182). When it is determined that the owned coin count a is not less than 300 (NO at S182), 300 is substituted for the owned coin count a and thereby the coin count data D11 is updated (S183). Then, at step S184, the date data is updated to the current date, and then the conversion-into-coin process is ended and the processing returns to the main routine of FIG. 9. On the other hand, when the owned coin count a is determined to be less than 300 (YES at S182), step S183 is not performed, and the date data is updated to the current date at step S184. Then, the conversion-into-coin process is ended and the processing returns to the main routine of FIG. 9.

Figure 15:
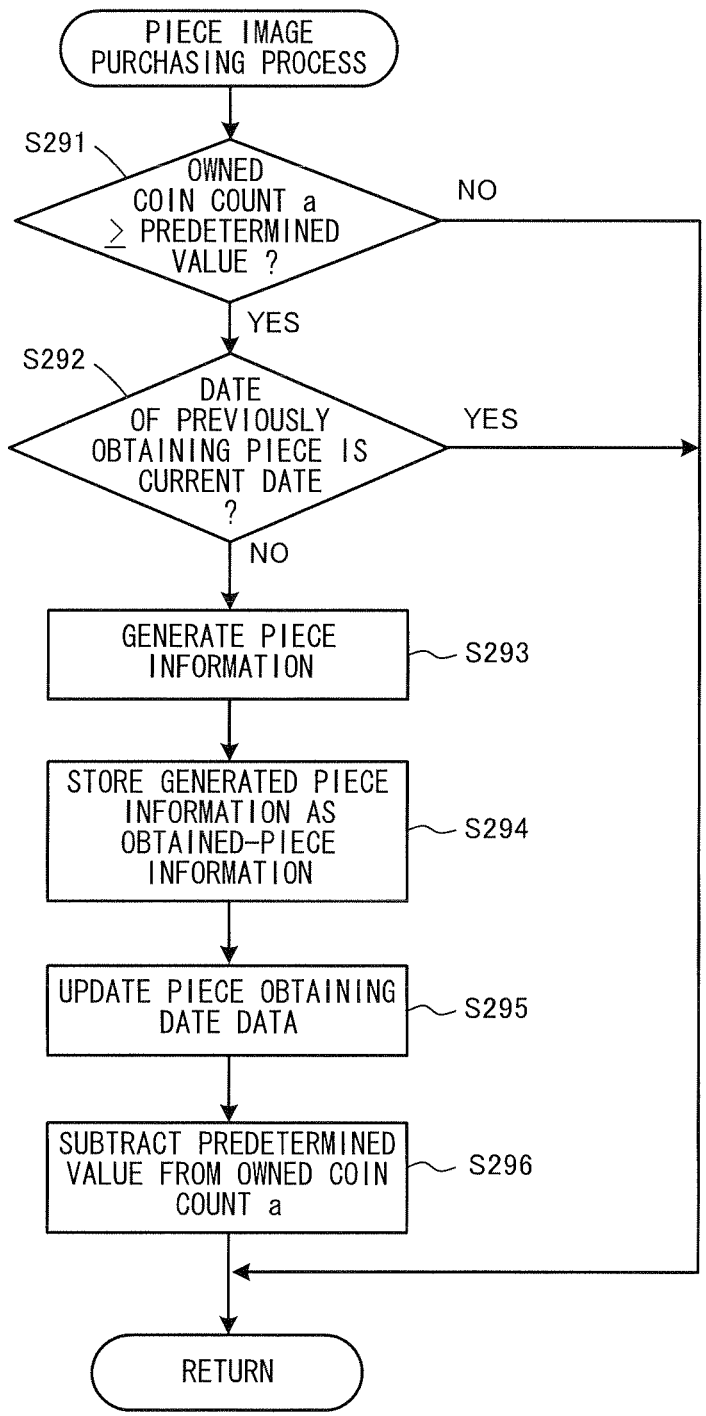
FIG. 15 is a flowchart showing an example of a piece image purchasing process.

Next, the piece image purchasing process performed at step S29 is described with reference to FIG. 6 and FIG. 15. FIG. 15 is a flowchart showing an example of the piece image purchasing process. First, the CPU 31 reads the coin count data D11 from the saved data memory 34, and determines whether the owned coin count a indicated by the coin count data D11 is greater than or equal to a predetermined value (e.g., 1) (S291). When determining that the owned coin count a is not greater than or equal to the predetermined value (NO at S291), the CPU 31 ends the piece image purchasing process and returns the processing to the main routine of FIG. 9. The reason for this is that the owned coin count a needs to be, at least, the predetermined value in order to purchase a piece image G2.

On the other hand, when determining that the owned coin count a is greater than or equal to the predetermined value (e.g., 1) (YES at S291), the CPU 31 further determines whether a date when the purchase of a piece image G2 has previously been performed is the current date (S292). This determination is performed by referring to piece obtaining date data. The piece obtaining date data indicates a date when a piece image G2 has been purchased through the piece image purchasing process. The piece obtaining date data is set to an initial value and stored in the saved data memory 34 when the piece collection application is started. It should be noted that when the piece obtaining date data is set to the initial value, it is always determined "NO" at step S292. If obtained-piece information D7 is generated in the piece image purchasing process, the piece obtaining date data is updated, at step S295 which will be described below, so as to indicate the date when the piece image purchasing process has been performed.

When the CPU 31 determines that a date when the purchase of a piece image G2 has previously been performed is the current date (YES at S292), the CPU 31 ends the piece image purchasing process and returns the processing to the main routine of FIG. 9. The reason for this is that the purchase of a piece image G2 is allowed only once a day. However, the purchase of a piece image G2 need not be limited to once a day. The number of times the purchase of a piece image G2 is allowed within one day may be set to a predetermined number that is two or more. In this case, the game apparatus 1 may store the number of times the purchase of a piece image G2 has been performed, refer to the stored number of times and the piece obtaining date data, and determine whether the number of times the purchase of a piece image G2 has been performed at the current date is within the predetermined number. Alternatively, the purchase of a piece image G2 may be allowed unlimitedly.

When the CPU 31 determines that a date when the purchase of a piece image G2 has previously been performed is not the current date (NO at S292), the CPU 31 generates piece information D5 by performing the predetermined random number generation process (S293). Here, the process performed at step S293 is the same as that performed at step S2 of FIG. 8. That is, the rate of generation of the piece ID of a piece image G2 varies among each piece image G2 at step S293. The CPU 31 refers to the table T as shown in FIG. 7B and thereby obtains a collection image ID that is associated with the area ID that is prestored in the saved data memory 34. Then, the CPU 31 generates piece information D5 that contains the collection image ID. If obtained-piece information D7 that is identical to the generated piece information D5 is not stored in the obtained-piece information storage area 322, the CPU 31 stores the piece information D5 in the saved data memory 34 as obtained-piece information D7 (S294). If obtained-piece information D7 that is identical to the generated piece information D5 is stored in the obtained-piece information storage area 322, the generated piece information D5 is discarded.

Subsequently, the CPU 31 updates the piece obtaining date data stored in the saved data memory 34 with the current date (S295). Thereafter, the CPU 31 reduces the owned coin count a by the predetermined value, thereby updating the coin count data D11 (S296). Then, the CPU 31 ends the piece image purchasing process and returns the processing to the main routine of FIG. 9.

Figure 16:
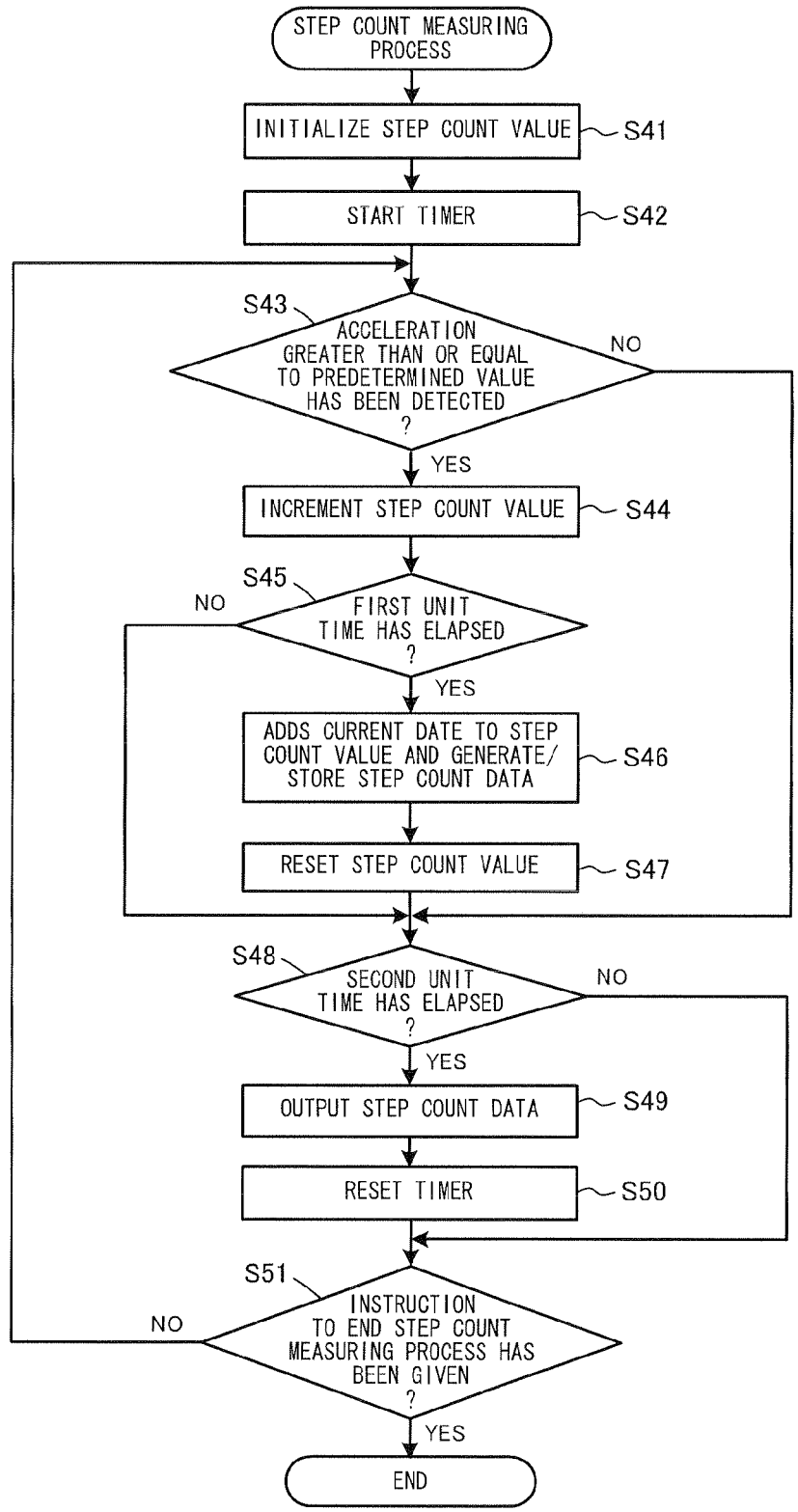
FIG. 16 is a flowchart showing an example of a step count measuring process.

Next, the step count measuring process performed by the microcomputer 38 is described with reference to FIG. 16. FIG. 16 is a flowchart showing an example of the step count measuring process. The step count measuring process is performed by executing a step count measuring program which is stored in the saved data memory 34 or the like. To be specific, when the CPU 31 has instructed, at step S9 of FIG. 8, the microcomputer 38 to perform the step count measuring process, the microcomputer 38 loads the step count measuring program from the saved data memory 34 into the memory 38*a*, and executes the program. Accordingly, the step count measuring process is started. The step count measuring process is ended when the CPU 31 has instructed to end the step count measuring process at step S15 of FIG. 9.

First, the microcomputer 38 sets a step count value to an initial value in the memory 38*a* (S41). Then, the microcomputer 38 causes a timer function of the RTC 38*b* to operate (S42). Next, the microcomputer 38 determines based on a signal from the acceleration sensor 44 whether acceleration greater than or equal to a predetermined value has been detected (S43). When determining that acceleration greater than or equal to the predetermined value has been detected (YES at S43), the microcomputer 38 determines that a step count has been detected and increments the step count value in the memory 38*a* by 1 (S44). Next, the microcomputer 38 determines based on a timer count value of the timer function whether a first unit time (e.g., 5 minutes) has elapsed (S45). It should be noted that it is determined "YES" at step S45 when the first unit time has elapsed after the timer function has started (step S42) or after the timer count value has been reset to its initial value (step S50), or when the first unit time has elapsed after it is determined "YES" at previously performed step S45.

When the microcomputer 38 determines that the first unit time (e.g., five minutes) has elapsed (YES at S45), the microcomputer 38 adds the current date to the step count value and stores the step count value as step count data D10 in the memory 38*a* (S46), and resets the step count value to the initial value (S47). Thereafter, the microcomputer 38 advances the processing to step S48. On the other hand, when determining that the first unit time has not elapsed (NO at S45), the microcomputer 38 advances the processing to step S48 without performing the above-described steps S46 and S47.

At step S48, the microcomputer 38 determines based on the timer count value whether a second unit time (e.g., 30 minutes) has elapsed (S48). This determination is performed based on whether the timer count value is greater than a predetermined value that corresponds to the second unit time. When determining that the second unit time has elapsed (YES at S48), the microcomputer 38 starts the CPU 31 whose operation is currently ceased. Then, in accordance with an instruction from the CPU 31, the microcomputer 38 starts supplying power to the saved data memory 34. Next, the microcomputer 38 outputs, to the saved data memory 34, all the step count data D10 stored in the memory 38*a* (S49). Subsequently, the microcomputer 38 ceases the power supply to the saved data memory 34 again, thereby causing the CPU 31 to stop operating. In this manner, even in the sleep mode, step count data D10 can be sequentially stored in the saved data memory 34. Then, the microcomputer 38 resets the timer count value to its initial value (S50). Thereafter, the microcomputer 38 advances the processing to step S51. On the other hand, when the microcomputer 38 determines that the second unit time has not elapsed (NO at S48), the microcomputer 38 advances the processing to step S51 without performing steps S49 and S50.

At step S51, the microcomputer 38 determines whether an instruction to end the step count measuring process has been received from the CPU 31 (S51). When determining that an instruction to end the step count measuring process has been received from the CPU 31 (YES at S51), the microcomputer 38 ends the step count measuring process.

On the other hand, when the microcomputer 38 determines that an instruction to end the step count measuring process has not been received from the CPU 31 (NO at S51), the microcomputer 38 returns the processing to step S43. It should be noted that the process steps S43 to S50 are repeated until it is determined "YES" at step S51, that is, until an instruction to end the step count measuring process is received from the CPU 31.

Figure 17:
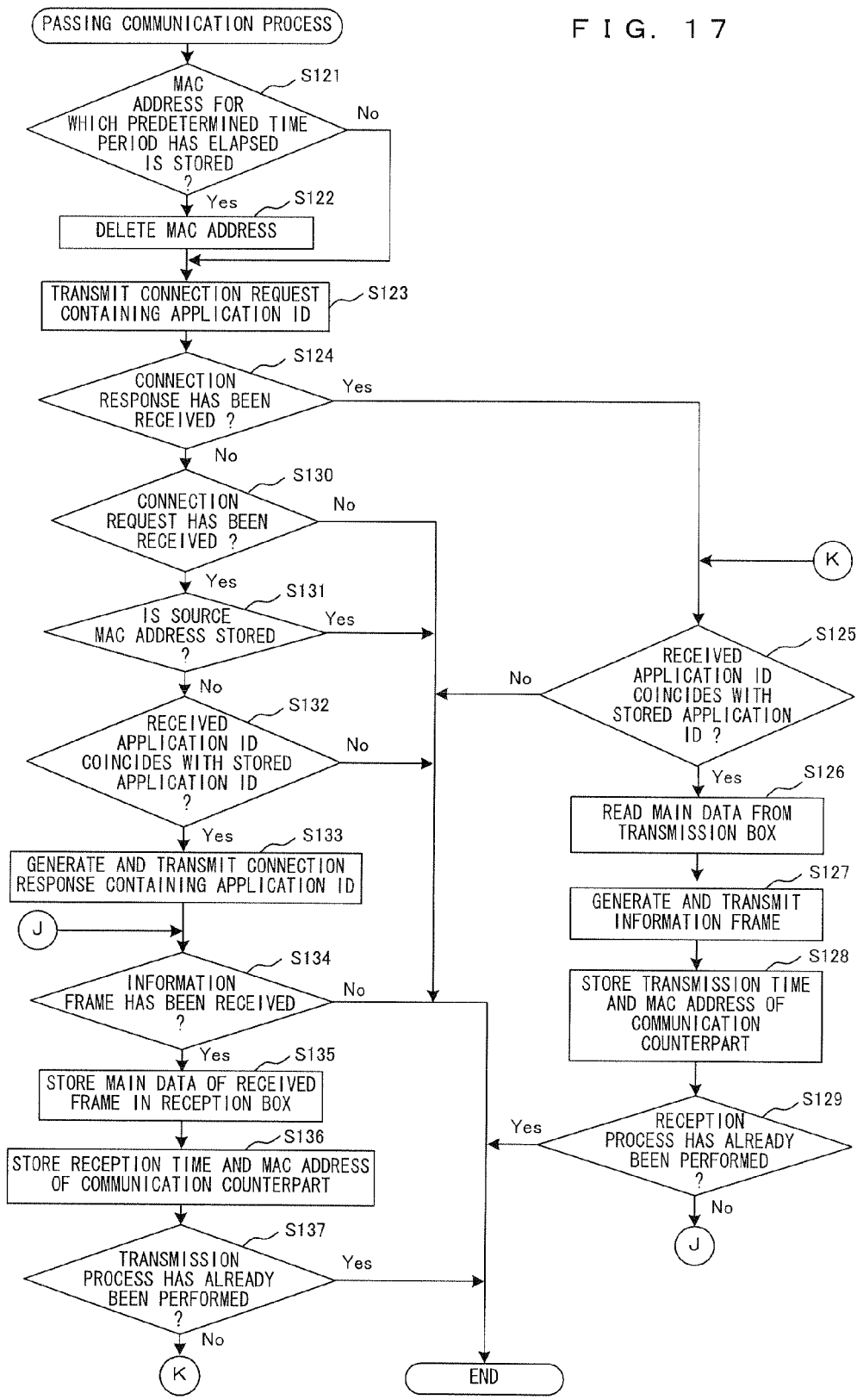
FIG. 17 is a flowchart showing an example of the passing communication process.

Hereinafter, the passing communication process performed at step 12 of FIG. 8 is described with reference to FIG. 5A to FIG. 5C, FIG. 6, and FIG. 17. FIG. 17 is a flowchart showing an example of the passing communication process. The game apparatus 1 and another game apparatus 1 each perform the passing communication process, and as a result, the "passing communication" is performed between these game apparatuses 1. The passing communication process is repeated at a predetermined cycle (e.g., at short intervals such as once in every few seconds).

First, the wireless communication module 37 determines whether the memory of the wireless communication module 37 stores a MAC address for which a predetermined period has elapsed from a response time (i.e., a time when the wireless communication module 37 has received an information frame D3 from the MAC address or transmitted an information frame D3 to the MAC address) (S121). When determining that the memory stores a MAC address for which the predetermined period has elapsed from the response time (YES at S121), the wireless communication module 37 deletes the MAC address (S122). When determining that the memory does not store such a MAC address (NO at S121), the wireless communication module 37 advances the processing to the next step S123 without deleting the MAC address. It should be noted that the source MAC address and the response time are stored for the purpose of prohibiting, at step S131, for a predetermined period after the response time, communication from being performed between the wireless communication module 37 and the same communication counterpart. The source MAC address and the response time are stored at step S128. If the predetermined period has elapsed from the response time, the source MAC address and the response time are deleted at steps S121 and S122, and thus, the prohibition of the communication is removed.

Next, the wireless communication module 37 generates a connection request frame D1 as shown in FIG. 5A that contains an application ID of a passing communication application, and transmits the connection request frame D1 by broadcast communication (S123). It should be noted that a connection request frame D1 and a connection response frame D2 are both stored in the internal memory of the wireless communication module 37 in advance of the passing communication process being performed. Thereafter, the wireless communication module 37 determines whether a connection response frame D2 as shown in FIG. 5B has been received (S124). When determining that a connection response frame D2 has been received (YES at S124), the wireless communication module 37 further determines whether the application ID contained in the received connection response frame D2 coincides with an application ID that is stored in the internal memory of the wireless communication module 37 (S125). The wireless communication module 37 stores the application ID in the memory (i.e., the internal memory of the wireless communication module 37) when the power of the game apparatus 1 is turned on. The wireless communication module 37 performs the determination at step S125 by using the stored application ID. When determining that the application. ID contained in the received connection response frame D2 does not coincide with the application ID stored in the internal memory of the wireless communication module 37 (NO at S125), the wireless communication module 37 ends the passing communication process.

On the other hand, when determining that the application ID contained in the received connection response frame D2 coincides with the application ID stored in the internal memory of the wireless communication module 37 (YES at S125), the wireless communication module 37 instructs the CPU 31 to read main data D4 from the transmission box 324, and the CPU 31 reads main data D4 from the transmission box 324 in response to the instruction (S126). Here, the wireless communication module 37 starts the CPU 31 prior to step S126 since the game apparatus 1 is in sleep state and the CPU 31 is not started. Next, the wireless communication module 37 generates an information frame D3 as shown in FIG. 5C that contains the main data D4 read by the CPU 31, and transmits the information frame D3 to the source of the connection response frame D2 (S127).

Thereafter, the wireless communication module 37 stores, in its memory, the source MAC address of the connection response frame D2 and the response time (i.e., the current time) (S128). Thereafter, the wireless communication module 37 advances the processing to step S129.

At step S129, the wireless communication module 37 determines whether a process of receiving an information frame D3 has been performed (S129). If a process of receiving an information frame D3 has been performed (YES at S129), the wireless communication module 37 ends the passing communication process. If a process of receiving an information frame D3 has not been performed (NO at S129), the wireless communication module 37 performs step S134, which will be described below, to perform a process of receiving an information frame D3. The reason for this is that the two game apparatuses 1 performing the "passing communication" transmit/receive information frames D3 to/from each other. Accordingly, if the game apparatus 1 has not yet received an information frame D3, the processing proceeds to step S134. It should be noted that if the game apparatus 1 is the transmitting end of a connection response frame D2, it is determined "NO" at step S129 since a process for receiving an information frame D3 has not yet been performed, and step S134 is performed, which will be described below. On the other hand, if the game apparatus 1 is the receiving end of a connection response frame D2 (i.e., if it is determined "NO" at step S137, which will be described below, and steps S125 to S129 are performed), it is determined "YES" at step S129 since a process of receiving an information frame D3 has already been performed, and the passing communication process ends.

Described next is processing that is performed by the wireless communication module 37 when the wireless communication module 37 has determined that a connection response frame D2 has not been received (NO at S124). Here, the wireless communication module 37 determines whether a connection request frame D1 has been received (S130). When determining that a connection request frame D1 has been received (YES at S130), the wireless communication module 37 further determines whether the memory of the wireless communication module 37 stores the source MAC address of the connection request frame D1 (S131). When determining that the memory of the wireless communication module 37 does not store the source MAC address of the connection request frame D1 (NO at S131), the wireless communication module 37 further determines whether the application ID contained in the connection request frame D1 coincides with the application ID stored in the memory of the wireless communication modules 37 (S132).

When determining that the application ID contained in the connection request frame D1 coincides with the application ID stored in the memory of the wireless communication module 37 (YES at S132), the wireless communication module 37 transmits, to the source of the connection request frame D1, a connection response frame D2 that contains the application ID stored in the memory of the wireless communication module 37 (S133). Thereafter, the wireless communication module 37 performs step S134, which will be described below.

On the other hand, when the wireless communication module 37 determines that a connection request frame D1 has not been received (NO at S130), the wireless communication module 37 ends the passing communication process. Also, when determining that the memory of the wireless communication module 37 stores the source MAC address of the connection request frame D1 (YES at S131), the wireless communication module 37 ends the passing communication process. This prevents communication from being repeatedly performed with the same communication counterpart within a short period of time (i.e., within the predetermined period after the response time). When the wireless communication module 37 determines that the application ID contained in the connection request frame D1 does not coincide with the application ID stored in the memory of the wireless communication module 37 (No at S132), the wireless communication module 37 ends the passing communication process.

Next, the process at step S134 is described. The wireless communication module 37 determines whether an information frame D3 has been received (S134). If an information frame D3 has not been received (NO at S134), the wireless communication module 37 ends the passing communication process. On the other hand, if an information frame D3 has been received (YES at S134), the wireless communication module 37 instructs the CPU 31 to store the main data D4 of the information frame D3 in the reception box 323 of the saved data memory 34, and the CPU 31 stores the main data D4 of the information frame D3 in the reception box 323 of the saved data memory 34 in response to the instruction (S135). Here, the wireless communication module 37 starts the CPU 31 prior to step S135 since the game apparatus 1 is in sleep state and the CPU 31 is not started. If main data D4 is already stored in the reception box 323, the main data D4 of the received information frame D3 is newly stored in addition to the main data D4 that has already been stored. Further, when storing the main data D4 in the reception box 323, the CPU 31 adds reception date and time D8 to the main data D4.

Thereafter, the wireless communication module 37 stores, in its memory, the MAC address of the communication counterpart (i.e., the MAC address of the source of the information frame D3) and the response time (i.e., the current time) (S136). The source MAC address and the response time stored here are, similar to the case of the information stored at step S125, used for prohibiting, for a predetermined period after the response time, communication from being performed between the wireless communication module 37 and the same communication counterpart.

Next, the wireless communication module 37 determines whether a process of transmitting an information frame D3 has already been performed (S137). When determining that a process of transmitting an information frame D3 has already been performed (YES at S137), the wireless communication module 37 ends the passing communication process. On the other hand, when determining that a process of transmitting an information frame D3 has not been performed, (NO at S137), the wireless communication module 37 advances the processing to step S125 to perform a process of transmitting an information frame D3. The reason for this is that the two game apparatuses 1 performing the "passing communication" transmit/receive information frames D3 to/from each other. Accordingly, if the game apparatus 1 has not yet transmitted an information frame D3, the processing proceeds to step S125.

Thus, for example, if the game apparatus 1 is the transmitting end of a connection response frame D2, it is determined "NO" at step S137 since a process of transmitting an information frame D3 has not yet been performed, and then the above-described process at step S125 is performed. On the other hand, if the game apparatus 1 is the receiving end of a connection response frame D2 (i.e., if it is determined "NO" at step S129 and then steps S134 to S137 are performed), it is determined "YES" at step S137 since a process of transmitting an information frame D3 has already been performed and the passing communication process ends, accordingly.

It should be noted that the passing communication process described above is merely an example. Any type of processing may be employed as long as the game apparatus 1 can transmit/receive piece information to/from another game apparatus 1.

As described above, in the first embodiment, the game apparatus 1 can obtain piece images G2 not only by the method of obtaining a piece image G2 by the "passing communication" but also by the method of obtaining a piece image G2 in accordance with the movement of the game apparatus 1, that is, a step count of the user of the game apparatus 1. Accordingly, even if the game apparatus 1 is in a situation where the game apparatus 1 cannot perform the "passing communication" with any other game apparatuses 1, the game apparatus 1 can still obtain piece images G2.

Thus, similar to the case where the game apparatus 1 obtains piece images G2 by the "passing communication", the more the user carrying the game apparatus 1 moves, the more the game apparatus 1 can obtain piece images G2. This allows the user to obtain piece images G2 by means of the game apparatus 1 in a similar manner as that of obtaining piece images G2 by the "passing communication". Thus, even in a situation where the game apparatus 1 cannot obtain piece images G2 by the "passing communication", the user can enjoy a simulated experience as if piece images G2 were obtained by the "passing communication".

Further, in the present embodiment, if no piece image G2 can be obtained by the "passing communication", or if piece images G2 obtained by the "passing communication" alone are insufficient to complete all the collection images G1, then the game apparatus 1 is allowed to perform, a limited number of times within one day, the method of obtaining a piece image G2 in accordance with a step count of the user of the game apparatus 1, thereby obtaining piece images G2. Thus, the game apparatus 1 can use the method of obtaining a piece image G2 in accordance with a step count of the user of the game apparatus 1, only as a measure to supplement the obtaining of piece images G2 when the "passing communication" alone is insufficient to obtain piece images G2.

Second Embodiment

Hereinafter, a second embodiment of present invention will be described. The second embodiment is the same as the first embodiment with respect to the following points: the present invention is applied to the game apparatus 1; and the communication system includes a plurality of game apparatuses 1. Since the configuration of the game apparatus 1 is the same as in the first embodiment (i.e., same as the configuration shown in FIG. 1 and FIG. 2), the description thereof is omitted.

The second embodiment is different from the first embodiment in that the game apparatus 1 performs a heroes battle application instead of the piece collection application. The heroes battle application is a program for causing the game apparatus 1 to perform a heroes battle process, thereby allowing the user to enjoy a heroes battle game. Hereinafter, the heroes battle game according to the second embodiment will be described with reference to FIG. 18 and FIG. 19.

Figure 18:
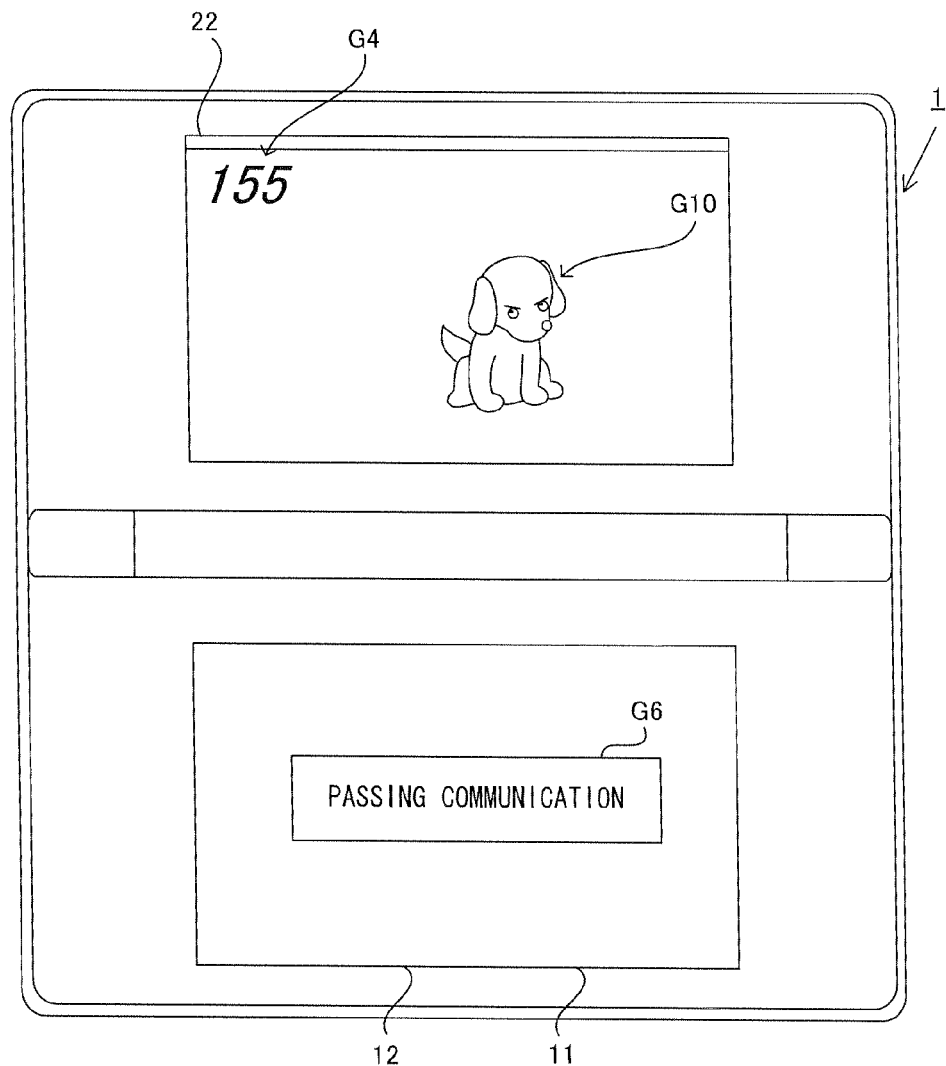
FIG. 18 shows an example of a main screen and an operation screen that are displayed in a heroes battle game.

FIG. 18 shows an example of a main screen and an operation screen that are displayed for the heroes battle game. The main screen and the operation screen are displayed first when the heroes battle application is started. The main screen is displayed on the upper LCD 22, and the operation screen is displayed on the lower LCD 12. The main screen shows an image G10 of an enemy character (hereinafter, referred to as an "enemy character image G10") and the owned coin count G4.

A plurality of types of enemy characters G10 are prepared and they are assigned respective numbers in advance, which numbers indicate a sequence in which the enemy characters G10 are displayed. Only one of the enemy characters G10 is shown in the main screen. If the enemy character G10 shown in the main screen is defeated, then the next enemy character G10 in the display sequence is shown in the screen. The enemy character image G10 in the final position in the display sequence is an image of a boss character. The user wins the heroes battle game (clear the game) when the user beats the boss character. Since the owned coin count G4 is the same as that in the first embodiment, the description thereof is omitted. In the present embodiment, the numbers indicating the display sequence are assigned to the enemy characters G10, respectively. However, the enemy characters G10 to be shown in the main screen may be sequentially selected in random order. Moreover, the number of types of enemy character images G10 to be prepared need not be plural. Only a single enemy character image G10 may be prepared.

One of the methods of defeating an enemy character is to defeat an enemy character by use of character information that the game apparatus 1 obtains by the "passing communication". The game apparatus 1 performs the passing communication process in the same manner as that described in the first embodiment. Accordingly, the game apparatus 1 transmits character information about a character generated by the game apparatus 1 to another game apparatus 1, and receives character information about a character generated by the other game apparatus 1 from the other game apparatus 1. In this manner, the game apparatus 1 obtains the character information from the other game apparatus 1.

Similar to the first embodiment, the operation screen in the second embodiment shows the passing communication operation button. G6. The user provides, by operating the passing communication operation button G6, an instruction to perform the passing communication process. Also in this respect, the second embodiment is the same as the first embodiment.

Figure 19:
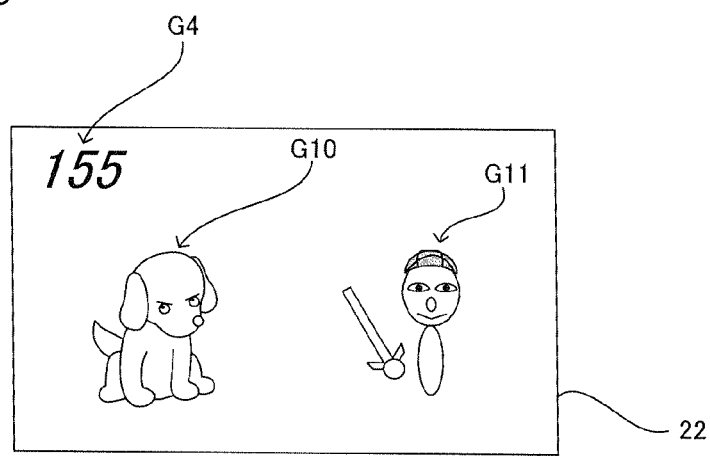
FIG. 19 shows an example of a battle screen, displayed by the game apparatus 1, which shows an attack to an enemy character.

Described below with reference to FIG. 19 is the method in which the game apparatus 1 beats an enemy character G10 by using character information obtained from another game apparatus 1. FIG. 19 shows an example of a battle screen, displayed by the game apparatus 1, which shows an attack to an enemy character. The battle screen shows the owned coin count G4, an enemy character image G10, and an image G11 of a hero character (hereinafter, referred to as a "hero character image G11"). The battle screen is displayed on the upper LCD 22.

The hero character image G11 is generated based on character information that is received by the "passing communication". In the present embodiment, the game apparatus 1 executes a predetermined character information generation program, thereby allowing the user to generate character information. The game apparatus 1 stores a plurality of types of image data (character image data D24 described below) for each part (e.g., eyes, mouth, nose, etc.) of a character to be created. For example, for the mouth, a plurality of types of mouth images are stored. The character information specifies, for each part of a character to be created, one piece of character image data D24 among a plurality of types of character image data D24. The game apparatus 1 generates a hero character image G11 by combining pieces of character image data D24 that are specified by the character information, and displays the generated image.

In the present embodiment, the game apparatus 1 transmits/receives character information to/from another game apparatus 1. However, as alternative, the game apparatus 1 may transmit/receive image data of hero character images G11.

In the second embodiment, similar to the first embodiment, the game apparatus 1 can generate character information based on information relating to the movement of the game apparatus 1, in order to supplement the obtaining of character information when the "passing communication" alone is insufficient to obtain character information. In the second embodiment, similar to the first embodiment, the game apparatus 1 has a pedometer function, and generates character information based on the user's step count that is detected by the pedometer function. In the second embodiment, the user's step count is converted into the owned coin count a in the same manner as described in the first embodiment. Then, the owned coin count a is consumed to purchase character information.

In the present embodiment, upon receiving character information, the game apparatus 1 generates and displays a hero character image G11, and also determines an attack value that corresponds to the hero character. In the present embodiment, the attack value is determined based on the number of times the same character information has been received in the past (i.e., the number of times of passing other game apparatuses and thereby receiving the same character information in the past; hereinafter, simply referred to as "the number of times of passing"). The greater the number of times of passing, the greater the attack value. Although in the present embodiment the attack value of a hero character is determined based on the number of times of passing, the attack value of a hero character may be determined based on a different condition. As a further alternative, the attack value of a hero character may be fixed.

A damage limit value is set for an enemy character. The game apparatus 1 stores the attack value of a hero character, as a damage value of an enemy character. When the damage value reaches the damage limit value set for an enemy character, it is determined that the enemy character has been defeated. Then, the next enemy character is displayed. If the enemy character that has been defeated is the boss character, the heroes battle game is cleared.

If the attack value of one hero character is not sufficient to defeat an enemy character, the attack value of a hero character appearing next is added to the damage value of the enemy character. Then, if the damage value of the enemy character has reached the damage limit value, the enemy character is defeated.

Next, another feature of the second embodiment is described. This other feature of the second embodiment is that an attribute is set for a hero character, and only when the attribute satisfies a predetermined condition (hereinafter, referred to as an "effective attack condition"), an attack by the hero character against an enemy character is determined to be effective. Accordingly, not all the hero characters can attack the enemy character. Whether a hero character can attack the enemy character depends on the attribute of the hero character. This adds a variation to the heroes battle process, and enhances the amusement of the heroes battle game.

It should be noted that another method of defeating an enemy character, i.e., a method of attacking an enemy character by using character information that is purchased by consuming the owned coin count a, is performed in a similar manner to the above-described method of attacking an enemy character by using character information that is obtained by the "passing communication".

Hereinafter, the passing communication process performed in the second embodiment will be described with reference to FIG. 20. The passing communication process performed in the second embodiment is the same as the first embodiment except that the contents of main data D4a contained in an information frame D3 are different from the contents of main data D4 of the first embodiment. Therefore, the description is omitted except for the description of the contents of main data D4a. FIG. 20 shows the contents of the main data D4a according to the second embodiment. The main data D4a contains an application ID and character information D20. The application ID is information for identifying an application. In the second embodiment, the application ID is information that identifies the heroes battle application unless otherwise specified. The contents of character information D20 will be described below in detail. Since each information frame D3 contains character information D20, the game apparatus 1 can transmit/receive character information D20 to/from other game apparatuses 1.

Figure 21:
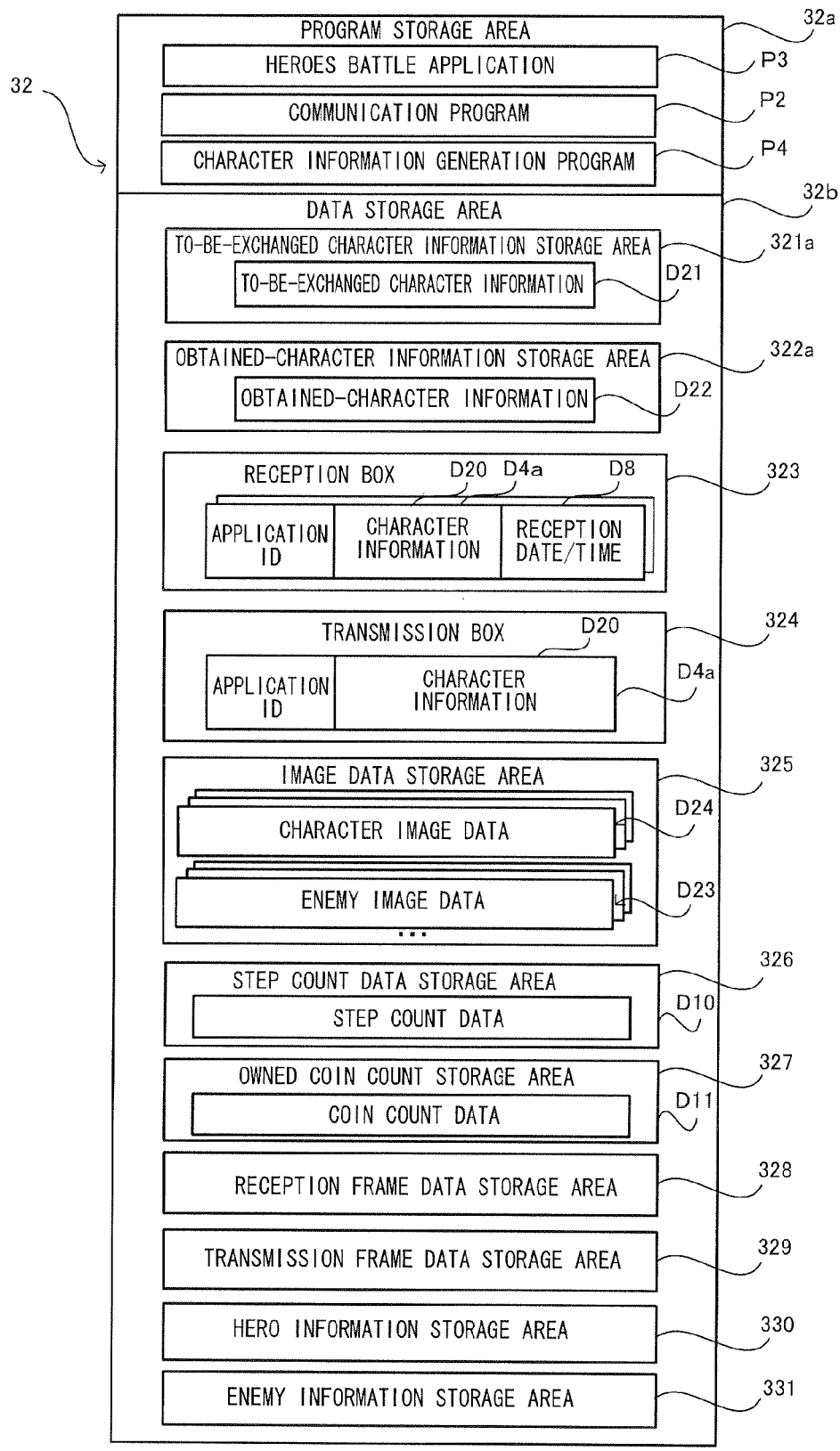
FIG. 21 is a memory map showing an example of programs and data that are stored in the main memory 32.

Described below with reference to FIG. 21 are programs and data that are stored in the main memory 32 in the second embodiment. FIG. 21 is a memory map showing an example of programs and data that are stored in the main memory 32. The main memory 32 includes, similar to the first embodiment, the program storage area 32a and the data storage area 32b. The second embodiment is different from the first embodiment in that the program storage area 32a stores a heroes battle application P3 in place of the piece collection application and further stores a character information generation program P4.

As described above, the heroes battle application P3 is a program for causing the game apparatus 1 to perform the heroes battle process. The heroes battle application P3 will be described below in detail with reference to FIG. 25 to FIG. 27. The character information generation program P4 is a program for causing the game apparatus 1 to generate character information D20 as described above. The character information generation program P4 and the heroes battle application P3 are loaded as necessary from the saved data memory 34, the memory card 28, the cartridge 29, or the like, into the program storage area 32a.

The second embodiment is different from the first embodiment in that the data storage area 32b includes a to-be-exchanged character information storage area 321a and an obtained-character information storage area 322a in place of the to-be-exchanged piece information storage area 321 and the obtained-piece information storage area 322.

Character information D20 that is to be transmitted to another game apparatus 1 by the "passing communication" is stored as to-be-exchanged character information D21 in the to-be-exchanged character information storage area 321a. The character information D20 and the to-be-exchanged character information D21 are described below with reference to FIG. 22A. FIG. 22A shows an example of the character information D20 and the to-be-exchanged character information D21.

Both of the character information D20 and the to-be-exchanged character information D21 contain the following information that is set when the user creates a character by using the game apparatus 1: color information; height/physical attribute information; character name; character ID; and character image information. The color information indicates a color set by the user. The height/physical attribute information indicates the height (i.e., how tall) and the physical attribute (i.e., how thick) of the character, which are set by the user. The character name indicates a character name set by the user. The character ID is identification information unique to the character, which is automatically set when the character information is generated. The character image information indicates pieces of character image data D24 (described below) that the user has selected for respective parts of the character to be created. In the character information generation process, the game apparatus 1 receives operations that the user performs to select, for each part of the character to be created (e.g., eyes, nose, mouth, outline, and hair), one among pieces of character image data D24 that indicate multiple selection options. The character image information indicates the IDs of such selected pieces of character image data D24 in association with corresponding part IDs.

Returning to FIG. 21, the obtained-character information storage area 322a stores obtained-character information D22 which is generated by adding, to character information D20 received from another game apparatus 1, a date and time when the character information D20 has been received. It is understood that the number of pieces of obtained-character information D22 stored in the obtained-character information storage area 322a is plural if a plurality of pieces of obtained-character information D22 have been generated. The contents of the obtained-character information D22 are a result of adding the reception date and time to the contents of the character information D20 and the to-be-exchanged character information D21 that are shown in FIG. 22A.

In the second embodiment, information stored in the reception box 323 and information stored in the transmission box 324 are different from those described in the first embodiment. To be specific, each of the reception box 323 and the transmission box 324 stores main data D4a in place of main data D4.

The main data D4a is originally contained in an information frame D3 that is received from another game apparatus 1 by the "passing communication". When an information frame D3 is received, the main data D4a contained in the information frame D3 is stored with reception date and time D8 added thereto. If a plurality of information frames D3 are received, a plurality of pieces of main data D4a are stored, accordingly. The character information D20 contained in the received main data D4a is read by the CPU 31 in response to an instruction from the user, and then stored as obtained-character information D22 in the obtained-character information storage area 322a. It should be noted that even if the character information D20 that is to be newly stored as obtained-character information D22 is identical to one already stored as obtained-character information D22, the character information D20 is stored in addition to the obtained-character information D22 that is already stored. If there is no more space in the obtained-character information storage area 322a, the reception date and time D8 of each piece of obtained-character information D22 that is already stored therein is referred to, and the oldest piece of obtained-character information D22 is deleted from the obtained-character information storage area 322a. Then, new obtained-character information D22 is stored.

The transmission box 324 stores main data D4a that is to be transmitted to another game apparatus 1 by the "passing communication". The transmission box 324 is different from the reception box 323 in that the main data D4a stored in the transmission box 324 does not have reception date and time D8 added thereto and only one piece of main data D4a is stored in the transmission box 324. At the time of performing the "passing communication", a copy of the main data D4a in the transmission box 324 is generated, and an information frame D3 containing the copy of the main data D4a is transmitted.

Moreover, image data stored in the image data storage area 325 is different from that described in the first embodiment. The image data storage area 325 stores image data to be displayed by the game apparatus 1. The image data contains image data D23 of enemy character images G10 as described above (hereinafter, referred to as "enemy character image data D23") and image data D24 of hero character images G11 as described above (hereinafter, referred to as "character image data D24"). In the present embodiment, as described above, character information D20 contains IDs of pieces of character image data D24 that are associated with respective part IDs. Accordingly, these pieces of character image data D24 are specified in association with corresponding parts of a character to be created. Images based on the specified pieces of character image data D24 are placed at the positions of the corresponding parts, and thus combined. In this manner, the hero character image G11 is generated.

In the second embodiment, the data storage area 32b includes a hero information storage area 330 and an enemy information storage area 331. Hereinafter, data stored in the hero information storage area 330 is described with reference to FIG. 22B and FIG. 22C. FIG. 22B shows an example of the data stored in the hero information storage area 330. The hero information storage area 330 stores hero character information D25, hero level information D26, and a hero level table T1. It should be noted that the hero character information D25 is deleted after an attack by a hero character has been performed (i.e., after the attack has ended either successfully or in failure) (as an alternative, the hero character information D25 may be kept stored). Then, before an attack by a new hero character is performed, the hero character information D25 is newly generated and stored in the hero information storage area 330 (or the hero character information D25 is updated).

The hero character information D25 is character information D20 about a hero character to fight against an enemy character. A hero character image G11 is generated based on the hero character information D25 and shown in the main screen as in FIG. 19. The hero level information D26 indicates the level of strength (hero level) of a hero character associated with the hero character information D25. The hero character causes damage to an enemy character by using an attack value based on the hero level information D26. The hero level information D26 is determined by referring to the hero level table T1. The hero level table T1 is described below with reference to FIG. 22C. FIG. 22C shows an example of the hero level table T1. Registered in the hero level table T1 is information regarding different hero levels, each of which is associated with its corresponding "number of times of passing" and "number of coins".

When character information D20 is obtained by the "passing communication", the hero level table T1 is searched based on "the number of times of passing" with respect to the character information D20 that has been obtained, and hero level information associated with "the number of times of passing" is obtained. Here, "the number of times of passing" is obtained by referring to the number of pieces of character information D20, stored in the obtained-character information storage area 322a, which are the same as the character information D20 obtained at this time (and each of which contains the same character ID as that contained in the character information D20 obtained at this time). If character information D20 is purchased by consuming the owned coin count a, then the hero level table T1 is searched based on the number of consumed coins. Accordingly, hero level information corresponding to the number of consumed coins is obtained. Then, the hero level information obtained from the hero level table T1 is stored in the hero information storage area 330 as hero level information D26. That is, the same type of data is generated and stored in the hero information storage area 330 either in a case where character information D20 is obtained by the "passing communication" or in a case where character information D20 is purchased by consuming the owned coin count a.

Next, data stored in the enemy information storage area 331 is described with reference to FIG. 23 to FIG. 24C. FIG. 23 shows an example of the data stored in the enemy information storage area 331. The enemy information storage area 331 stores enemy information D27, enemy number information D28, an enemy information table T2, and an effective attack condition table T3.

The enemy information D27 indicates information about an enemy character that is in its turn to fight against a hero character. Hereinafter, the enemy information D27 is described with reference to FIG. 24A. FIG. 24A shows an example of the enemy information D27. The enemy information D27 contains enemy number information, enemy name information, damage limit value information, current damage value information, type information, and a condition ID. The enemy number information indicates what number the enemy character is in a sequence of taking turns fighting against the hero character. For example, if three enemy characters of different types are prepared, the number indicated by the enemy number information is 1, 2, or 3. The enemy characters take turns fighting against the hero character in ascending order of the numbers indicated by the enemy number information of the respective enemy characters. The enemy number information is associated with corresponding enemy character image data D23. The enemy character image G10 of the enemy character is generated and displayed by using the enemy character image data D23 that is associated with the enemy number information of the enemy character. The enemy name information indicates the name of the enemy character. The damage limit value information indicates a damage limit value which is a physical energy value of the enemy character. The current damage value information indicates a current damage value of the enemy character. The current damage value information indicates the sum of attack values of hero characters having fought against the enemy character. The enemy character is determined to be defeated when the current damage value exceeds the damage limit value. The type information indicates whether the enemy character is a low level character or a boss character. The condition ID identifies the effective attack condition that is currently set. If the effective attack condition is not set, information indicating the absence of the setting (i.e., information indicating "no effective attack condition") is contained in the condition ID.

The enemy number information D28 indicates the enemy number information that is associated with the enemy character currently fighting against a hero character.

The enemy information table T2 is used for generating the enemy information D27. Hereinafter, the enemy information table T2 is described with reference to FIG. 24B. FIG. 24B shows an example of the enemy information table T2. In the enemy information table T2, pieces of enemy name information, pieces of damage limit value information, and pieces of type information are registered in association with corresponding pieces of enemy number information. The enemy information D27 is generated in the following manner: enemy name information, damage limit value information, and type information are obtained by searching the enemy information table T2 based on the enemy number information D28; and then the enemy information D27 containing the obtained information is generated.

The effective attack condition table T3 has effective attack conditions registered therein. Each condition indicates what needs to be satisfied in order for an attack by a hero character to be effective. In the present embodiment, such a condition for an attack by a hero character to be effective is set if the type information indicates a boss enemy character. These conditions are set by using the effective attack condition table T3. Hereinafter, the effective attack condition table T3 is described with reference to FIG. 24C. FIG. 24C shows an example of the effective attack condition table T3. In the effective attack condition table T3, condition IDs, pieces of damage value information, and effective attack conditions are registered in association with one another. Then, in a case where a hero character attacks an enemy character, the effective attack condition table T3 is searched based on the condition ID of the enemy information D27 of the enemy character, and the damage value information and the effective attack condition that are associated with the condition ID are obtained. To be specific, in a case where the condition ID of the enemy information D27 indicates "1", the damage value information "300" and the effective attack condition "Initial letter of character name is A" are obtained. In this case, only when the current damage value indicates a damage value of 300, determination is performed as to whether the effective attack condition, "Initial letter of character name is A", is satisfied. That is, only when the hero character information D25 of the hero character satisfies the effective attack condition, the attack by the hero character is effective, and the attack value that corresponds to the hero level information D26 of the hero character is added to the current damage value indicated by the enemy information D27. It should be noted that if the current damage value does not indicate a damage value of 300, the determination regarding the effective attack condition is not performed, and the attack by the hero character is always effective. If the hero character information D25 satisfies the effective attack condition, the condition ID of the enemy information D27 is updated to the next condition ID, and the next effective attack condition is set. For example, the condition ID of the enemy information D27 is updated from "1" to "2". In this case, when the current damage value indicates a damage value of 400, determination is performed as to whether the next effective condition, "hero's color information is red", is satisfied. As shown in the table T3, the condition IDs are assigned respective sequence numbers, for example.

Similar to the first embodiment, the main memory 32 of the second embodiment includes the step count data storage area 326, the owned coin count storage area 327, the reception frame data storage area 328, the transmission frame data storage area 329, and the VRAM area which is not shown.

Among the above-described data, the data D4a and D21 to D28 are read from the saved data memory 34 and then stored in the data storage area 32b when the heroes battle application. P3 is started, for example. Also, the data D4a and D21 to D28 are stored in the saved data memory 34 at the end of the execution of the heroes battle application P3. Further, the tables T1 to T3 are read from the memory card 28, the cartridge 29, or the like and then stored in the data storage area 32b.

Figure 25:
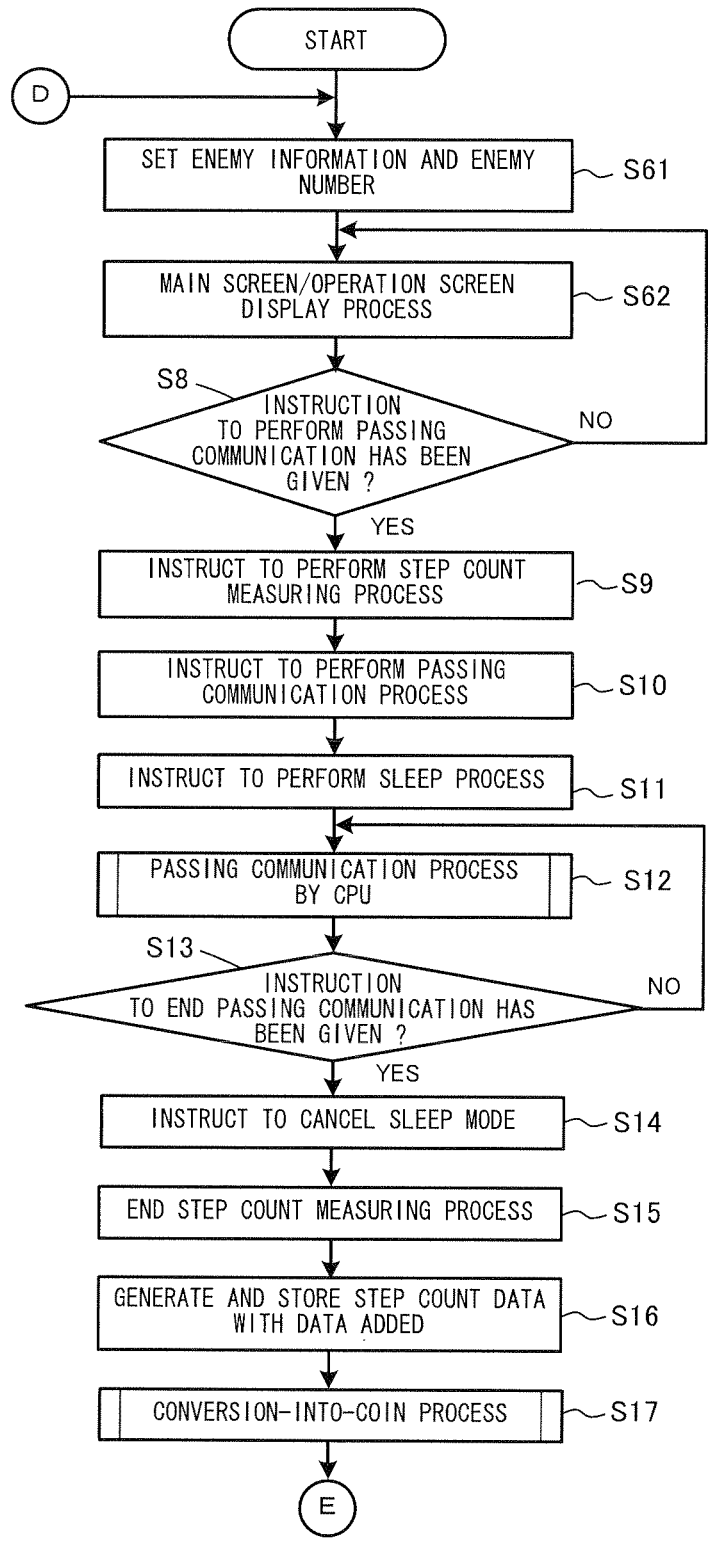
FIG. 25 shows a flowchart (first part) that shows an example of a heroes battle process.
Figure 26:
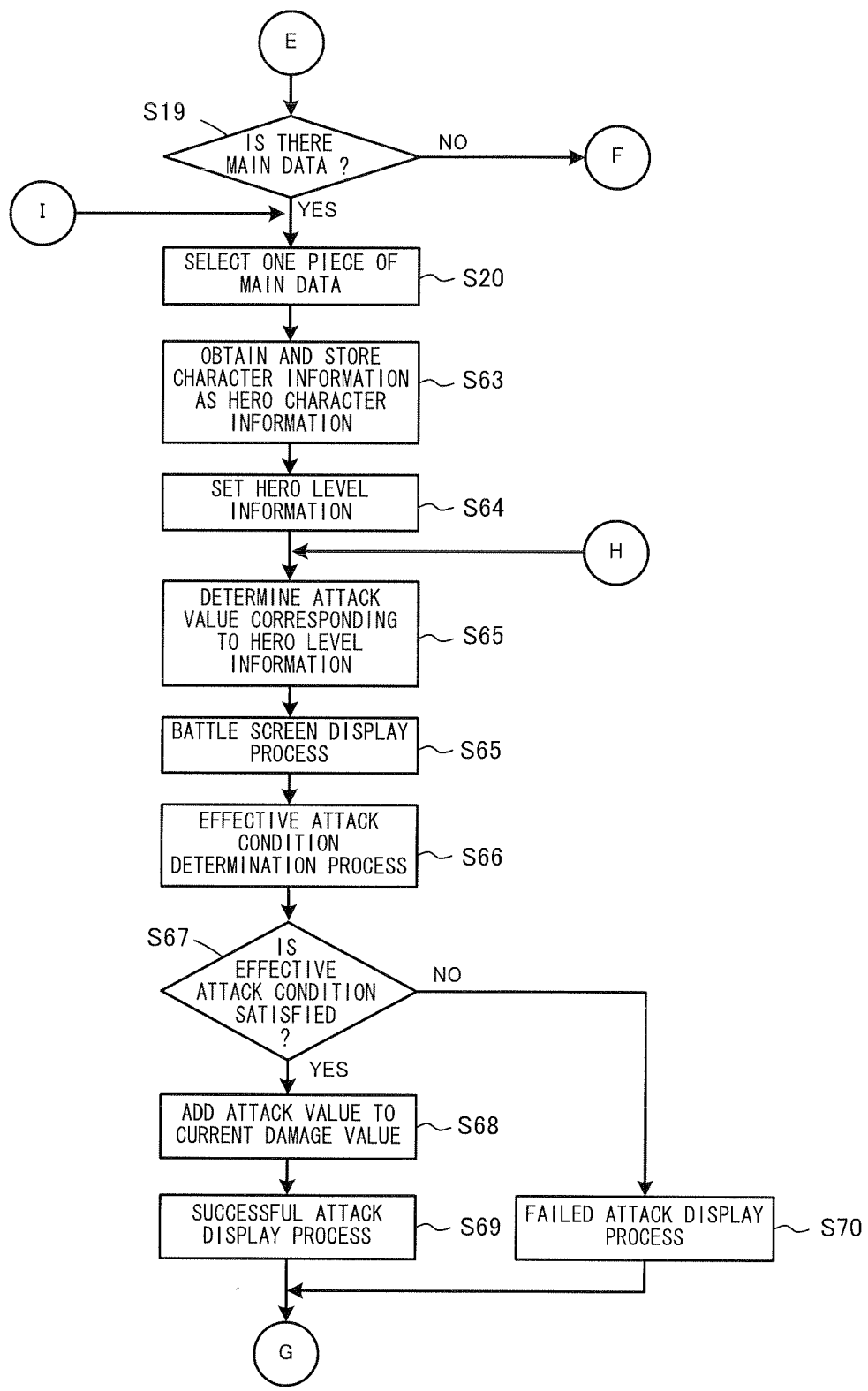
FIG. 26 shows the flowchart (second part) that shows the example of the heroes battle process.
Figure 27:
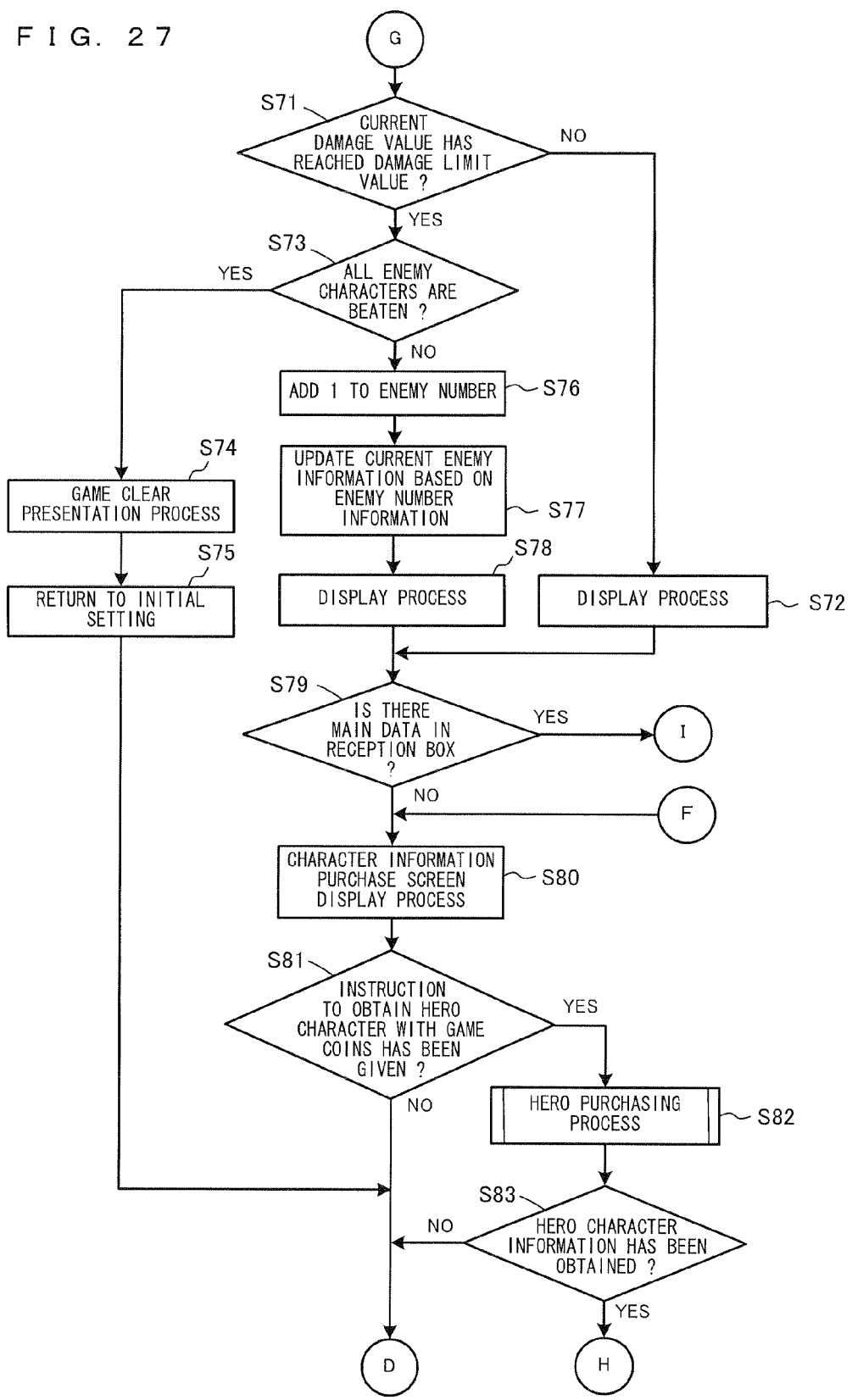
FIG. 27 shows the flowchart (third part) that shows the example of the heroes battle process.

Hereinafter, the heroes battle process according to the second embodiment will be described with reference to FIG. 23 to FIG. 28. FIG. 25 to FIG. 27 show a flowchart that shows an example of the heroes battle process. It should be noted that, in the description of the heroes battle process, the same process steps as those of the piece collection process according to the first embodiment are denoted by the same step numbers as those used in the description of the piece collection process. The heroes battle process is started when the user gives an instruction to execute the heroes battle application.

First, the CPU 31 reads the enemy information table T2, the enemy information D27, and the enemy number information D28 from the saved data memory 34. Here, if the heroes battle application is run for the first time, the enemy information D27 and the enemy number information D28 are not stored in the saved data memory 34. In this case, the CPU 31 sets the enemy number information D28 to "1", and searches the enemy information table T2 based on the enemy number information D28 and thereby generates the enemy information D27. The CPU 31 sets, in the main memory 32, the enemy information D27 and the enemy number information D28 that are either read from the saved data memory 34 or generated in the above manner (S61). It should be noted that, in the case of generating the enemy information D27 of a low level enemy character, information that indicates "no effective attack condition" is always contained in the condition ID of the enemy information D27. Further, in the case of generating the enemy information D27 of a boss enemy character, the condition ID of the smallest number is contained in the enemy information D27.

Next, the CPU 31 performs a display process of displaying the main screen and the operation screen as shown in FIG. 18, by using the enemy character image data D23 and the step count data D10 that are associated with the enemy number information D28 (S62). Then, the CPU 31 determines whether an instruction to perform the "passing communication" has been received from the user (S8). When determining that an instruction to perform the "passing communication" has not been received from the user (NO at S8), the CPU 31 returns the processing to step S62. On the other hand, when determining that an instruction to perform the "passing communication" has been received from the user (YES at S8), the CPU 31 instructs the microcomputer 38 to perform the step count measuring process (S9).

Since the process steps S9 to S17 are the same as those performed in the piece collection process of the first embodiment (see FIG. 8), the detailed description thereof is omitted. At process steps S9 to S17, the passing communication process, the process relating to the sleep mode, the process of converting step count data D10 into coin count data D11, etc., are performed.

Referring to FIG. 26, after step S17, the CPU 31 performs the process steps S19 and S20. That is, the CPU 31 determines whether main data D4a is stored in the reception box 323. When determining that main data D4a is stored in the reception box 323 (YES at S19), the CPU 31 selects and reads a piece of main data D4a from among the main data D4a stored in the reception box 323, and obtains the character information D20 and the reception date and time D8 that are contained in the read main data D4a (S20). Then, the CPU 31 generates obtained-character information D22 that contains the character information D20 and the reception date and time D8 that have been obtained, and stores the obtained-character information D22 in the obtained-character information storage area 322a. Also, the CPU 31 stores the character information D20 that has been obtained, in the main memory 32 as hero character information D25 (S63). Then, the main data D4a processed at step S20 is deleted from the reception box 323. Thereafter, the CPU 31 reads the hero level table T1 from the saved data memory 34, and uses the hero level table T1 to determine the hero level information D26 that corresponds to the hero character information D25. Then, the CPU 31 sets the hero level information D26 in the main memory 32 (S64).

The CPU 31 determines an attack value that corresponds to the hero level information D26 that has been set. For example, this determination is performed in the following manner: attack values corresponding to respective pieces of level information are stored in the saved data memory 34 in the form of, for example, a table; and then an attack value corresponding to the hero level information D26 that has been set is determined by referring to the table.

Thereafter, the CPU 31 performs a display process of displaying a battle screen as shown in FIG. 19 (S65). To be specific, the CPU 31 generates a hero character image G11 based on the hero character information D25, and performs a process for showing, in a battle screen, the hero character image G11 together with an enemy character image G10.

Subsequently, the CPU 31 determines an effective attack condition (S66). To be specific, the CPU 31 reads the effective attack condition table T3 from the saved data memory 34. If the type information contained in the enemy information D27 indicates a low level enemy character, it is determined that there is no effective attack condition. Here, even when the type information indicates a boss enemy character, it is determined that there is no effective attack condition if the condition ID contained in the enemy information D27 indicates "no effective attack condition". However, if the type information indicates a boss enemy character and the condition ID contained in the enemy information D27 does not indicate "no effective attack condition", then the table T3 is searched based on the condition ID, and the damage value information and the effective attack condition that are associated with the condition ID are obtained. Then, if the current damage value indicated by the enemy information D27 is not the value indicated by the damage value information that has been obtained, it is determined that there is no effective attack condition. On the other hand, if the current damage value indicated by the enemy information D27 is the value indicated by the damage value information that has been obtained, then the effective attack condition that has been obtained is determined to be an effective attack condition to satisfy.

Then, the CPU 31 determines based on the information contained in the hero character information D25 whether the effective attack condition is satisfied (S67). For example, if the effective attack condition is that "hero's color information is red", then the effective attack condition is determined to be satisfied when the color information contained in the hero character information D25 indicates "red". At step S67, it is always determined "YES" if no effective attack condition is set. When the CPU 31 determines that the effective attack condition is satisfied (YES at S67), the CPU 31 adds the attack value, which has been determined as above, to the current damage value indicated by the enemy information D27 (S68). If the type information contained in the enemy information D27 indicates a boss enemy character and the condition ID in the enemy information D27 does not indicate absence of an effective attack condition, then the CPU 31 updates the condition ID in the enemy information D27 to the next condition ID (if there is no next condition ID, the CPU 31 updates the condition ID so as to indicate "no effective attack condition"). Then, the CPU 31 performs a display process of displaying a presentation screen showing that the attack has been successful (S69). Thereafter, the CPU 31 advances the processing to step 71.

On the other hand, if the CPU 31 determines that the effective attack condition is not satisfied (NO at S67), the CPU 31 performs a display process of displaying a presentation screen showing that the attack has ended in failure (S70). Thereafter, the CPU 31 advances the processing to step S71.

Referring to FIG. 27, at step S71, the CPU 31 determines whether the current damage value indicated by the enemy information D27 has reached the value of the damage limit value information contained in the enemy information D27 (S71). When determining that the current damage value has not reached the value of the damage limit value information (NO at S71), the CPU 31 performs a display process of displaying only the same enemy character image G10 on the upper LCD 22 (e.g., the display process of displaying the main screen as shown in FIG. 19) (S72), and then advances the processing to step S79 described below.

On the other hand, when determining that the current damage value has reached the value of the damage limit value information (YES at S71), the CPU 31 refers to the enemy number information D28 and determines whether all the enemy characters have been defeated (S73). When determining that all the enemy characters have been defeated (YES at S73), the CPU 31 performs a display process of displaying a presentation screen showing that the game has been cleared (S74). Thereafter, the CPU 31 performs a predetermined initialization process, for example, deleting the data D25 to D28 stored in the saved data memory 34 (S75). Then, the CPU 31 returns the processing to step S61.

On the other hand, when the CPU 31 determines that the enemy characters have not all been defeated (NO at S73), the CPU 31 adds 1 to the enemy number information D28 (S76). Then, the CPU 31 searches the enemy information table T2 based on the enemy number information D28 to generate new enemy information D27, and updates the enemy information D27 stored in both the main memory 32 and the saved data memory 34, with the newly generated enemy information D27 (S77). Here, the current damage value indicated by the new enemy information D27 is set to 0. Moreover, when the enemy information D27 of a low level enemy character is generated, information indicating "no effective attack condition" is always contained as the condition ID of the enemy information D27. Furthermore, when the enemy information D27 of a boss enemy character is generated, the condition ID of the smallest number is contained in the enemy information D27. Then, the CPU 31 generates an enemy character image G10 by using the enemy character image data D23 that is associated with the enemy number information D28, and performs a display process of displaying the generated enemy character image G10 on the upper LCD 22 (S78).

Next, the CPU 31 determines whether main data D4a is stored in the reception box 323 (S79). When determining that main data D4a is stored in the reception box 323 (YES at S79), the CPU 31 returns the processing to step S20. In other words, the above-described steps S20 and S63 to S78 are repeated until main data D4a is no longer stored in the reception box 323 (NO at S79) or all the enemy characters have been defeated (YES at S73).

On the other hand, when the CPU 31 determines that no main data D4a is stored in the reception box 323 (NO at S79), the CPU 31 performs a display process of displaying a character information purchase screen (S80). The character information purchase screen provides a guide for the user to perform an operation for purchasing character information D20 by using the coins owned by the user. For example, a message indicating that the user is permitted to purchase character information D20, such as "You can buy a hero character with your coins", is displayed.

Next, the CPU 31 determines whether an instruction to purchase character information D20 by consuming the owned coin count a has been received from the user (S81). When determining that an instruction to purchase character information D20 has not been received from the user (NO at S81), the CPU 31 returns the processing to step S61.

On the other hand, when determining that an instruction to purchase character information D20 by consuming the owned coin count a has been received from the user (YES at S81), the CPU 31 performs a process of reducing the owned coin count a and causing the game apparatus 1 to obtain character information D20 (a hero purchasing process) (S82). The hero purchasing process will be described below in detail with reference to FIG. 28. When character information D20 is obtained in the hero purchasing process by consuming the owned coin count a, the character information D20 that has been obtained is stored in the main memory 32 as hero character information D25. Thereafter, the CPU 31 determines whether hero character information D25 has been obtained (S83). When determining that hero character information D25 has not been obtained (NO at S83), the CPU 31 returns the processing to step S61. On the other hand, when determining that hero character information D25 has been obtained (YES at S83), the CPU 31 returns the processing to step S65. As a result, processing for causing a hero character to attack an enemy character can be performed based on the newly obtained hero character information D25.

As described above, as long as main data D4a is stored in the reception box 323, the hero purchasing process is not permitted. This is because the purpose of the purchase of character information D20 by consuming the owned coin count a is to supplement the obtaining of character information D20 when the "passing communication" alone is insufficient to obtain character information D20.

If it is determined NO at step S19, that is, if no main data D4a has been obtained by the "passing communication" (NO at S19), the CPU 31 performs the process at step S80. Also in this case, the purchase of character information D20 by consuming the owned coin count a is permitted for the purpose of supplementing the obtaining of character information D20 since the "passing communication" alone is insufficient to obtain character information D20.

Figure 28:
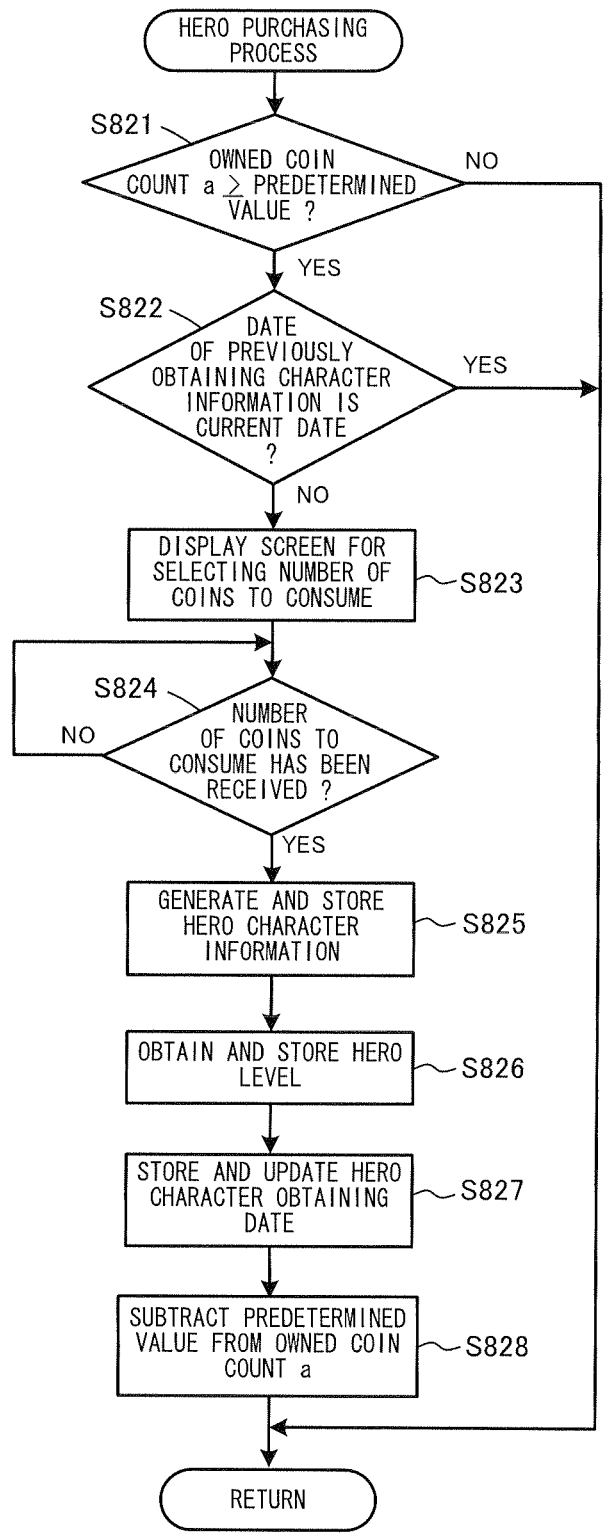
FIG. 28 is a flowchart showing an example of a hero purchasing process.

Next, the hero purchasing process performed at step S82 is described with reference to FIG. 21 and FIG. 28. FIG. 28 is a flowchart showing an example of the hero purchasing process. First, the CPU 31 reads the step count data D10 from the saved data memory 34 and determines whether the owned coin count a indicated by the step count data D10 is greater than or equal to a predetermined value (e.g., 1) (S821). The predetermined value indicates the amount of owned coin count a that is the minimum required amount of owned coin count a for the purchase of character information D20. When determining that the owned coin count a is not greater than or equal to the predetermined value (e.g., 1) (NO at S821), the CPU 31 ends the hero purchasing process without performing process steps (steps S822 to S828 described below) for purchasing character information D20 since the game apparatus 1 does not have the necessary amount of owned coin count a for the purchase of character information D20. Then, the CPU 31 returns the processing to the main routine shown in FIG. 27.

On the other hand, when the CPU 31 determines that the owned coin count a is greater than or equal to the predetermined value (e.g., 1) (YES at S821), the CPU 31 determines whether a date when character information D20 has previously been obtained is the current date (S822). This determination is performed by referring to character obtaining date data stored in the saved data memory 34. The character obtaining date data indicates a date when character information D20 has most recently been obtained. When the heroes battle application is run for the first time, the character obtaining date data is not stored in the saved data memory 34. In this case, at step S822, the CPU 31 sets the character obtaining date data of an initial value in the saved data memory 34, and determines "NO". When character information D20 is obtained in the hero purchasing process, the character obtaining date data is updated at step S827, which will be described below, to the date when the character information D20 has been obtained.

When the CPU 31 determines that a date when character information D20 has previously been obtained is the current date (YES at S822), the CPU 31 ends the hero purchasing process without performing process steps (steps S823 to S828 described below) for purchasing character information D20 since character information D20 is allowed to be purchased only once a day. Then, the CPU 31 returns the processing to the main routine shown in FIG. 27. However, the purchase of character information D20 need not be limited to once a day. The number of times the purchase of character information D20 is allowed within one day may be set to a predetermined number that is two or more. In this case, the game apparatus 1 may store the number of times the purchase of character information D20 has been performed, refer to the stored number of times and the character obtaining date data, and determine whether the number of times the purchase of character information D20 has been performed at the current date is within the predetermined number. Alternatively, the purchase of character information D20 may be allowed unlimitedly.

On the other hand, when the CPU 31 determines that a date when character information D20 has previously been obtained is not the current date (NO at S822), the CPU 31 performs a display process for displaying a screen that provides a guide for the user to select an amount of the owned coin count a to consume (S823). In the present embodiment, the more the owned coin count a is consumed, the greater is the hero level information D26, i.e., the attack value, of the hero character of the character information D20 obtained by the consumption of the owned coin count a. For this reason, at step S823, a hero level is displayed based on an amount of the owned coin count a to be consumed. For example, the displayed hero level is 1 if one coin is to be consumed from the owned coin count a, and the displayed hero level is 2 if two coins are to be consumed from the owned coin count a. However, as an alternative, the hero level to be displayed need not be variable depending on the user's operation but fixed.

The CPU 31 repeatedly determines whether a selection of an amount of the owned coin count a to be consumed has been received from the user (S824). When determining that a selection of an amount of the owned coin count a to be consumed has been received from the user (YES at S824), the CPU 31 calculates and stores character information D20 in the main memory 32 as hero character information D25 (S825). The CPU 31 adds the date and time when the character information D20 has been generated, to the generated character information D20 as a reception date and time, and then stores the resultant information in the saved data memory 34 as obtained-character information D22. Hereinafter, a method of generating character information D20 is described. As described above, character information D20 indicates IDs of pieces of character image data D24 in association with corresponding part IDs, respectively. Accordingly, character information D20 is generated by performing a predetermined random number generation process to generate IDs of respective pieces of character image data D24. Here, the ID generation for character image data D24 is performed for all the part IDs. Then, IDs generated for respective pieces of character image data D24 are associated with corresponding part IDs, and the generated IDs and the part IDs associated therewith are contained in the character information D20 to be generated. Also, color information, height/physical attribute information, and a character name are each selected from multiple options at random, and then contained in the character information D20. Further, a character ID is determined in such a manner as to prevent duplication of character IDs with other character information D20, and then contained in the character information D20.

Next, the CPU 31 searches the hero level table T1 based on the amount of the owned coin count a to be consumed, which has been received at step S824, obtains a hero level through the search, generates hero level information D26 that indicates the hero level, and stores the hero level information D26 in the main memory 32 (S826). Thereafter, the CPU 31 updates the character obtaining date data in the saved data memory 34 to the current date (S827). Then, the CPU 31 subtracts the amount of the owned coin count a to be consumed, which has been received at step S824, from the entirety of the owned coin count a (S828). Thereafter, the CPU 31 ends the hero purchasing process and returns the processing to the main routine shown in FIG. 27.

As described above in the second embodiment, similar to the first embodiment, the game apparatus 1 can obtain character information D20 not only by the method of obtaining character information D20 by the "passing communication" but also by the method of obtaining character information D20 in accordance with a step count of the user of the game apparatus 1. In the second embodiment, similar to the first embodiment, if the game apparatus 1 cannot obtain character information D20 at all by the "passing communication", or if character information D20 obtained by the "passing communication" is not sufficient to defeat all the enemy characters, the game apparatus 1 is allowed to obtain, a limited number of times within one day, character information D20 in accordance with a step count of the user of the game apparatus 1.

Hereinafter, variations of the first and second embodiments are described.

(1) In the first and second embodiments, the two game apparatuses 1 transmit/receive piece information D5 or character information D20 to/from each other. However, in place of the piece information D5 or character information D20, piece image data D9 or character image data D24 may be transmitted/received between the two game apparatuses 1.

(2) In the second embodiment, character information D20 is generated by using the owned coin count a. However, without generating the character information D20, IDs of pieces of character image data D24 may be generated by a predetermined random number generation process for respective part IDs, and the pieces of character image data D24 specified by the generated IDs may be read and thereby a hero character image G11 may be generated.

(3) In the first and second embodiments, only when piece information D5 or character information D20 is not obtained at all by the "passing communication", or when piece information D5 or character information D20 that has been obtained is not sufficient to clear the game, piece information D5 or character information D20 can be obtained by purchasing them with the owned coin count stored in the game apparatus 1 (i.e., by purchasing them in accordance with the user's step count stored in the game apparatus 1). However, as a variation, the user may be allowed to freely select the method of obtaining piece information D5 or character information D20, between the "passing communication" and the purchasing by using the owned coin count.

(4) Further, in the first and second embodiments, the game apparatus 1 performs either the piece collection application or the heroes battle application. However, as a variation, the game apparatus 1 may store an application for performing one of the piece collection process and the heroes battle process in accordance with the user's selection. Then, one of the piece collection process and the heroes battle process that is selected by the user may be performed through the execution of the application. Moreover, piece information as described in the first embodiment and character information as described in the second embodiment may be both transmitted/received by the "passing communication" at the same time.

(5) Still further, in the first and second embodiments, the game apparatus 1 enters the sleep state in response to an instruction from the user, thereby performing the passing communication process. However, as a variation, the game apparatus 1 may always perform the passing communication process (even during game processing) if the main power supply of the game apparatus 1 is ON, and piece information D5 or character information D20 that is obtained by the passing communication process may be used in the piece collection application or the heroes battle application in accordance with an instruction from the user.

(6) Still further, in the first and second embodiments, the present invention is applied to the game apparatus 1, which is a game-dedicated apparatus. However, the present invention is also applicable to, for example, a portable information terminal apparatus such as a mobile phone, a personal handyphone system (PHS), or a personal digital assistant (PDA). Still further, in the first and second embodiments, the information processing program of the present invention is applied to a game program. However, the information processing program of the present invention is also applicable to other types of programs as long as such a program is configured to perform processing by using information (data, program, etc.) that is obtained by the "passing communication".

(7) Still further, in the first and second embodiments, the game apparatus 1 transmits/receives piece information D5 or character information D20 to/from another game apparatus that is of the same type as the game apparatus 1. However, the game apparatus 1 may only receive piece information D5 or character information D20. In this case, the game apparatus 1 may receive piece information D5 or character information D20 not only from another game apparatus 1 but also from an access point, stationary game apparatus, personal computer, or the like.

(8) Still further, in the first and second embodiments, when the piece collection process or the heroes battle process is performed, the process is performed solely by the game apparatus 1. However, part of the process may be performed by a server.

While the invention has been described in detail, the foregoing description is in all aspects illustrative and not restrictive. It will be understood that numerous other modifications and variations can be devised without departing from the scope of the invention.

What is claimed is:

1. A communication system including a plurality of handheld terminal apparatuses,
each handheld terminal apparatus comprising:
a transmitter configured to automatically transmit first data to another one of the handheld terminal apparatuses by short-range wireless communication;
a receiver configured to automatically receive, by the short-range wireless communication, first data that is transmitted from the transmitter of the other one of the handheld terminal apparatuses; and
processing circuitry configured to perform a predetermined process of an application, either by using the first data received by the short-range wireless communication, or by using, instead of the first data, second data based on the travel distance of the handheld terminal apparatus when the first data is unavailable and/or insufficient for performing the predetermined process of the application, wherein the first data and the second data are usable for completing an objective for the application.

2. A non-transitory computer-readable storage medium comprising an information processing program stored therein, the information processing program, when executed by a computer of a handheld terminal apparatus, causing the handheld terminal apparatus to at least:
automatically receive first data from a communication apparatus by short-range wireless communication;
obtain second data based on a travel distance of the handheld terminal apparatus; and
perform a predetermined process of an application, either by using the first data received by the short-range wireless communication, or by using, instead of the first data, the second data based on the travel distance of the handheld terminal apparatus when the first data is unavailable and/or insufficient for performing the predetermined process of the application, wherein the first data and the second data are usable for completing an objective for the application.

3. The non-transitory computer-readable storage medium according to claim 2, wherein
the first data is stored in a storage device of the handheld terminal apparatus, and
the predetermined process is performed by using the first data if the first data is stored in the storage device, and is performed by using the second data if the first data is absent from the storage device.

4. The non-transitory computer-readable storage medium according to claim 2, wherein
the first data is stored in a storage device of the handheld terminal apparatus, and
the predetermined process is performed by using the first data if the first data is stored in the storage device, and is performed by using the second data after using, for the predetermined process, the first data stored in the storage device.

5. The non-transitory computer-readable storage medium according to claim 4, wherein
the first data comprises a plurality of pieces, and the plurality of pieces of the first data is stored in the storage device, and
the predetermined process is performed by using the second data after using, for the predetermined process, all of the plurality of pieces of the first data stored in the storage device.

6. The non-transitory computer-readable storage medium according to claim 2, wherein
the information processing program, when executed, further causes the computer to detect a step count of a user of the handheld terminal apparatus, and
the second data corresponds to step count data which indicates the detected step count.

7. The non-transitory computer-readable storage medium according to claim 6, wherein
the information processing program, when executed, further causes the computer to:
store, in a storage device of the handheld terminal apparatus, the obtained second data;
either delete or invalidate, among the second data stored in the storage device, second data that has been stored in the storage device for a predetermined period or longer; and
convert the second data stored in the storage device into data that is storable in the storage device for a period longer than the predetermined period, and
the predetermined process is performed by using, instead of the first data, the converted second data.

8. The non-transitory computer-readable storage medium according to claim 2, wherein
the predetermined process is performed a predetermined number of times during a predetermined period by using the second data.

9. The non-transitory computer-readable storage medium according to claim 2, wherein the information processing program, when executed, further causes the computer to generate, based on the second data, third data which is of the same type as the first data, and the third data is used in executing the application instead of the first data.

10. The non-transitory computer-readable storage medium according to claim 2, wherein the information processing program, when executed, further causes the computer to generate third data by using either the first data or the second data, and the third data is used in executing the application.

11. The non-transitory computer-readable storage medium according to claim 2, wherein
the information processing program, when executed, further causes the computer to generate, when the application is executed for the first time, the first data and store the first data in a storage device of the handheld terminal apparatus, and
the first data stored in the storage device is transmitted, by the short-range wireless communication, to another handheld terminal apparatus, which is the communication apparatus, and the first data from the other handheld terminal apparatus is received, and the received first data is stored in the storage device.

12. The non-transitory computer-readable storage medium according to claim 11, wherein
the information processing program, when executed, further causes the computer to select, in response to an input via an input device of the handheld terminal apparatus, either the first data stored in the storage device or the first data received from the other handheld terminal apparatus, and
the selected first data is transmitted.

13. The non-transitory computer-readable storage medium according to claim 9, wherein
the application is a program for generating one piece of collection data that includes a predetermined number of two or more pieces of piece data, and
a process of generating one piece of collection data is performed as the predetermined process, by using the third data and/or the first data as the predetermined number of two or more pieces of piece data.

14. The non-transitory computer-readable storage medium according to claim 13, wherein
the application is a program for generating a plurality of pieces of collection data for which different attributes are set, respectively,
one among the respective different attributes set for the plurality of pieces of collection data is set for the first data and the third data, and
as the predetermined process, a process is performed of generating one of the pieces of collection data by using the first data and/or the third data for which the one attribute, which is the same attribute as that set for the one of the pieces of collection data, is set.

15. The non-transitory computer-readable storage medium according to claim 13, wherein a plurality of pieces of the third data is generated at different generation rates in association with the predetermined number of two or more pieces of piece data, respectively, such that the plurality of pieces of the third data that have been generated correspond to the predetermined number of two or more pieces of piece data, respectively.

16. The non-transitory computer-readable storage medium according to claim 10, wherein when generating the third data by using either the first data or the second data, an attribute for the third data is set, and, by using the third data, the predetermined process is performed based on the attribute set for the third data.

17. A handheld terminal apparatus comprising:
communication circuitry configured to automatically receive first data from a communication apparatus by short-range wireless communication; and processing circuitry configured to perform a predetermined process of an application, either by using the first data received by the communication circuitry by the short-range wireless communication, or by using, instead of the first data, second data obtained based on the travel distance of the handheld terminal apparatus when the first data is unavailable and/or insufficient for performing the predetermined process of the application, wherein the first data and the second data are usable for completing an objective for the application.

18. A system including a handheld terminal apparatus, the system comprising:
   memory;
   communication circuitry configured to automatically receive first data from a communication apparatus by short-range wireless communication; and
   processing circuitry configured to perform a predetermined process of an application, either by using the first data received by the communication circuitry by the short-range wireless communication, or by using, instead of the first data, second data obtained based on the travel distance of the handheld terminal apparatus when the first data is unavailable and/or insufficient for performing the predetermined process of the application, wherein the first data and the second data are usable for completing an objective for the application.

19. An information processing method implemented using a handheld terminal apparatus comprising communication circuitry and processing circuitry, the method comprising:
   receiving, automatically via the communication circuitry, first data from a communication apparatus by short-range wireless communication;
   obtaining second data based on a travel distance of the handheld terminal apparatus; and
   performing, by the processing circuitry, a predetermined process of an application, either by using the first data received by the short-range wireless communication, or by using, instead of the first data, the obtained second data based on the travel distance of the handheld terminal apparatus when the first data is unavailable and/or insufficient for performing the predetermined process of the application, wherein the first data and the second data are usable for completing an objective for the application.

20. A communication system including a handheld terminal apparatus and a communication apparatus configured to communicate with the handheld terminal apparatus,
   the handheld terminal apparatus comprising:
      communication circuitry configured to automatically receive first data from the communication apparatus by short-range wireless communication; and
      processing circuitry configured to automatically perform a predetermined process of an application, either by using the first data received by the short-range wireless communication, or by using, instead of the first data, second data obtained based on the travel distance of the handheld terminal apparatus when the first data is unavailable and/or insufficient for performing the predetermined process of the application, wherein the first data and the second data are usable for completing an objective for the application.

21. A handheld terminal apparatus configured to be carried by a user, the handheld terminal apparatus comprising:
   communication circuitry configured to automatically receive first data from a communication apparatus by short-range wireless communication; and
   processing circuitry configured to execute an application including a process which uses, if available, the first data received by the communication circuitry by short-range wireless communication, and uses, if the first data is unavailable and/or insufficient, second data obtained based on the movement associated with the carrying of the handheld terminal apparatus by the user, wherein the first data and the second data are usable for completing an objective for the application.

22. The handheld terminal apparatus according to claim 21, further comprising a movement detection device, wherein the second data is obtained based on data output by the movement detection device.

23. The handheld terminal apparatus according to claim 22, wherein the movement detection device comprises an accelerometer.

24. The handheld terminal apparatus according to claim 22, wherein the processing circuitry generates, based on the data output by the movement detection device, a step count corresponding to a number of steps associated with the carrying of the handheld terminal apparatus by the user.

25. The handheld terminal apparatus according to claim 21, further comprising global position system (GPS) circuitry, wherein the second data is obtained based on GPS data.

26. The handheld terminal apparatus according to claim 21, wherein the application generates an image and the first and second data are associated with pieces of the image.

27. A handheld terminal apparatus configured to be carried by a user, the handheld terminal apparatus comprising:
   processing circuitry configured to execute a piece collection application; and
   communication circuitry configured to automatically receive first piece data from a communication apparatus by short-range wireless communication,
   wherein the piece collection application uses the first piece data if the handheld terminal apparatus receives the first piece data via the communication circuitry from the communication apparatus and uses second piece data obtained based on movement associated with the carrying of the handheld terminal apparatus by the user if the first piece data is not received and/or is not sufficient, wherein the first piece data and the second piece data are usable for completing an objective for the piece collection application.

28. A handheld terminal system comprising:
   communication circuitry configured to automatically receive first data from a communication apparatus by short-range wireless communication;
   a pedometer; and
   processing circuitry configured to perform a predetermined process of an application, either by using the first data received by the short-range wireless communication, that is unrelated to an output of the pedometer, or by using, instead of the first data, second data obtained based on the output of the pedometer when the first data is unavailable and/or insufficient for performing the predetermined process of the application, wherein the first data and the second data are usable for completing an objective for the application.

29. The communication system according to claim 1, wherein
   the predetermined process is performed using the first data received by the short-range wireless communication when the other one of the handheld terminal apparatuses is within a communicable range, and the predetermined process is performed by instead using the second data based on the travel distance of the handheld terminal apparatus when the other one of the handheld terminal apparatuses is outside the communicable range.

30. The communication system according to claim 1, wherein the application is a game and the first data and the second data are usable to accomplish an objective in the game.

31. The communication system according to claim 1, wherein the application is a game and the first data and the second data are usable to form portions of an image in the game.

* * * * *